(12) United States Patent
Wang et al.

(10) Patent No.: US 11,988,777 B2
(45) Date of Patent: *May 21, 2024

(54) TIME-RESOLVING IMAGE SENSOR FOR RANGE MEASUREMENT AND 2D GREYSCALE IMAGING

(71) Applicant: Samsung Electronics Co., Ltd., Suwon-si (KR)

(72) Inventors: Yibing Michelle Wang, Burbank, CA (US); Lilong Shi, Pasadena, CA (US); Ilia Ovsiannikov, Studio City, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/583,190

(22) Filed: Jan. 24, 2022

(65) Prior Publication Data

US 2022/0146683 A1    May 12, 2022

Related U.S. Application Data

(63) Continuation of application No. 16/140,529, filed on Sep. 24, 2018, now Pat. No. 11,294,039.

(Continued)

(51) Int. Cl.
*G01S 7/4863* (2020.01)
*G01N 21/55* (2014.01)
(Continued)

(52) U.S. Cl.
CPC ............ *G01S 7/4863* (2013.01); *G01N 21/55* (2013.01); *G01S 7/4816* (2013.01); *G01S 7/4865* (2013.01);
(Continued)

(58) Field of Classification Search
None
See application file for complete search history.

(56) References Cited

U.S. PATENT DOCUMENTS

| 7,436,496 B2 | 10/2008 | Kawahito |
| 7,671,391 B2 | 3/2010 | Kawahito |

(Continued)

FOREIGN PATENT DOCUMENTS

| CN | 102947726 A | 2/2013 |
| CN | 103502839 A | 1/2014 |

(Continued)

OTHER PUBLICATIONS

Niclass, Cristiano, et al., "Cmos Imager Based on Single Photon Avalanche Diodes," The 13th International Conference on Solid-State Sensors, Actuators and Microsystems, 2005, Digest of Technical Papers, Transducers 05, Aug. 22, 2005, 5 pages.

(Continued)

*Primary Examiner* — Luke D Ratcliffe
(74) *Attorney, Agent, or Firm* — Renaissance IP Law Group LLP

(57) ABSTRACT

An image sensor includes a time-resolving sensor and a processor. The time-resolving sensor outputs a first signal and a second signal pair in response detecting one or more photons that have been reflected from an object. A first ratio of a magnitude of the first signal to a sum of the magnitude of the first signal and a magnitude of the second signal is proportional to a time of flight of the one or more detected photons. A second ratio of the magnitude of the second signal to the sum of the magnitude of the first signal and the magnitude of the second signal is proportional to the time of flight of the one or more detected photons. The processor determines a surface reflectance of the object where the light (Continued)

pulse has been reflected based on the first signal and the second signal pair and may generate a grayscale image.

20 Claims, 25 Drawing Sheets

Related U.S. Application Data

(60) Provisional application No. 62/702,891, filed on Jul. 24, 2018.

(51) Int. Cl.
| | |
|---|---|
| *G01S 7/481* | (2006.01) |
| *G01S 7/4865* | (2020.01) |
| *G01S 17/89* | (2020.01) |
| *G01S 17/894* | (2020.01) |
| *G04F 10/00* | (2006.01) |
| *H04N 23/56* | (2023.01) |
| *H04N 23/80* | (2023.01) |

(52) U.S. Cl.
CPC ............ *G01S 17/89* (2013.01); *G01S 17/894* (2020.01); *G04F 10/005* (2013.01); *H04N 23/56* (2023.01); *H04N 23/80* (2023.01)

(56) References Cited

U.S. PATENT DOCUMENTS

| | | | |
|---|---|---|---|
| 8,767,189 B2 | 7/2014 | Mase et al. | |
| 9,516,244 B2 | 12/2016 | Borowski | |
| 9,621,876 B2 | 4/2017 | Federspiel | |
| 9,638,791 B2 | 5/2017 | Lou et al. | |
| 9,689,667 B2 | 6/2017 | Royo Royo et al. | |
| 10,116,925 B1 | 10/2018 | Wang et al. | |
| 10,291,895 B2 | 5/2019 | Bulteel et al. | |
| 10,295,669 B2 | 5/2019 | Deane | |
| 10,397,554 B2 * | 8/2019 | Wang | H04N 25/771 |
| 10,557,925 B2 | 2/2020 | Wang et al. | |
| 11,294,039 B2 * | 4/2022 | Wang | G04F 10/005 |
| 2010/0127160 A1 | 5/2010 | Niclass et al. | |
| 2017/0052065 A1 | 2/2017 | Sharma et al. | |
| 2018/0217261 A1 | 8/2018 | Wang et al. | |
| 2019/0391266 A1 * | 12/2019 | Mori | G02B 7/32 |

FOREIGN PATENT DOCUMENTS

| | | | | |
|---|---|---|---|---|
| CN | 106165399 A | 11/2016 | | |
| CN | 108061603 A | 5/2018 | | |
| CN | 108307180 A | 7/2018 | | |
| JP | 2004294420 A | 10/2004 | | |
| JP | 2005235893 A | 9/2005 | | |
| JP | 2009047662 A | 3/2009 | | |
| JP | 2009192499 A | 8/2009 | | |
| JP | 2010032425 A | * | 2/2010 | ............ G01S 17/10 |
| JP | 2010032425 A | | 2/2010 | |
| JP | 2014081254 A | 5/2014 | | |
| KR | 20070009591 A | 1/2007 | | |
| KR | 20180019606 A | 2/2018 | | |

OTHER PUBLICATIONS

Niclass, Cristiano, et al., "Toward a 3-D Camera Based on Single Photon Avalanche Diodes," IEEE Journal of Selected Topics in Quantum Electronics, vol. 10, No. 4, Jul./Aug. 2004, pp. 796-802.
Notice of Allowance for U.S. Appl. No. 16/140,529, dated Nov. 8, 2021.
Office Action for U.S. Appl. No. 16/140,529, dated Jul. 30, 2021.
Stoppa, David, et al., "A CMOS 3-D Imager Based on Single Photon Avalanche Diode," IEEE Transactions on Circuits and Systems, I: Regular Papers, vol. 54, No. 1, Jan. 2007, pp. 4-12.

* cited by examiner

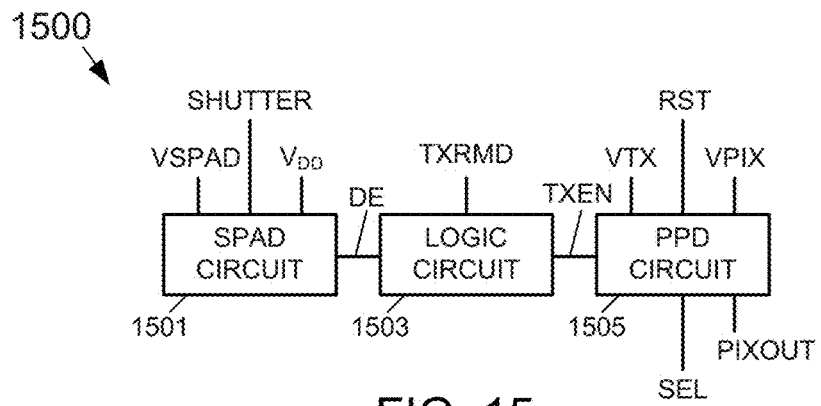
FIG. 15
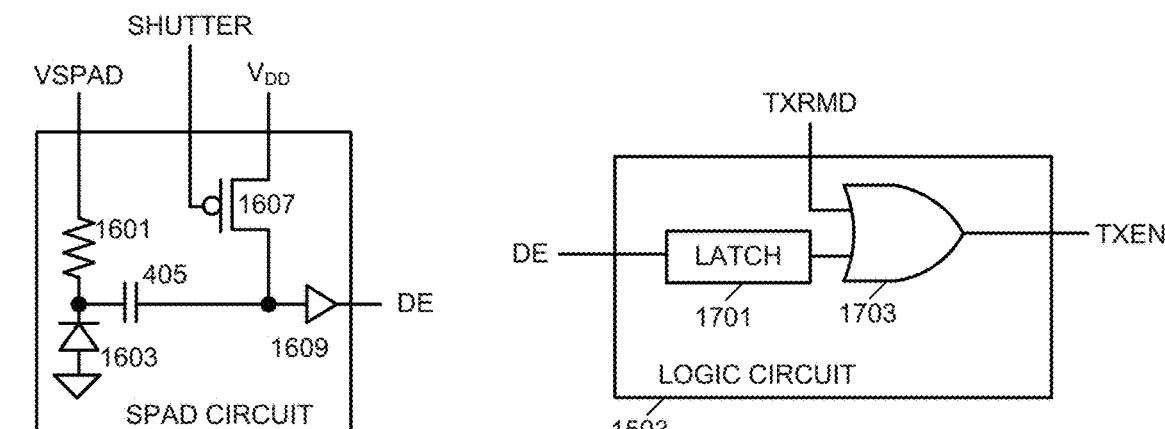
FIG. 16
FIG. 17
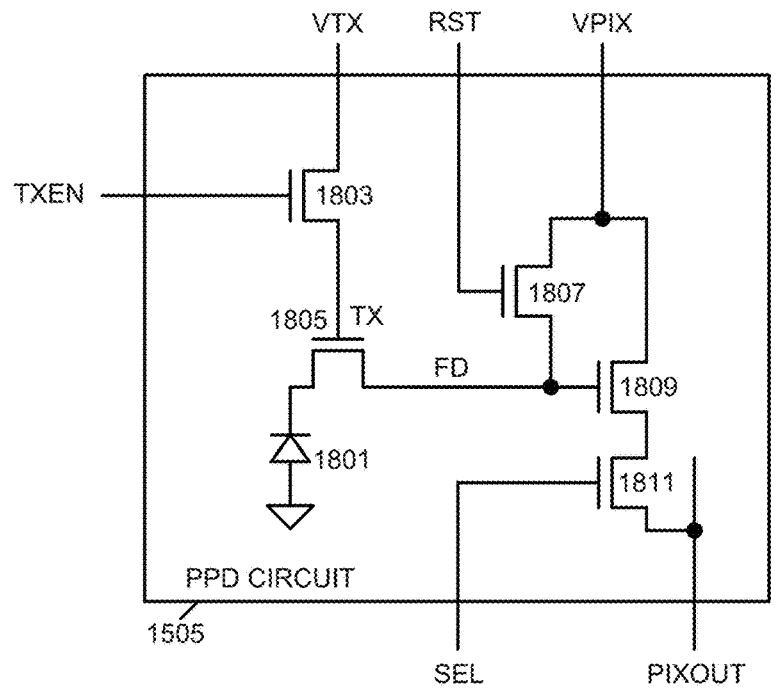
FIG. 18

TIME-RESOLVING IMAGE SENSOR FOR RANGE MEASUREMENT AND 2D GREYSCALE IMAGING

CROSS-REFERENCE TO RELATED APPLICATION

This application is a continuation of U.S. patent application Ser. No. 16/140,529, filed on Sep. 24, 2018, which claims the priority benefit under 35 U.S.C. § 119(e) of U.S. Provisional Patent Application Ser. No. 62/702,891 filed on Jul. 24, 2018, the disclosure of which is incorporated herein by reference in its entirety.

TECHNICAL FIELD

The subject matter disclosed herein generally relates to image sensors. More specifically, the subject matter disclosed herein relates to a Time-of-Flight (TOF) image sensor that may also generate a grayscale image from accumulated photon-detection events.

BACKGROUND

Three-dimensional (3D) imaging systems are increasingly being used in a wide variety of applications, such as industrial production, video games, computer graphics, robotic surgeries, consumer displays, surveillance videos, 3D modeling, real estate sales, and so on. Existing 3D-imaging technologies may include, for example, the time-of-flight (TOF) based range imaging, stereo vision systems, and structured light (SL) methods.

In the TOF method, distance to a 3D object is resolved based on the known speed of light—by measuring the round-trip time it takes for a light signal to travel between a camera and the 3D object for each point of the image. A TOF camera may use a scannerless approach to capture the entire scene with each laser or light pulse. Some exemplary applications of the TOF method may include advanced automotive applications, such as active pedestrian safety or pre-crash detection based on distance images in real time; to track movements of humans such as during interaction with games on video-game consoles; in industrial machine vision to classify objects and help robots find the items, such as items on a conveyor belt, and so on.

In stereoscopic-imaging or stereo-vision systems, two cameras—displaced horizontally from one another—are used to obtain two differing views on a scene or a 3D object in the scene. By comparing these two images, the relative depth information can be obtained for the 3D object. Stereo vision is highly important in fields, such as robotics, to extract information about the relative position of 3D objects in the vicinity of autonomous systems/robots. Other applications for robotics include object recognition in which stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may become deformed or displaced when striking the surface of the 3D object. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging maybe used in different applications such as, by a police force to photograph fingerprints in a 3D scene, inline inspection of components during a production process, in health care for live measurements of human body shapes and/or the micro structures of human skin.

SUMMARY

An example embodiment provides an image sensor that may include a time-resolving sensor and a processor. The time-resolving sensor may include at least one pixel and may output a first signal and a second signal pair in response to detecting by the at least one pixel one or more photons that have been reflected from an object corresponding to a light pulse projected toward the object in which a first ratio of a magnitude of the first signal of the pair to a sum of the magnitude of the first signal and a magnitude of the second signal of the pair may be proportional to a time of flight of the one or more detected photons, and in which a second ratio of the magnitude of the second signal of the pair to the sum of the magnitude of the first signal and the magnitude of the second signal of the pair may be proportional to the time of flight of the one or more detected photons. The processor may determine a surface reflectance of the object where the light pulse has been reflected based on the first signal and the second signal pair. The processor may further determine a distance to the object based on the first signal and second signal pair. In one embodiment, the time-resolving sensor may output a plurality of first signal and second signal pairs in response to detecting one or more photons at the pixel that have been reflected from the object for a plurality of light pulses projected toward the object in which each first signal and second pair may correspond to a respective light pulse, and the processor may determine a surface reflectance of the object where the light pulse has been reflected based on at a plurality of first signal and second signal pairs.

An example embodiment provides an imaging unit that may include a light source, a time-resolving sensor and a processor. The light source may illuminate an object with a sequence of light pulses projected toward a surface of the object. The time-resolving sensor may include at least one pixel, may be synchronized with the light source and output a first signal and a second signal pair in response to detecting at the at least one pixel one or more photons corresponding to a light pulse that have been reflected from the surface of the object in which a first ratio of a magnitude of the first signal of the pair to a sum of the magnitude of the first signal and a magnitude of the second signal of the pair may be proportional to a time of flight of the one or more detected photons, and in which a second ratio of the magnitude of the second signal of the pair to the sum of the magnitude of the first signal and the magnitude of the second signal of the pair may be proportional to the time of flight of the one or more detected photons. The processor may determine a distance to the object based on the first signal and the second signal pair and may determine a surface reflectance of the object where the light pulse has been reflected based on the first signal and second signal pair. In one embodiment, the time-resolving sensor may output a plurality of first signal and second signal pairs in response to detecting one or more photons at the pixel that have been reflected from the object in which each first signal and second signal pair may correspond to a respective light pulse of a plurality of light pulses projected toward the object. The processor may further determine a plurality of surface reflectances of the object where each respective light pulse has been reflected based on a corresponding first signal and second signal pair. In one embodiment, the processor may further generate a grayscale image of the object based on the plurality of surface reflectance.

An example embodiment provides a method to generate a greyscale image of an object in which the method may include: projecting a sequence of light pulses toward a surface of an object from a light source; detecting at a pixel one or more photons corresponding to a light pulse that has been reflected from the surface of the object; generating by a time-resolving sensor a first signal and a second signal pair in response to detecting the one or more photons in which the time-resolving sensor may be synchronized with the light source, in which a first ratio of a magnitude of the first signal of the pair to a sum of the magnitude of the first signal and a magnitude of the second signal of the pair may be proportional to a time of flight of the one or more detected photons, and a second ratio of the magnitude of the second signal of the pair to the sum of the magnitude of the first signal and the magnitude of the second signal of the pair may be proportional to the time of flight of the one or more detected photons; determining by a processor a distance to the object based on the first and second signal pair; and determining by the processor a surface reflectance of the object where the one or more photons have has been reflected based on the first signal and the second signal pair. In one embodiment, the method may further include detecting one or more photons at the pixel that have been reflected from the object for a plurality of light pulses projected toward the object in which each first signal and second signal pair may correspond to a light pulse of the plurality of light pulses; and determining by the processor a surface reflectance of the object where the light pulse has been reflected based on at least one first signal and second signal pair. In one embodiment, the method may further include generating by the processor at least one histogram of an arrival time of photons detected by a predetermined pixel of the plurality of pixels to generate the grayscale image.

BRIEF DESCRIPTION OF THE DRAWINGS

In the following section, the aspects of the subject matter disclosed herein will be described with reference to exemplary embodiments illustrated in the figures, in which:

FIG. 15 depicts a block diagram of an example embodiment of a time-resolving sensor according to the subject matter disclosed herein;

FIG. 16 depicts a schematic diagram of an example embodiment of a SPAD circuit of the time-resolving sensor of FIG. 15 according to the subject matter disclosed herein;

FIG. 17 depicts a schematic diagram of an example embodiment a logic circuit of the time-resolving sensor of FIG. 15 according to the subject matter disclosed herein;

FIG. 18 depicts a schematic diagram of an example embodiment of a pinned photodiode (PPD) circuit of the time-resolving sensor of FIG. 15 according to the subject matter disclosed herein;

DETAILED DESCRIPTION

Figure 1:
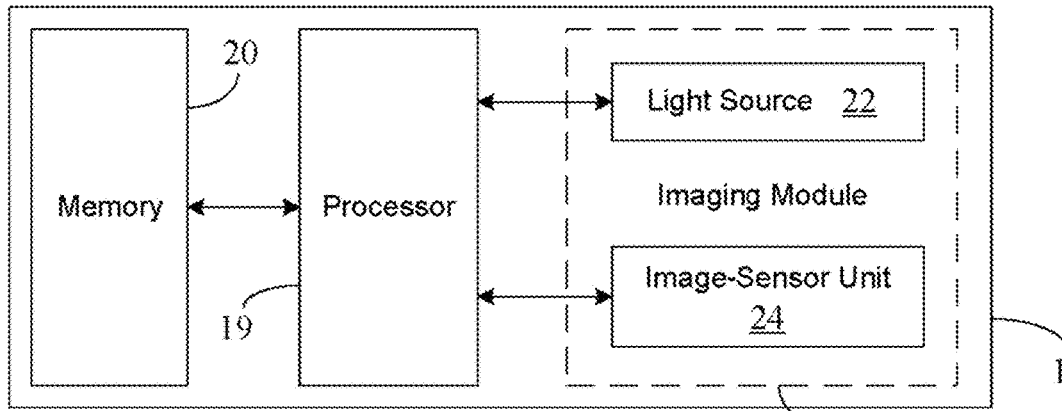
FIG. 1 depicts a highly simplified, partial configuration of an image-sensor system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform low power, 3D-depth measurements in any imaging device or system, including, but not limited to, a smartphone, a User Equipment (UE), and/or a laptop computer.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

The earlier-mentioned 3D technologies have many drawbacks. For example, a TOF—based 3D-imaging system may require high power to operate optical or electrical shutters. These systems typically operate over a range of few meters to several tens of meters, but the resolution of these systems decreases for measurements over short distances, thereby making 3D imaging within a distance of about one meter almost impractical. Hence, a TOF system may not be desirable for cell phone-based camera applications in which pictures are pre-dominantly taken at close distances. A TOF sensor may also require special pixels with big pixel sizes, usually larger than 7 µm. These pixels also may be vulnerable to ambient light.

The stereoscopic imaging approach generally works only with textured surfaces. It has high-computational complexity because of the need to match features and find correspondences between the stereo pair of images of an object. This requires high system power, which is not a desirable attribute in applications in which power conservation is needed, such as in smartphones. Furthermore, stereo imaging requires two regular, high bit resolution sensors along with two lenses, making the entire assembly unsuitable for applications in portable devices, like cell phones or tablets in which device real estate is at a premium.

The SL approach introduces distance ambiguity, and also requires high system power. For 3D-depth measurements, the SL method may need multiple images with multiple patterns—all of these increase computational complexity and power consumption. Furthermore, the SL imaging may also require regular image sensors with high bit resolution. Thus, a structured light-based system may not be suitable for low-cost, low-power, compact image sensors in smartphones.

In contrast to the above-mentioned 3D technologies, some embodiments disclosed herein provide for implementing a low-power, 3D-imaging system on portable electronic devices, such as smartphones, tablets, UEs, and the like. A 2D-imaging sensor as per some embodiments disclosed herein can capture both 2D RGB (red, green, blue) images and 3D-depth measurements with visible light laser scanning, while being able to reject ambient light during 3D-depth measurements. It is noted here that although the following discussion may frequently mention a visible light laser as a light source for point scans and a 2D RGB sensor as an image/light capture device, such mention is for the purpose of illustration and consistency of discussion only. The visible laser and RGB sensor-based examples discussed below may find applications in low-power, consumer-grade mobile electronic devices having cameras such as, smartphones, tablets, or UEs. It is, however, understood that the subject matter disclosed herein is not limited to the visible laser-RGB sensor-based examples mentioned below. Rather, according to some embodiments disclosed herein, the point-scan based 3D-depth measurements and the ambient-light rejection methodology may be performed using many different combinations of 2D sensors and laser light sources (for point scans) such as, but not limited to: (i) a 2D color (RGB) sensor with a visible light laser source in which the laser source may be a red (R), green (G), or blue (B) light laser, or a laser source producing a combination of these lights; (ii) a visible light laser with a 2D RGB color sensor having an Infrared (IR) cut filter; (iii) a Near Infrared (NIR) laser with a 2D IR sensor; (iv) an NIR laser with a 2D NIR sensor; (v) an NIR laser with a 2D RGB sensor (without an IR cut filter); (vi) an NIR laser with a 2D RGB sensor (without an NIR cut filter); (vii) a 2D RGB-IR sensor with visible or NIR laser; (viii) a 2D RGBW (red, green, blue, white) sensor with either visible or NIR laser; and so on.

During 3D-depth measurements, the entire sensor may operate as a binary sensor in conjunction with the laser scan to reconstruct 3D content. In some embodiments, the pixel size of the sensor can be as small as 1 µm. Furthermore, due to lower bit resolution, the analog-to-digital converter (ADC) units in the image sensor according to some embodiments disclosed herein may need significantly lower processing power than that that is needed for high-bit-resolution sensors in traditional 3D-imaging systems. Because of the need for less processing power, the 3D-imaging module according to the subject matter disclosed herein may require lower system power and, hence, may be quite suitable for inclusion in low-power devices like smartphones.

In some embodiments, the subject matter disclosed herein uses triangulation and point scans with a laser light source for 3D-depth measurements with a group of line sensors. The laser-scanning plane and the imaging plane are oriented using epipolar geometry. An image sensor according to one embodiment disclosed herein may use timestamps to remove ambiguity in the triangulation approach, thereby reducing the amount of depth computations and system power. The same image sensor—that is, each pixel in the image sensor—may be used in the normal 2D (RGB color or non-RGB) imaging mode as well as in the 3D-laser-scan mode. In the laser-scan mode, however, the resolution of the ADCs in the image sensor is reduced to a binary output (1-bit resolution only), thereby improving the readout speed and reducing power consumption—for example, due to switching in the ADC units—in the chip incorporating the image sensor and associated processing units. The point-scan approach may allow the system to take all measurements in one pass, thereby reducing the latency for depth measurements and reducing motion blur.

As noted before, in some embodiments, the entire image sensor may be used for routine 2D RGB color imaging using, for example, ambient light, as well as for 3D-depth imaging using visible laser scan. Such dual use of the same camera unit may save space and cost for mobile devices. In certain applications, a visible laser for 3D applications may be better for user eye safety as compared to a Near Infrared (NIR) laser. The sensor may have higher quantum efficiency at visible spectrum than at the NIR spectrum, leading to lower power consumption of the light source. In one embodiment, the dual-use image sensor may work in a linear mode of operation for 2D imaging as a regular 2D sensor. For 3D imaging, however, the sensor may work in linear mode under moderate lighting condition and in a logarithmic mode under strong ambient light to facilitate continued use of the visible laser source through rejection of the strong ambient light. Ambient-light rejection may be needed in case of an NIR laser as well, for example, if the bandwidth of the pass band of an IR-cut filter employed with an RGB sensor is not narrow enough.

In summary, the present disclosure uses a pinned photodiode (PPD) in a pixel as a time-to-charge converter (TCC) having an amplitude-modulated charge-transfer operation is controlled by outputs from multiple adjacent SPADs in the pixel to determine TOF. When the ambient light is high, there may be a high probability that a SPAD may be triggered by an ambient photon instead of a reflected photon (for example, in the reflected pulse 37). A reliance on such triggering may cause a range measurement error. Therefore, in the present disclosure, the PPD charge transfer is stopped to record TOF only when two or more SPADs are triggered within a very short, pre-defined time interval, such as when an electronic shutter is on. As a result, an all-weather autonomous navigation system as per teachings of the present disclosure may provide improved vision for drivers under difficult driving conditions such as, for example, low light, fog, bad weather, strong ambient light, and so on. In some embodiments, the navigation system as per teachings of the present disclosure may have high ambient light rejection level of up to 100 kilo lux (100 kLux). In some embodiments, a high spatial resolution pixel architecture with smaller pixel size may be provided with SPAD to PPD ratio of 1:1. In some embodiments, the SPADs can be biased below their breakdown voltage and be used in an avalanche photodiode (APD) mode.

FIG. 1 depicts a highly simplified, partial configuration of an imaging system 15 according to the subject matter disclosed herein. The system 15 may include an imaging module 17 coupled to and in communication with a processor or host 19. The system 15 may also include a memory module 20 coupled to the processor 19 to store information content such as, image data received from the imaging module 17. In some embodiments, the entire system 15 may be encapsulated in a single Integrated Circuit (IC) or chip. Alternatively, each of the modules 17, 19 and 20 may be implemented in a separate chip. The memory module 20 may include more than one memory chip, and the processor module 19 may include multiple processing chips as well. The details about packaging of the modules in FIG. 1 and how the modules are fabricated or implemented, whether in a single chip or in multiple discrete chips, are not relevant to the present discussion and, hence, such details are not provided herein.

The system 15 may be any low-power electronic device configured for 2D- and 3D-camera applications as per the subject matter disclosed herein. The system 15 may be portable or non-portable. Some examples of the portable version of the system 15 may include popular consumer electronic gadgets such as, but not limited to, a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. On the other hand, some examples of the non-portable version of the system 15 may include a game console in a video arcade, an interactive video terminal, an automobile, a machine vision system, an industrial robot, a VR equipment, a driver-side mounted camera in a vehicle (for example, to monitor whether the driver is awake or not), and so on. The 3D imaging functionality disclosed herein may be used in many applications such as, but not limited to, automobile applications such as all-weather autonomous navigation and driver assistance in low light or inclement weather conditions, human-machine interface and gaming applications, machine vision and robotics applications.

In some embodiments disclosed herein, the imaging module 17 may include a projector module (or light-source module) 22 and an image-sensor unit 24. The light source in the projector module 22 may be an Infrared (IR) laser such as, for example, a Near Infrared (NIR) or a Short Wave Infrared (SWIR) laser, to make the illumination unobtrusive. In other embodiments, the light source may be a visible light laser. The image-sensor unit 24 may include a pixel array and ancillary processing circuits as depicted in FIG. 2.

In one embodiment, the processor 19 may be a central processing unit (CPU), which can be a general-purpose microprocessor. The terms "processor" and "CPU" as used herein may be used interchangeably. It is, however, understood that, instead of or in addition to the CPU, the processor 19 may contain any other type of processor such as, but not limited to, a microcontroller, a Digital Signal Processor (DSP), a Graphics Processing Unit (GPU), a dedicated Application Specific Integrated Circuit (ASIC) processor, and the like. In one embodiment, the processor/host 19 may include more than one CPU, which may be operative in a distributed processing environment. The processor 19 may be configured to execute instructions and to process data according to a particular Instruction Set Architecture (ISA) such as, but not limited to, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having functionalities in addition to a CPU functionality.

In some embodiments, the memory module 20 may be a Dynamic Random Access Memory (DRAM) such as, but not limited to, a Synchronous DRAM (SDRAM), or a DRAM-based Three-Dimensional Stack (3DS) memory module such as, but not limited to, a High Bandwidth Memory (HBM) module, or a Hybrid Memory Cube (HMC) memory module. In other embodiments, the memory module 20 may be a Solid-State Drive (SSD), a non-3DS DRAM module, or any other semiconductor-based storage system such as, but not limited to, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), or a Spin-Transfer Torque MRAM (STT-MRAM).

Figure 2:
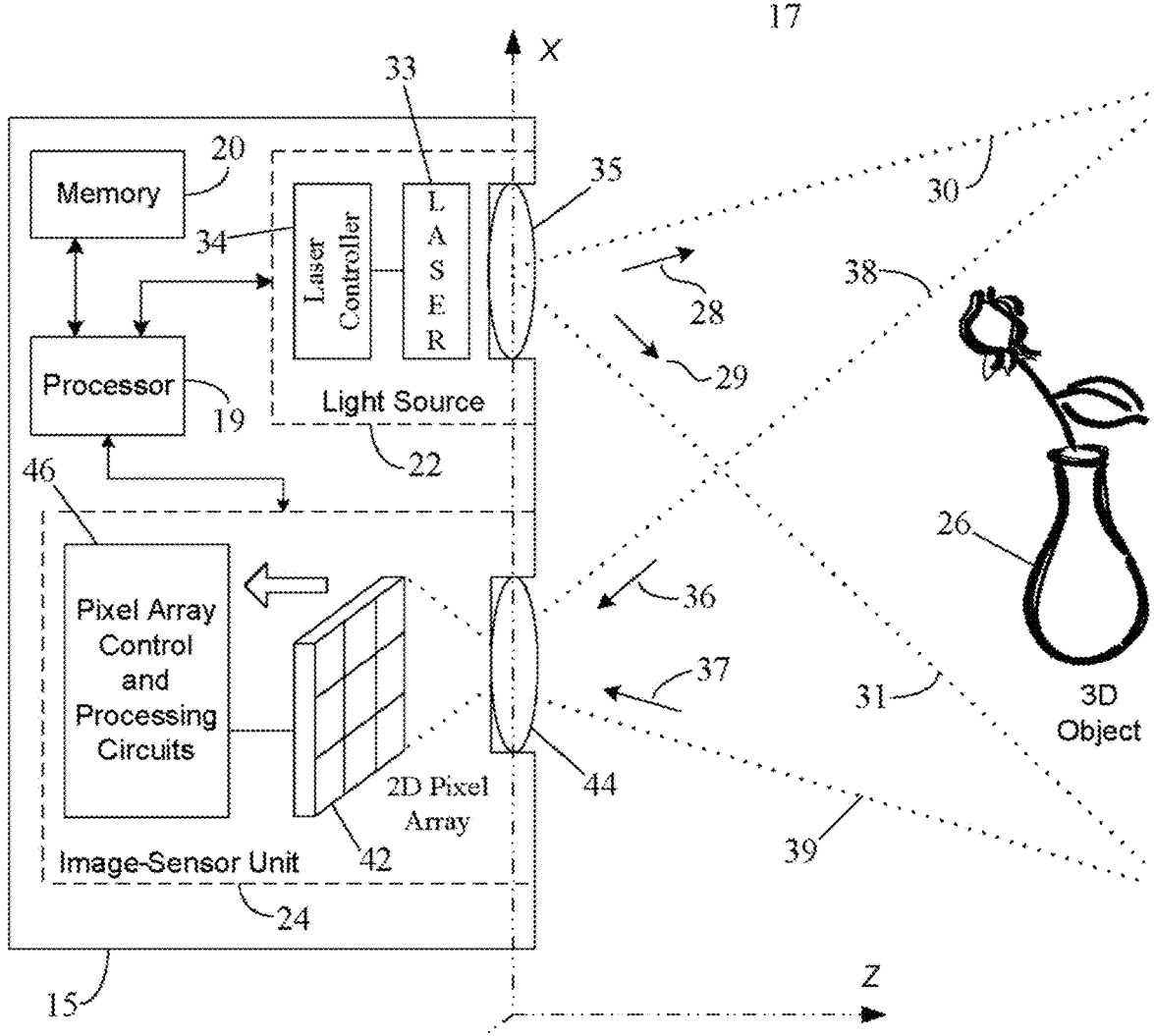
FIG. 2 depicts an example operational configuration of the image-sensor system in FIG. 1 according to the subject matter disclosed herein.

FIG. 2 depicts an example operational configuration of the imaging system 15 in FIG. 1 according to the subject matter disclosed herein. The system 15 may be used to obtain range, or depth, information (along the Z-axis) for an object, such as the object 26, which may be an individual object or an object within a scene (not shown). The system 15 may be a direct TOF imager in which a single pulse may be used per image frame (of pixel array). In some embodiments, multiple, short pulses may be transmitted onto the object 26. In one embodiment, the range/depth information may be determined by the processor 19 based on the scan data received from the image-sensor unit 24. In another embodiment, the range/depth information may be determined by the image-sensor unit 24. In some embodiments, the depth information may be used by the processor 19 as part of a 3D user interface to enable the user of the system 15 to interact with the 3D image of the object or use the 3D image of the object as part of a game or another application, such as an autonomous navigation application, running on the system 15. The 3D imaging as per the subject matter disclosed herein may be used for other purposes or applications as well, and may be applied to substantially any scene or 3D objects.

In FIG. 2, the X-axis is taken to be the horizontal direction along the front of the system 15, the Y-axis is the vertical direction (out of the page in this view), and the Z-axis extends away from the system 15 in the general direction of the object 26 being imaged. For the depth measurements, the optical axes of the modules 22 and 24 may be parallel to the Z-axis. Other optical arrangements may be used to implement the principles described herein, and these alternative arrangements are considered to be within the scope of the subject matter disclosed herein.

The projector (or light-source) module 22 may illuminate the object 26 as indicated by arrows 28 and 29 associated with corresponding dotted lines 30 and 31 representing an illumination path of a light beam or optical radiation that may be used to point scan the object 26 within an optical field of view (FOV). A line-by-line point scan of the object surface may be performed using an optical-radiation source, which, in one embodiment, may be a laser-light source 33 operated and controlled by a laser controller 34. A light beam from the laser source 33 may be point scanned, under the control of the laser controller 34, in the X-Y direction across the surface of the object 26 via projection optics 35. The point scan may project light spots on the surface of the object along a scan line, as discussed in more detail with reference to FIG. 4. The projection optics may be a focusing lens, a glass/plastics surface, or other cylindrical optical element that concentrates laser beam from the laser 33 as a point or spot on that surface of the object 26. In the embodiment depicted in FIG. 2, a convex structure is shown as a focusing lens 35. Any other suitable lens design, however, may be selected for projection optics 35. The object 26 may be placed at a focusing location where illuminating light from the light source 33 is focused by the projection optics 35 as a light spot. Thus, in the point scan, a point or narrow area/spot on the surface of the object 26 may be illuminated sequentially by the focused light beam from the projection optics 35.

In some embodiments, the light source (or illumination source) 33 may be a diode laser or a Light Emitting Diode (LED) emitting visible light, an NIR laser, a point light source, a monochromatic illumination source (such as, a combination of a white lamp and a monochromator) in the visible light spectrum, or any other type of laser light source. The laser 33 may be fixed in one position within the housing of the system 15, but may be rotatable in X-Y directions. The laser 33 may be X-Y addressable (for example, by the laser controller 34) to perform point scan of the 3D object 26. In one embodiment, the visible light may be substantially green light. The visible light illumination from the laser source 33 may be projected onto the surface of the 3D object 26 using a mirror (not shown), or the point scan may be completely mirrorless. In some embodiments, the light-source module 22 may include more or fewer components than those shown in the example embodiment depicted in FIG. 2.

In the embodiment of FIG. 2, the light reflected from the point scan of the object 26 may travel along a collection path indicated by arrows 36 and 37 and dotted lines 38 and 39. The light collection path may carry photons reflected from or scattered by the surface of the object 26 upon receiving illumination from the laser source 33. It is noted here that the depiction of various propagation paths using solid arrows and dotted lines in FIG. 2 (and also in FIG. 4, as applicable) is for illustrative purpose only, and the depiction should not be construed to depict any actual optical signal propagation paths. In practice, the illumination and collection signal paths may be different from those shown in FIG. 2, and may not be as clearly-defined as in the depiction in FIG. 2.

The light received from the illuminated object 26 may be focused onto one or more pixels of a 2D pixel array 42 via collection optics 44 in the image-sensor unit 24. Like the projection optics 35, the collection optics 44 may be a focusing lens, a glass/plastics surface, or other cylindrical optical element that concentrates the reflected light received from the object 26 onto one or more pixels in the array 42. In the embodiment depicted in FIG. 2, a convex structure is shown as a focusing lens 44. Any other suitable lens design may, however, be selected for collection optics 44. While the pixel array 42 is depicted as only being a 3×3 pixel array in FIG. 2, it should be understood that modern pixel arrays may contain thousands or even millions of pixels. The pixel array 42 may be an RGB pixel array in which different pixels may collect light signals of different colors. In some embodiments, the pixel array 42 may be any 2D sensor, such as, but not limited to a 2D RGB sensor with IR cut filter, a 2D IR sensor, a 2D NIR sensor, a 2D RGBW sensor, a 2D RGB-IR sensor. The system 15 may use the same pixel array 42 for 2D RGB color imaging of the object 26 (or a scene containing the object) as well as for 3D imaging (involving depth measurements) of the object 26.

The pixel array 42 may convert the received photons into corresponding electrical signals, which are then processed by the associated pixel-processing unit 46 to determine the 3D-depth image of the object 26. In one embodiment, the pixel-processing unit 46 may use triangulation for depth measurements. The triangulation approach is discussed later with reference to FIG. 4. The pixel-processing unit 46 may also include circuits for controlling the operation of the pixel array 42.

The processor 19 may control the operations of the light-source module 22 and the image-sensor unit 24. For example, the system 15 may have a mode switch (not shown) that may be controllable by the user to switch from a 2D-imaging mode to a 3D-imaging mode. If the user selects the 2D-imaging mode using the mode switch, the processor 19 may activate the image-sensor unit 24, but may not activate the light-source module 22 because 2D imaging may use ambient light. On the other hand, if the user selects the 3D imaging mode using the mode switch, the processor 19 may activate both of the modules 22 and 24, and may also trigger change in the level of a Reset RST signal in the pixel-processing unit 46 to switch from a linear mode to a logarithmic mode of imaging, for example, if the ambient light is too strong to be rejected by linear mode (as described further below). The processed image data received from the pixel-processing unit 46 may be stored by the processor 19 in the memory 20. The processor 19 may also display the user-selected 2D or 3D image on a display screen (not shown) of the system 15. The processor 19 may be programmed in software or firmware to carry out various processing tasks described herein. Alternatively or additionally, the processor 19 may include programmable hardware logic circuits for carrying out some or all of the functions of processor 19. In some embodiments, the memory 20 may store program code, look-up tables, and/or interim computational results to enable the processor 19 to provide the functions of processor 19.

Figure 3:
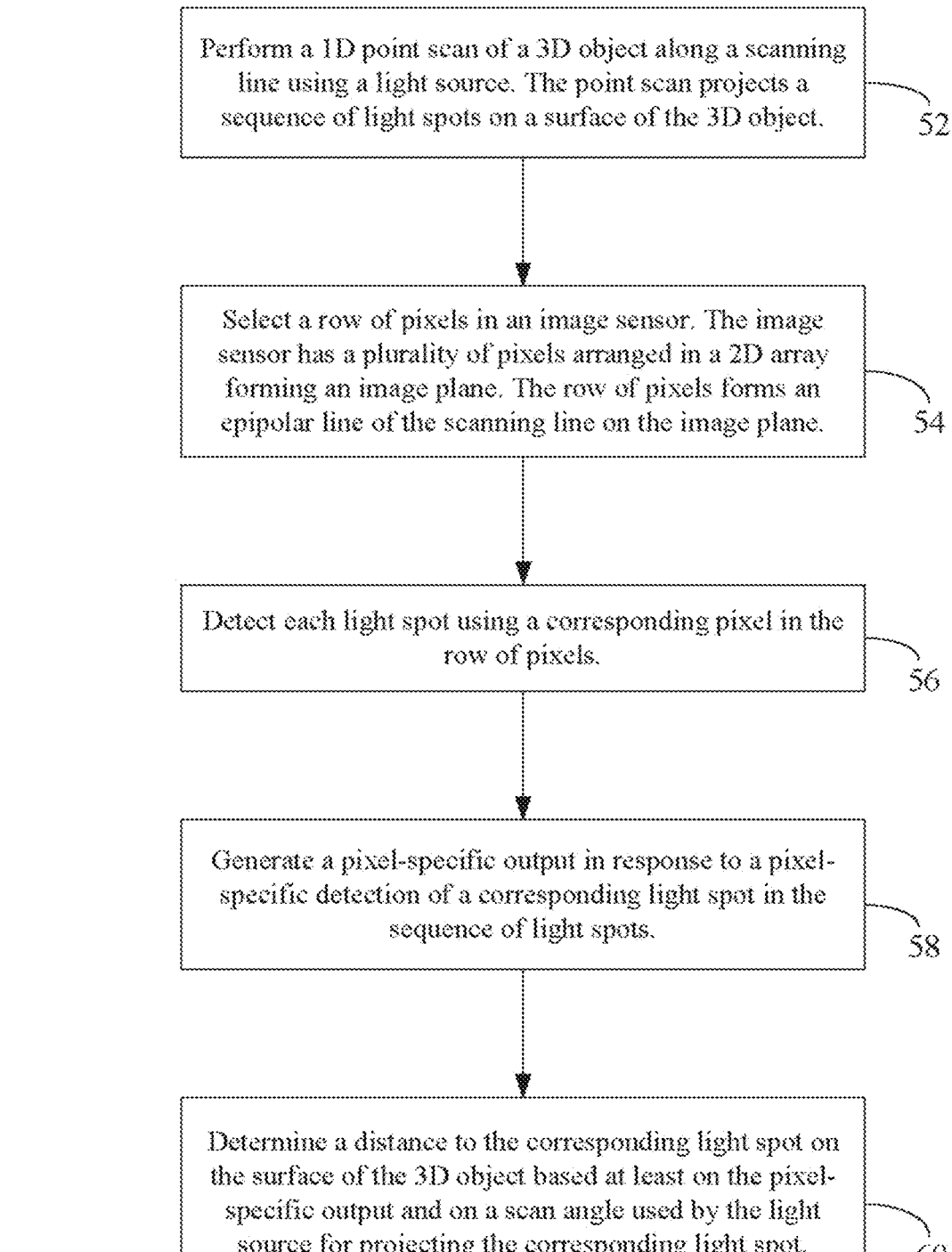
FIG. 3 depicts a flowchart of an example embodiment of how 3D-depth measurements may be performed according to the subject matter disclosed herein.

FIG. 3 depicts a flowchart 50 of an example embodiment of how 3D-depth measurements may be performed according to the subject matter disclosed herein. The various operations depicted in FIG. 3 may be performed by a single module or a combination of modules or system components in the system 15. Specific tasks are described as being performed by specific modules or system components by way of example only. Other modules or system components may be suitably configured to perform such tasks.

In FIG. 3, at operation 52, the system 15 (more specifically, the processor 19) may perform a one-dimensional (1D) point scan of a 3D object, such as the object 26 in FIG. 2, along a scanning line using a light source, such as the light-source module 22. As part of the point scan, the light-source module 22 may be configured by, for example, the processor 19, to project a sequence of light spots on a surface of the 3D object 26 in a line-by-line manner. At operation 54, the pixel-processing unit 46 in the system 15 may select a row of pixels in an image sensor, such as the 2D pixel array 42. The image sensor 42 may have a plurality of pixels arranged in a 2D array forming an image plane, the selected row of pixels forms an epipolar line of the scanning line (at operation 52) on the image plane. A brief discussion of epipolar geometry is provided below with reference to FIG. 4. At operation 56, the pixel-processing unit 46 may be operatively configured by the processor 19 to detect each light spot using a corresponding pixel in the row of pixels. It should be noted that light reflected from an illuminated light spot may be detected by a single pixel or more than one pixel, such as if the light reflected from the illuminated spot becomes focused by the collection optics 44 onto two or more adjacent pixels. It may also be possible that light reflected from two or more light spots may be collected at a single pixel in the 2D pixel array 42. A timestamp-based approach may be used to remove depth calculation-related ambiguities resulting from imaging of two different spots by the same pixel or imaging of a single spot by two different pixels. At operation 58, the pixel-processing unit 46 (as suitably configured by the processor 19) may generate a pixel-specific output in response to a pixel-specific detection (at operation 56) of a corresponding light spot in the sequence of light spots (in the point scan at operation 52). Consequently, at operation 60, the pixel-processing unit 46 may determine the 3D distance (or depth) to the corresponding light spot on the surface of the 3D object based at least on the pixel-specific output (at operation 58) and on a scan angle used by the light source for projecting the corresponding light spot (at operation 52). The depth measurement is discussed in more detail with reference to FIG. 4.

Figure 4:
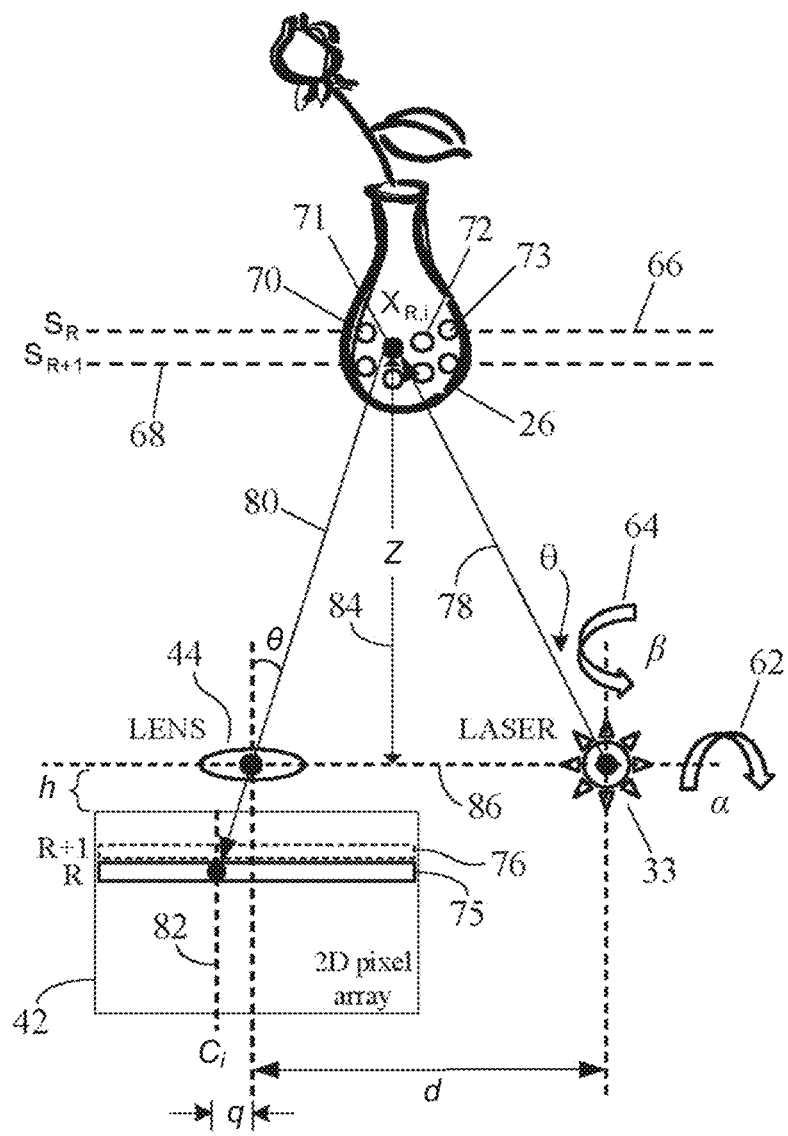
FIG. 4 depicts how an example point scan may be performed for 3D-depth measurements according to the subject matter disclosed herein.

FIG. 4 depicts how an example point scan may be performed for 3D-depth measurements according to the subject matter disclosed herein. In FIG. 4, the X-Y rotational capabilities of the laser source 33 are indicated by arrows 62 and 64 depicting the angular motions of a laser in the X-direction (having angle $\beta$) and in the Y-direction (having angle $\alpha$). In one embodiment, the laser controller 34 may control the X-Y rotation of the laser source 33 based on scanning instructions/input received from the processor 19. For example, if a user selects the 3D-imaging mode, the processor 19 may configure and control the laser controller 34 to initiate 3D-depth measurements of the object surface facing the projection optics 35. In response, the laser controller 34 may initiate a 1D X-Y point scan of the object surface through X-Y movement of the laser light source 33. As depicted in FIG. 4, the laser 33 may point scan the surface of the object 26 by projecting light spots along 1D horizontal scanning lines—two of which $S_R$ 66 and $S_{R+1}$ 68 are indicated by dotted lines in FIG. 4. Because of the curvature of the surface of the object 26, the light spots 70-73 may form the scanning line $S_R$ 66 in FIG. 4. The light spots forming the scan line $S_{R+1}$ 68 are not indicated using reference numerals. The laser 33 may, for example, scan the object 26 along rows R, R+1, and so on one spot at a time in a left-to-right direction. The values of R, R+1, and so on, are with reference to rows of pixels in the 2D pixel array 42 and are known. For example, in the 2D pixel array 42 in FIG. 4, the pixel row R is indicated using reference numeral 75 and the row R+1 is indicated using reference numeral 76. It should be understood that rows R and R+1 are selected from the plurality of rows of pixels for illustrative purposes only.

The plane containing the rows of pixels in the 2D pixel array 42 may be called the image plane, whereas the plane containing the scanning lines, such as the lines $S_R$ and $S_{R+1}$, may be called the scanning plane. In the embodiment depicted in FIG. 4, the image plane and the scanning plane are oriented using epipolar geometry such that each row of pixels R, R+1, and so on, in the 2D pixel array 42 forms an epipolar line of the corresponding scanning line $S_R$, $S_{R+1}$, and so on. A row of pixels R may be considered epipolar to a corresponding scanning line $S_R$ if a projection of an illuminated spot (in the scanning line) onto the image plane may form a distinct spot along a line that is the row R itself. For example, in FIG. 4 the arrow 78 indicates the illumination of the light spot 71 by the laser 33, whereas the arrow 80 indicates that the light spot 71 is being imaged or projected along the row R 75 by the focusing lens 44. Although not shown in FIG. 4, all of the light spots 70-73 will be imaged by corresponding pixels in the row R. Thus, in one embodiment, the physical arrangement, such as the position and orientation, of the laser 33 and the pixel array 42 may be such that illuminated light spots in a scanning line on the surface of the object 26 may be captured or detected by pixels in a corresponding row in the pixel array 42 in which that row of pixels forms an epipolar line of the scanning line.

The pixels in the 2D pixel array 42 may be arranged in rows and columns. An illuminated light spot may be referenced by the corresponding row and column in the pixel array 42. For example, in FIG. 4 the light spot 71 in the scanning line $S_R$ is designated as $X_{R,i}$ to indicate that the spot 71 may be imaged by row R and column i ($C_i$) in the pixel array 42. The column $C_i$, is indicated by dotted line 82. Other illuminated spots may be similarly identified. As noted before, it may be possible that light reflected from two or more lights spots may be received by a single pixel in a row, or, alternatively, light reflected from a single light spot may be received by more than one pixel in a row of pixels.

A timestamp-based approach may be used to remove the ambiguities in depth calculations arising from such multiple or overlapping projections.

In the depiction of FIG. 4, the arrow having reference numeral 84 represents the depth or distance Z (along the Z-axis) of the light spot 71 from the X-axis along the front of the system 15, such as the X-axis indicated in FIG. 2. In FIG. 4, a dotted line having the reference numeral 86 represents such an axis, which may be visualized as being contained in a vertical plane that also contains the projection optics 35 and the collection optics 44. For ease of explanation of the triangulation-based approach, however, the laser source 33 is shown in FIG. 4 as being on the X-axis 86 instead of the projection optics 35. In a triangulation-based approach, the value of Z may be determined using the following equation:

$$Z = \frac{hd}{q - h\tan\theta}. \quad (1)$$

in which h is the distance along the Z-axis between the collection optics 44 and the image sensor 42, which is assumed to be in a vertical plane behind the collection optics 44; d is the offset distance between the light source 33 and the collection optics 44 associated with the image-sensor unit 24; q is the offset distance between the collection optics 44 and a pixel that detects the corresponding light spot (in the example of FIG. 4, the detecting/imaging pixel i is represented by column $C_i$ associated with the light spot $X_{R,i}$ 71); and the θ is the scan angle or beam angle of the light source for the light spot under consideration (in the example of FIG. 4, the light spot 71). Alternatively, q may also be considered as the offset of the light spot within the field of view of the pixel array 42. The parameters in Eq. (1) are also indicated in FIG. 4.

From Eq. (1), it should be seen that only the parameters θ and q are variable for a given point scan, and that h and d are essentially predetermined, or fixed, based on the physical geometry of the system 15. Because the row R 75 is an epipolar line of the scanning line $S_R$, the depth difference or depth profile of the object 26 may be reflected by the image shift in the horizontal direction, as represented by the values of q for different lights spots being imaged. A timestamp-based approach may be used to find a correspondence between the pixel location of a captured light spot and the corresponding scan angle of the laser source 33. That is, a timestamp may represent an association between the values of q and θ. Thus, from the known value of the scan angle θ and the corresponding location of the imaged light spot (as represented by q), the distance Z to that light spot may be determined using the triangulation Eq. (1). Triangulation for distance measurements is also described in the relevant literature including, for example, the U.S. Patent Application Publication No. 2011/0102763 A1 to Brown et al. (Brown). Accordingly, the disclosure of the Brown publication related to triangulation-based distance measurement is incorporated herein by reference in its entirety.

Figure 5:
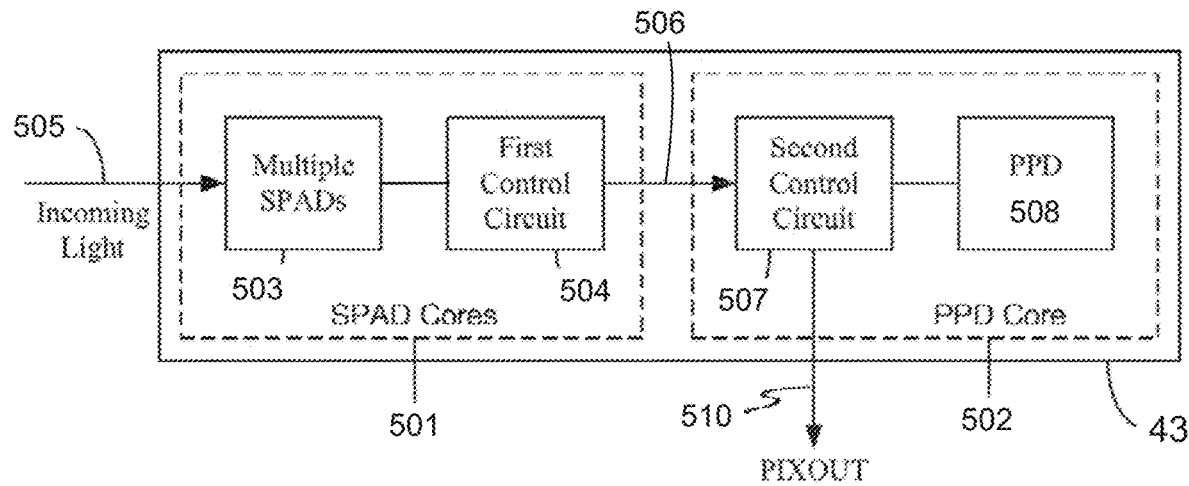
FIG. 5 depicts a block diagram of an example embodiment of a pixel according to the subject matter disclosed herein.
Figure 6A:
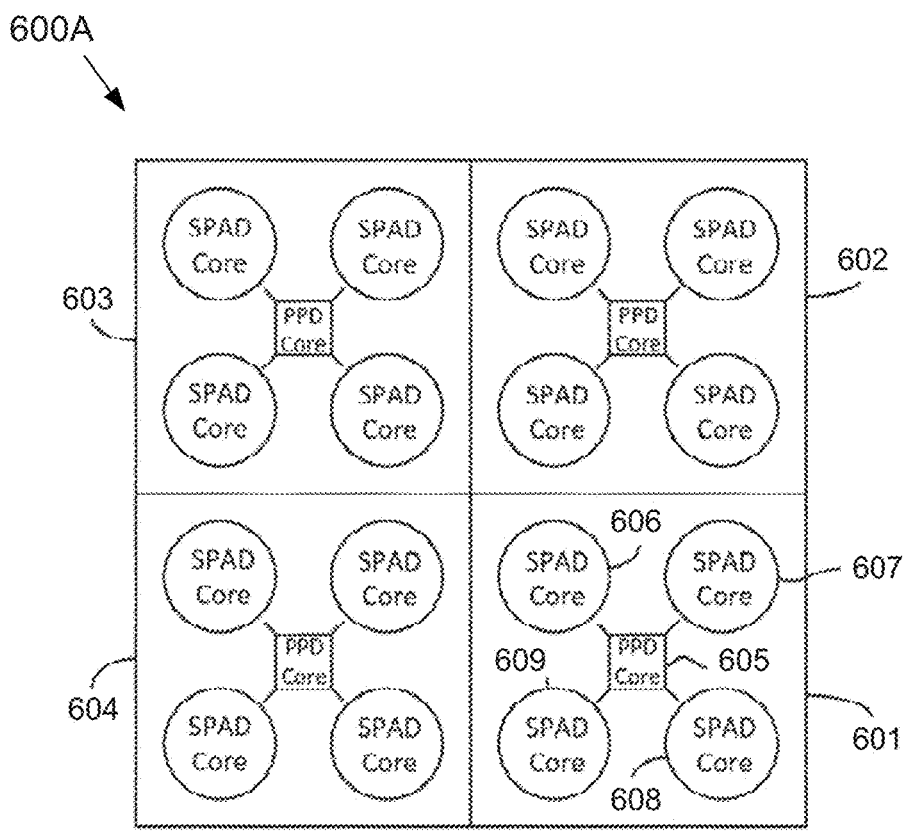
FIGS. 6A-6C respectively depict three different examples of pixel array architectures according to the subject matter disclosed herein.
Figure 6B:
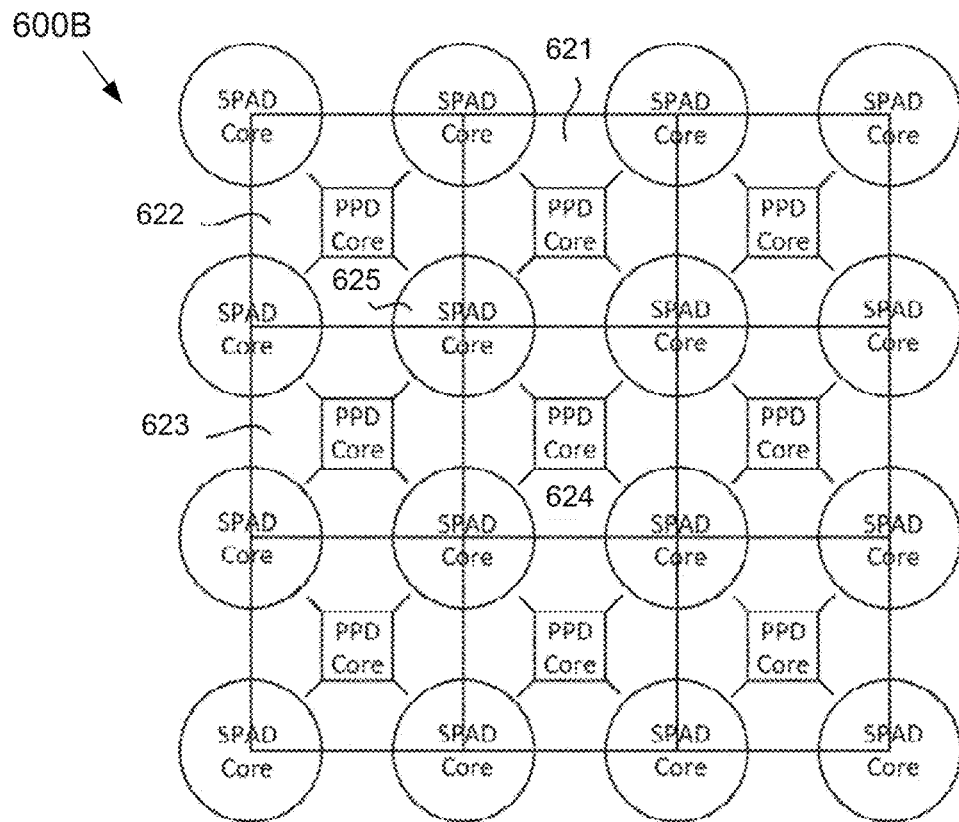
Figure 6C:
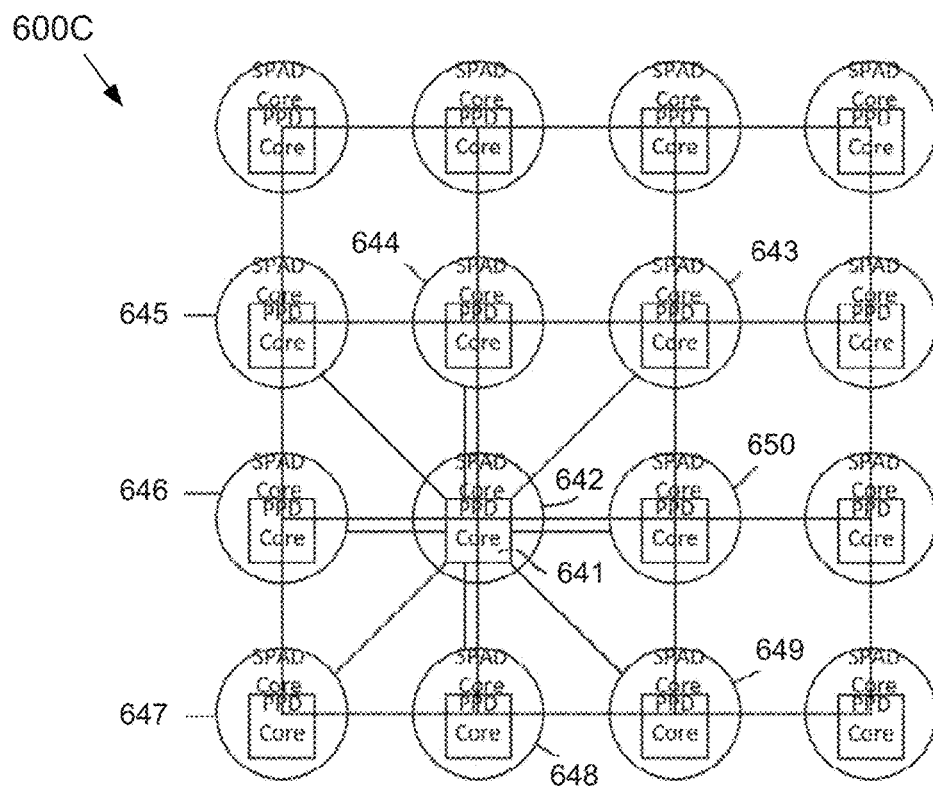

FIG. 5 depicts a block diagram of an example embodiment of a pixel, such as the pixel 43 in the pixel array 42 of FIG. 2 according to the subject matter disclosed herein. For TOF measurements, the pixel 43 may operate as a time-resolving sensor. As depicted in FIG. 5, the pixel 43 may include a SPAD core portion 501 that is electrically connected to a PPD core portion 502. Different example configurations of SPAD and PPD cores arrangements in a pixel as disclosed herein are depicted in FIGS. 6A-6C. The SPAD core portion 501 may include two or more SPADs 503 operatively connected to a first control circuit 504. One or more of the SPADs 503 may receive incoming light 505 and generate a corresponding SPAD-specific electrical signal, which is processed by the first control circuit 504 to generate a SPAD-specific digital output. All such SPAD-specific digital outputs are collectively and symbolically depicted in FIG. 5 by an arrow 506. The PPD core 502 may include a second control circuit 507 that is coupled to a PPD 508. The second control circuit 507 may receive the SPAD outputs 506 and in response control a charge transfer from the PPD 508 to generate a pixel-specific analog output (PIXOUT) 510. More specifically, as discussed in greater detail below, only when two or more of the adjacent SPADs 503 in the pixel 43 detect (reflected) photons in the incoming light 505 within a predetermined time interval, then the charge transfer from the PPD 508 is stopped by the second control circuit 507 to facilitate recording of a TOF value and a corresponding range to the 3D object 26. In other words, the spatial-temporal correlation among the outputs of at least two adjacent SPADs 503 is used to control operation of the PPD 508. For the pixel 43, the light-sensing functionality is performed by the SPADs 503, whereas the PPD 508 is used as a TCC instead of a light-sensing element. The reflected photons (of the returned light pulse 37) are correlated with the transmitted pulse 28 (as compared to uncorrelated ambient photons), so control of the transfer of charge from the PPD 508 is based on a triggering of two or more adjacent SPADs within a predetermined time interval, which provides an improved performance of the image-sensor unit 24 under strong ambient-light conditions by rejecting of ambient photons, thereby substantially preventing range-measurement errors.

FIGS. 6A-6C respectively depict three different examples of pixel array architectures according to the subject matter disclosed herein. Any of the pixel array architectures shown in FIGS. 6A-6C may be used to implement the pixel array 42 of FIG. 2. In FIG. 6A, an example 2×2 pixel array architecture 600A is depicted in which each pixel 601-604 (which may represent the pixel 43 in FIG. 5 in some embodiments) includes one pixel-specific PPD core and four pixel-specific SPAD cores. For simplicity, the PPD and SPAD cores are identified only for the pixel 601 in which the PPD core is indicated by the reference numeral 605 and the SPAD cores are indicated by the reference numerals 606-609.

The architecture 600A depicted in FIG. 6A may be considered to be a low (spatial) resolution architecture because of the physical space occupied by each pixel on the semiconductor die of a given size. As a result, a relatively fewer number of pixels may be formed in a pixel array on the die as compared to the example architecture 600B depicted in FIG. 6B, which provides a higher resolution 3×3 pixel array architecture. In the higher resolution architecture 600B in FIG. 6B, one SPAD core is shared by four (2×2) adjacent PPD cores. For example, in FIG. 6B, a SPAD core 625 is depicted shared by PPD cores of adjacent pixels 621-624 (each of which may represent a pixel 43 in FIG. 5 in some embodiments). For simplicity, other components in the pixel array architecture 600B in FIG. 6B are not identified by reference numerals. The configuration of pixel array architecture 600B in FIG. 6B in which one SPAD is shared between four adjacent pixels provides an effective ratio of 1:1 between a PPD in a pixel and the SPADs associated with the pixel.

Such sharing may be extended to be 3×3 sharing or more, as depicted by the pixel array architecture 600C in FIG. 6C. The SPAD-sharing configuration 600B depicted in FIG. 6B provides a high (spatial) resolution architecture for a pixel array because more pixels may be formed in the pixel array if each SPAD is shared among neighboring pixels on the die, thereby making more space on the die available to accommodate more pixels. Additionally, because a pixel in the pixel array architecture 600B in FIG. 6B has a single PPD core associated with four SPAD cores in a 2×2 configuration, up to four coincident photons may be detected by each pixel (i.e., one photon per SPAD).

FIGS. 6A and 6B depict example pixel array architectures in which PPDs and SPADs that may be realized in a single die. That is, SPADs and PPDs are on the same level in the die. In contrast, FIG. 6C depicts an example 4×4 pixel array architecture 600C in which the pixels may be realized in stacked dies. For example, the SPAD cores may be realized in an upper die and the PPD cores (and readout circuits) may be realized in a lower die. Thus, PPDs and SPADs may be on two different dies, which may be stacked and circuit elements (PPDs, SPADs, transistors, and the like) on these dies may be electrically connected by wires or metal bumps. Like the architecture 600B in FIG. 6B, the pixel array architecture 600C in FIG. 6C may also provide a high resolution architecture in which a single SPAD core may be shared by nine (3×3) adjacent PPD cores. Equivalently, as shown in FIG. 6C, a single PPD core, such as the PPD core 641, may be associated with nine SPAD cores, such as the SPAD cores 642-650, to form a single pixel. The SPAD cores 642-650 also may be shared by other pixels. For simplicity, other pixels, their PPD cores, and associated SPAD cores are not indicated by reference numerals in FIG. 6C. Additionally, because a pixel in the pixel array architecture 600C in FIG. 6C has a single PPD core associated with nine SPAD cores in a 3×3 configuration, up to nine coincident photons may be detected by each pixel (i.e., one photon per SPAD).

Figure 7:
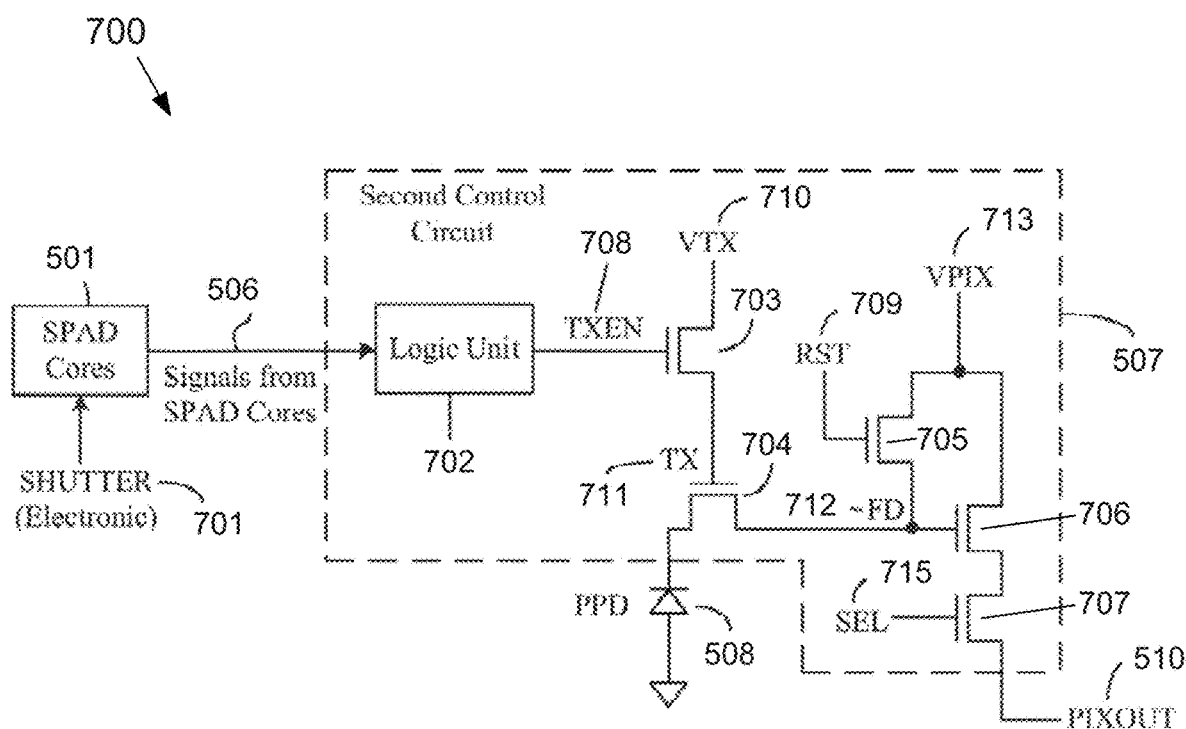
FIG. 7 depicts circuit details of an example embodiment of a pixel according to the subject matter disclosed herein.

FIG. 7 depicts circuit details of an example embodiment of a pixel 700 according to the subject matter disclosed herein. The pixel 700 depicted in FIG. 7 may be an example of a more generic pixel 43 depicted in FIGS. 2 and 5. An electronic shutter signal 701 may be provided to each pixel (as discussed in more detail later with reference to the timing diagrams in FIGS. 8, 9 and 14 to enable the pixel 700 to capture the pixel-specific photoelectrons caused by the returned light pulse 37 in a temporally-correlated manner. More generally, the pixel 700 may be considered to have a charge-transfer-trigger portion, a charge-generation-and-transfer portion, and a charge-collection-and-output portion. The charge-transfer-trigger portion may include the SPAD cores 501 and a logic unit 702. The charge-generation-and-transfer-portion may include the PPD 508, a first N-channel Metal Oxide Semiconductor Field Effect Transistor (NMOSFET or NMOS transistor) 703, a second NMOS transistor 704, and a third NMOS transistor 705. The charge-collection-and-output portion may include the third NMOS transistor 705, a fourth NMOS transistor 706, and a fifth NMOS transistor 707. In some embodiments, the PPD core in the pixel 700 in FIG. 7 and that in the pixel 900 in FIG. 13 may be formed of P-channel Metal Oxide Semiconductor Field Effect Transistors (PMOSFETs or PMOS transistors) or other different types of transistors or charge transfer devices. Additionally, the respective portions of the pixel 700 described herein is for illustrative and discussion purposes only. In some embodiments, the portions may include more, fewer and/or different circuit elements than those described herein.

The PPD 508 may store a charge similar to a capacitor. In one embodiment, the PPD 508 may be covered and, consequently, does not respond to light. Thus, the PPD 508 may be used as a TCC instead of a light-sensing element. As previously noted, however, a light-sensing functionality may be accomplished by the SPADs in the SPAD cores 501. In some embodiments, a photogate or other semiconductor device (having suitable modifications) may be used instead of a PPD in the pixel configurations of FIGS. 7 and 13.

The charge-transfer-trigger portion may generate a Transfer Enable (TXEN) signal 708 under the control of the electronic shutter signal 701 to trigger the transfer of charge stored in the PPD 508. A SPAD may detect a photon (referred herein as a "photon detection event") in the light pulse that was transmitted and reflected from an object, such as the object 26 in FIG. 2, and output a pulse signal, which may be latched under the operative control of the shutter signal 701 for subsequent processing by the logic unit 702. The logic unit 702 may include logic circuits to process all digital SPAD outputs 506 to generate the TXEN signal 708 when outputs 506 are received from at least two adjacent SPADs within a pre-defined time interval while, for example, the shutter signal 701 is active.

Figure 13:
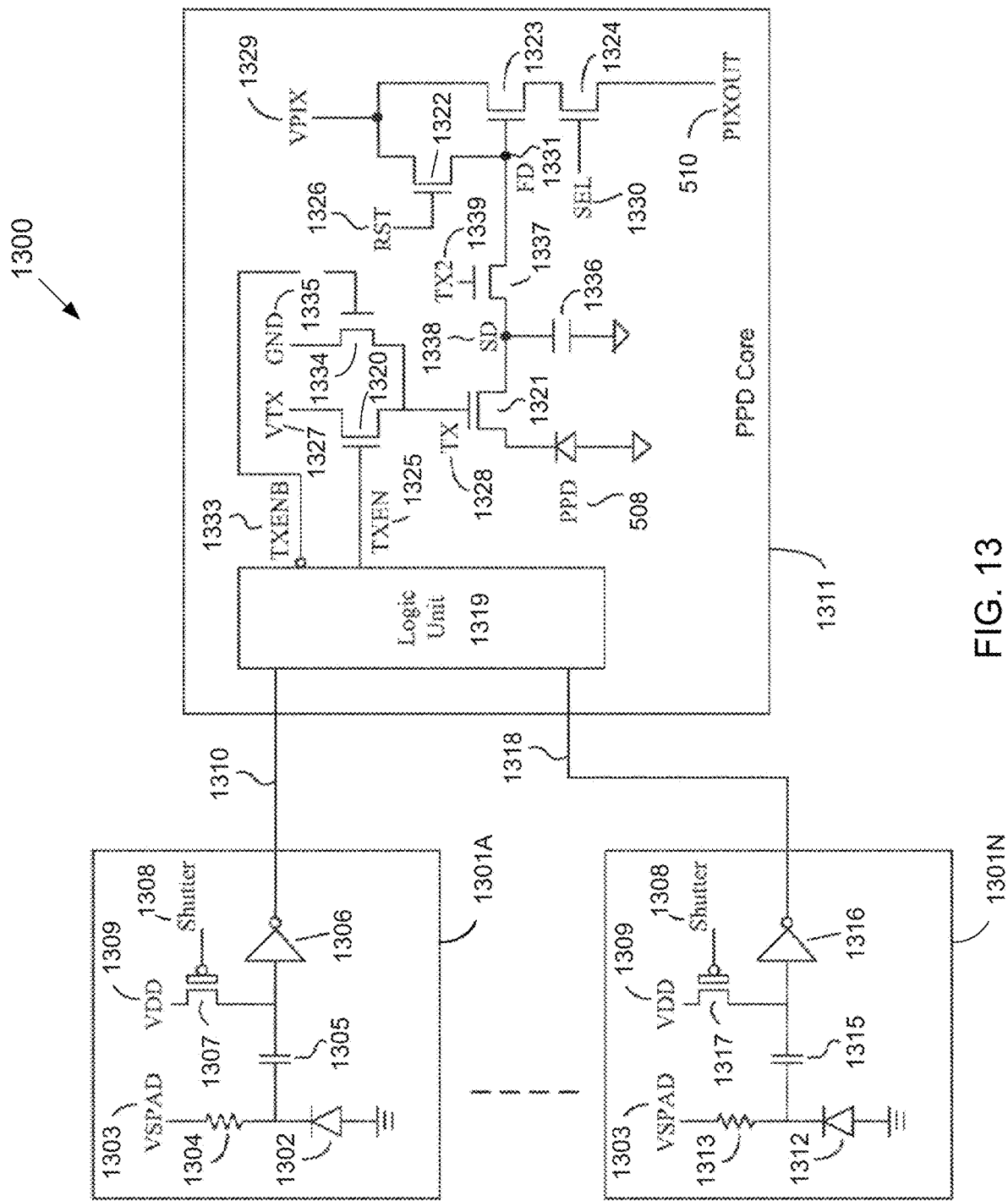
FIG. 13 depicts another example embodiment of a pixel according to the subject matter disclosed herein.

In the charge-generation-and-transfer portion, the PPD 508 may be initially set to its full well capacity using a Reset RST signal 709 in conjunction with the third transistor 705. The first transistor 703 may receive a Transfer Voltage VTX signal 710 at the drain terminal and the TXEN signal 708 at the gate terminal of the transistor 703. A TX signal 711 may be available at the source terminal of the first transistor 703 and applied to the gate terminal of the second transistor 704. As depicted, the source terminal of the first transistor 703 may be connected to the gate terminal of the second transistor 704. The VTX signal 710 (or, equivalently, the TX signal 711) may be used as an amplitude modulating signal to control the charge to be transferred from the PPD 508, which may be connected to the source terminal of the transistor 704. The transistor 704 may transfer the charge on the PPD 508 from the source terminal to the drain terminal of the transistor 704, which may connect to the gate terminal of the transistor 706 and form a charge "collection site" referred to herein as a floating diffusion (FD) node/junction 712. In some embodiments, the charge transferred from the PPD 508 may depend on the modulation provided by the amplitude modulating signal 710 (or, equivalently, the TX signal 711). In the embodiments of FIGS. 7 and 13, the charge transferred is electrons. The subject matter disclosed herein is, however, not limited to the present disclosure and a PPD having a different design may be used in which the charge transferred may be holes.

In the charge-collection-and-output portion, the third transistor 705 may receive the RST signal 709 at the gate terminal of the transistor 705 and a Pixel Voltage VPIX signal 713 at the drain terminal of the transistor 705. The source terminal of the transistor 705 may be connected to the floating diffusion 712. In one embodiment, the voltage level of the VPIX signal 713 may equal to the voltage level of the generic supply voltage VDD and may be in the range of 2.5 V to 3.0 V. The drain terminal of the transistor 706 also may receive the VPIX signal 713. In some embodiments, the transistor 706 may operate as an NMOS source follower to function as a buffer amplifier. The source terminal of the transistor 706 may be connected to the drain terminal of the transistor 707, which may be in cascode with the source follower 706 and receiving a Select SEL signal 714 at the gate terminal of the transistor 707. The charge transferred from the PPD 508 and collected at the floating diffusion 712 may appear as the pixel-specific output PIXOUT data line 510 at the source terminal of the transistor 707.

The charge transferred from the PPD 508 to FD 712 is controlled by the VTX signal 710 (and the TX signal 711). The amount of charge reaching the floating diffusion 712 is modulated by the TX signal 711. In one embodiment, the voltage VTX 710 (and TX 711) may be ramped to gradually transfer charge from the PPD 508 to the floating diffusion 712. Thus, the amount of charge transferred may be a function of the amplitude modulating voltage TX 711, and the ramping of the TX voltage 711 is a function of time. Hence, the amount of charge transferred from the PPD 508 to the floating diffusion 712 is also a function of time. If, during the transfer of charge from the PPD 508 to floating diffusion 712, the transistor 704 is turned off due to the generation of the TXEN signal 708 by the logic unit 702 upon photo-detection events for at least two adjacent SPADs in the SPAD cores 501, the transfer of charge from the PPD 508 to the floating diffusion 712 stops. Consequently, the amount of charge transferred to the floating diffusion 712 and the amount of charge remaining in the PPD 508 are both a function of the TOF of the incoming photon(s). The result is a time-to-charge conversion and a single-ended-to-differential signal conversion. The PPD 508 thus operates as a time-to-charge converter (TCC). The more of the charge is transferred to the floating diffusion 712, the more the voltage decreases on the floating diffusion 712 and the more the voltage increases on the PPD 508.

The voltage at the floating diffusion 712 may be subsequently transferred as the PIXOUT signal to an analog-to-digital converter (ADC) unit (not shown) through the transistor 707 and converted into an appropriate digital signal/value for further processing. More details of the timing and operation of various signals in FIG. 7 are provided with reference to discussion of FIG. 9. In the embodiment of FIG. 7, the transistor 707 may receive the SEL signal 714 for selecting the pixel 700 to readout the charge in the floating diffusion 714 as a PIXOUT1 (or Pixel Output 1) voltage and the remaining charge in the PPD 508 as a PIXOUT2 (or Pixel Output 2) voltage after it is completely transferred to the floating diffusion 712 in which the floating diffusion 712 converts a charge on the PPD 508 to a voltage and the pixel output data line 510 sequentially outputs PIXOUT1 and PIXOUT2 signals as discussed later with reference to FIG. 10. In another embodiment, either the PIXOUT1 signal or the PIXOUT2 signal, but not both may be read out.

Figure 8:
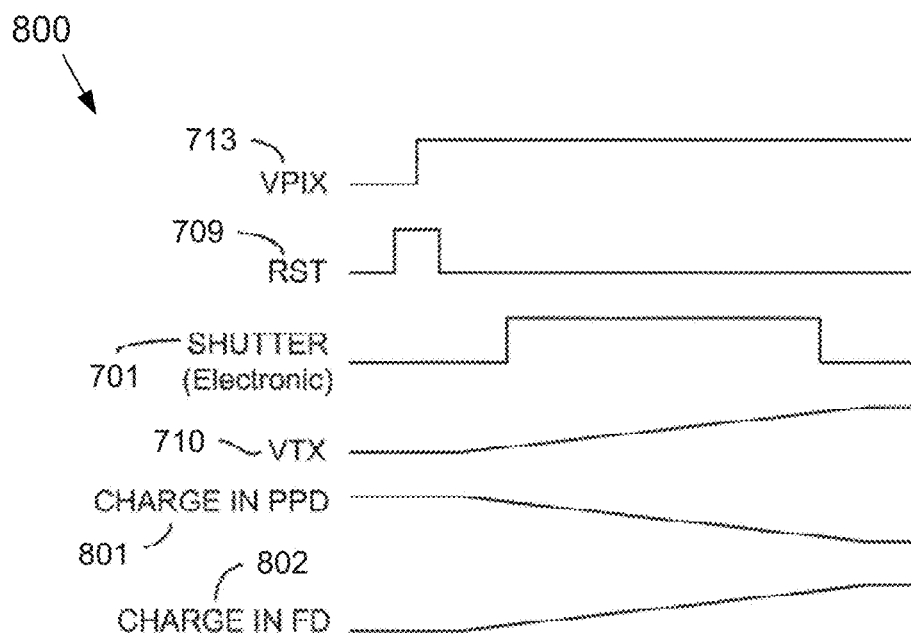
FIG. 8 is an example timing diagram that provides an overview of the modulated charge transfer mechanism in the pixel of FIG. 7 according to the subject matter disclosed herein.

FIG. 8 is an example timing diagram 800 that provides an overview of the modulated charge transfer mechanism in the pixel 700 of FIG. 7 according to the subject matter disclosed herein. The waveforms shown in FIG. 8 (and also in FIGS. 9 and 14) are simplified in nature and are for illustrative purpose only; the actual waveforms may differ in timing as well as shape depending on the circuit implementation. The signals that are common between FIGS. 7 and 8 are identified using the same reference numerals, and include the VPIX signal 713, the RST signal 709, the electronic shutter signal 701, and the VTX modulating signal 710. Two additional waveforms 801 and 802 are also depicted in FIG. 8 to respectively show the status of the charge in PPD 508 and that in the floating diffusion 712 when the modulating signal 710 is applied during charge transfer. In the embodiment of FIG. 8, the VPIX signal 713 may start as a low logic voltage (for example, logic 0 or 0 V) to initialize the pixel 700 and switch to a high logic voltage (for example, logic 1 or 3 V)) during operation of the pixel 700. The reset RST signal 709 may start with a high logic voltage pulse (for example, a pulse that goes from logic 0 to logic 1 and back to logic 0) during the initialization of the pixel 700 to set the charge in the PPD 508 to its full well capacity and set the charge in the floating diffusion 712 to zero Coulombs (0 C). The reset voltage level for floating diffusion 712 may be a logic 1 level. During a range (TOF) measurement operation, the more electrons the floating diffusion 712 receives from the PPD 508, the lower the voltage on the floating diffusion 712 becomes. The shutter signal 701 may start with a low logic voltage (for example, logic 0 or 0 V) during the initialization of the pixel 700, switch to a logic 1 level (for example, 3 V) at a time that corresponds to the minimum measurement range during operation of the pixel 700 to enable the SPADs 503 in the SPAD cores 501 to detect the photon(s) in the returned light pulse 37, and then switch to a logic 0 level (for example, 0 V) at a time that corresponds to the maximum measurement range. Thus, the duration of the logic 1 level of the shutter signal 701 may provide a pre-defined time interval/window such that the outputs received from adjacent SPADs during that time interval have spatial and temporal correlation. The charge in the PPD 508 starts out fully charged during initialization and decreases as the VTX signal 710 is ramped from 0 V to a higher voltage, preferably in a linear fashion. The PPD charge level under the control of the amplitude modulating signal VTX 710 is depicted by waveform having a reference numeral 810 in FIG. 8. The PPD charge decrease may be a function of how long VTX ramps, which results in a transfer of a certain amount of charge from the PPD 508 to the floating diffusion 712. Thus, as depicted by the waveform with reference numeral 801 in FIG. 8, a charge in floating diffusion 712 starts out at a low charge (for example, 0 C) and increases as the VTX signal 710 is ramped from 0 V to a higher voltage, which partially transfers a certain amount of charge from the PPD 508 to the floating diffusion 712. The charge transfer is a function of how long the VTX signal 710 ramps.

As noted before, the pixel-specific output on the data line (PIXOUT) 510 is derived from the PPD charge transferred to the floating diffusion 712. Thus, the PIXOUT signal 510 may be considered to be amplitude modulated over time by the amplitude modulating voltage VTX 710 (or, equivalently, the TX voltage 711). In this manner, the TOF information is provided through amplitude modulation of the pixel-specific output 715 using the modulating signal VTX 710 (or, equivalently, the TX signal 711). In some embodiments, the modulating function for generating the VTX signal 710 may be monotonic. In the example embodiments depicted in FIGS. 8, 9 and 14, the amplitude modulating signals may be generated using a ramp function and, hence, they are shown as having ramp-type waveforms. In other embodiments, however, different types of analog waveforms/functions may be used as modulating signals.

In one embodiment, the ratio of one pixel output (for example, PIXOUT1) to the sum of the two pixel outputs (here, PIXOUT1+PIXOUT2) may be proportional to the time difference of time difference of $T_{tof}$ and $T_{dly}$ values, which are shown, for example, in FIG. 9 and discussed in more detail later below. In case of the pixel 700, for example, the parameter $T_{tof}$ may be a pixel-specific TOF value of a light signal received by two or more SPADs in the SPAD cores 501 and the delay time parameter $T_{dly}$ may be the time from when the light signal 28 was initially transmitted until the VTX signal 710 starts to ramp. The delay time $T_{dly}$ may be negative if the light pulse 28 is transmitted after the VTX signal 710 starts to ramp, which may typically occur when the electronic shutter 701 is opened. The proportionality relation may be represented by:

$$\frac{Pixout1}{Pixout1 + Pixout2} \propto (T_{tof} - T_{dly}). \quad (2)$$

The subject matter disclosed herein, however, is not limited to the relationship of Eq. (2). As discussed below, the ratio in Eq. (2) may be used to calculate depth or distance of an object, and is less sensitive to pixel-to-pixel variations if Pixout1+Pixout2 is not always the same.

For convenience, the term "P1" may be used to refer to "Pixout1" and the term "P2" may be used to refer to "Pixout2" as used herein. It may be seen from the relationship in Eq. (2) that the pixel-specific TOF value may be determined as a ratio of the pixel-specific output values P1 and P2. In some embodiments, once the pixel-specific TOF value is so determined, the pixel-specific distance D or range R to an object (such as the object 26 in FIG. 2) or a specific location on the object may be given by:

$$D = T_{tof} * \frac{c}{2} \quad (3)$$

in which c is the speed of light. Alternatively, in some embodiments in which the modulating signal, such as the VTX signal 710 (or the TX signal 711) in FIG. 7, for example, is linear inside a shutter window, the range/distance may be computed as:

$$D = \frac{c}{2} * \left( \frac{P_1}{P_1 + P_2} + T_{dly} \right). \quad (4)$$

Consequently, a 3D image of the object, such as the object 26, may be generated by the TOF system 15 based on the pixel-specific range values determined as given above.

The amplitude modulation-based manipulation or control of the PPD charge distribution inside a pixel provides that the range measurement and resolution are also controllable. The pixel-level amplitude modulation of the PPD charge may work with an electronic shutter that may be a rolling shutter as, for example, in a complementary metal oxide semiconductor (CMOS) image sensor, or a global shutter as, for example, in a charge coupled device (CCD) image sensor. Although the disclosure herein may be primarily provided in the context of a one-pulse TOF imaging system, like the system 15 in FIGS. 1 and 2, the principles of pixel-level internal amplitude modulation approach discussed herein may be implemented, with suitable modifications (if needed), in a continuous wave modulation TOF imaging system or a non-TOF system as well with pixels 43 (FIG. 5).

Figure 9:
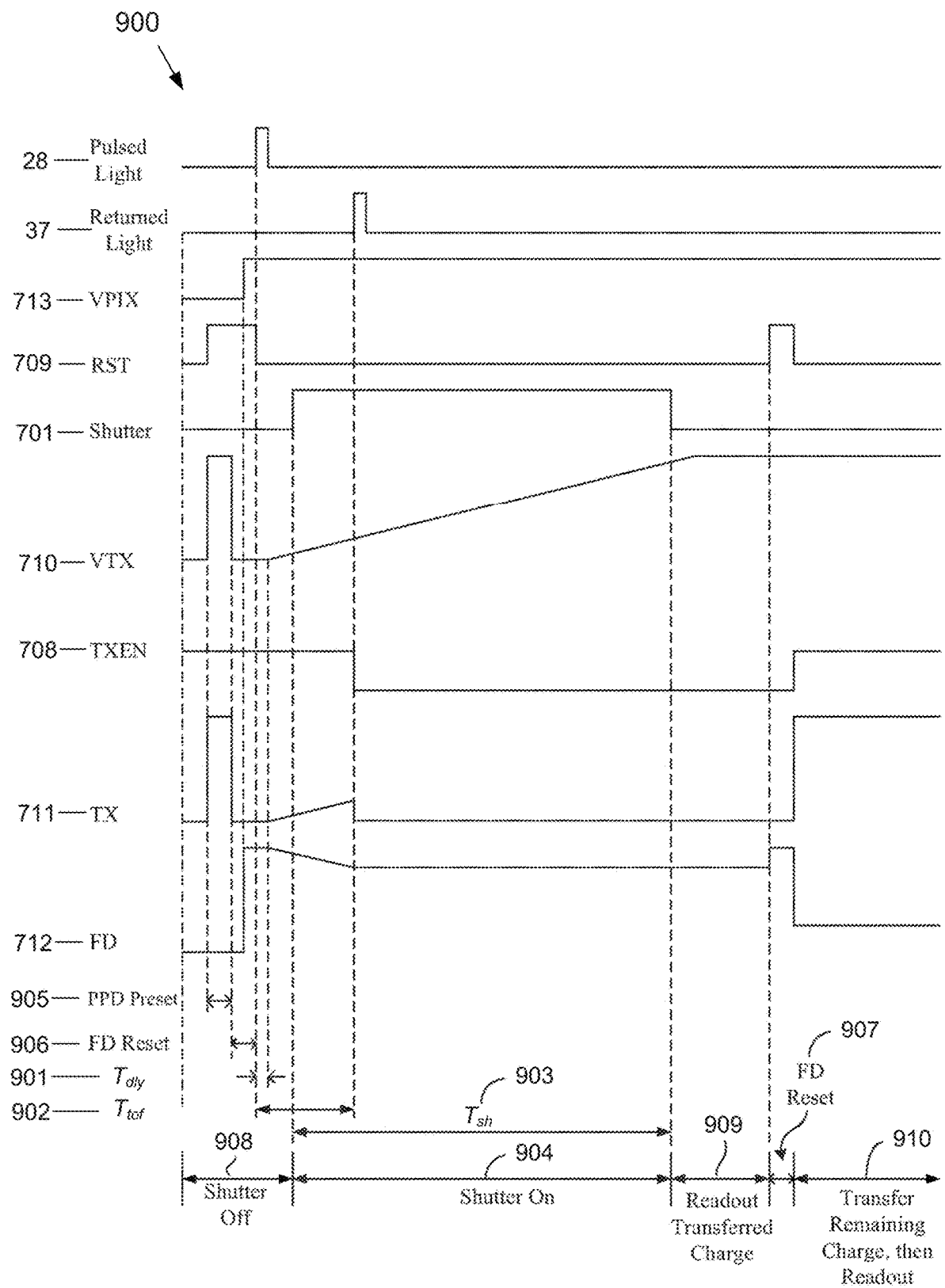
FIG. 9 is a timing diagram of an example timing of the different signals in the image-sensor system of FIGS. 1 and 2 when pixels in the embodiment of FIG. 7 are used in a pixel array for measuring TOF values according to the subject matter disclosed herein.
Figure 12:
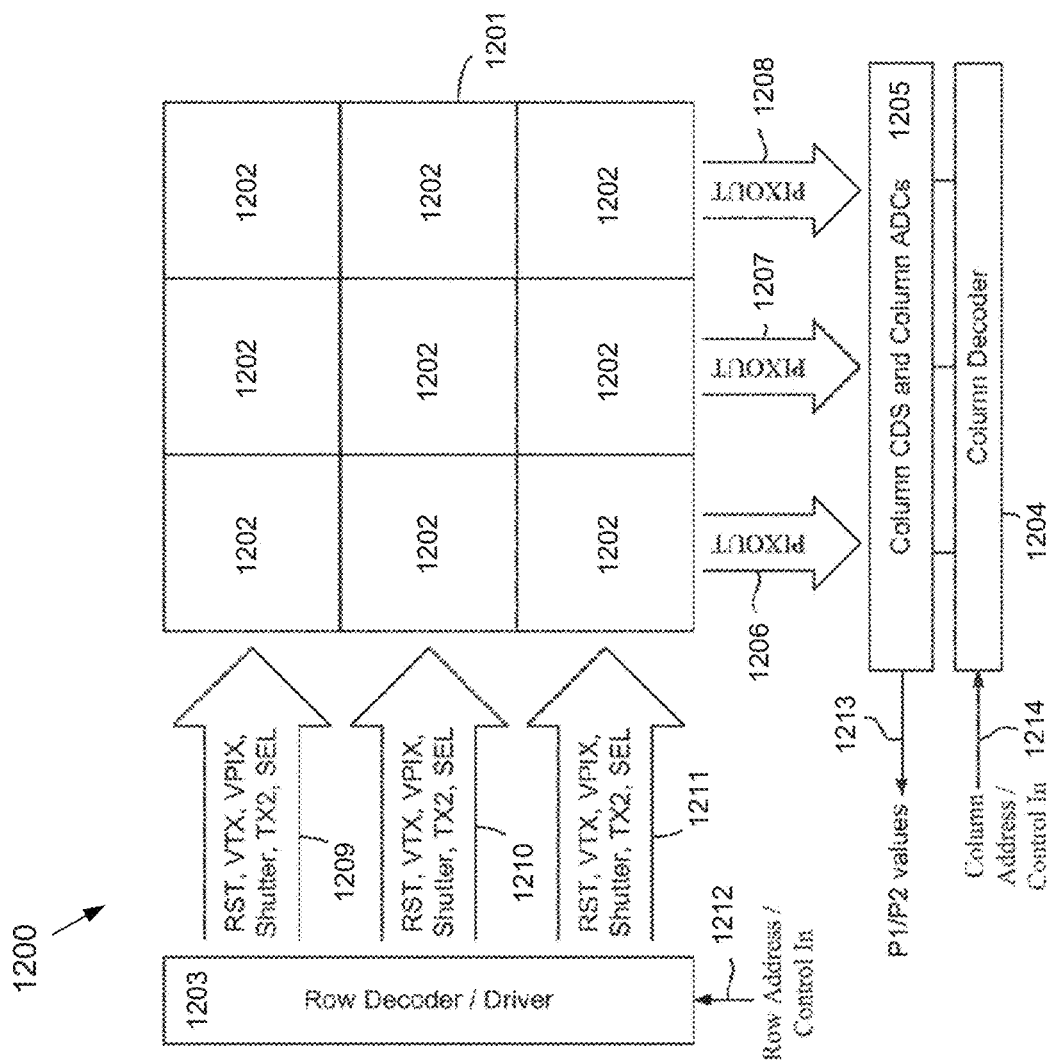
FIG. 12 is an example layout of a portion of an image-sensor unit according to the subject matter disclosed herein.

FIG. 9 is a timing diagram 900 of an example timing of the different signals in the system 15 of FIGS. 1 and 2 when pixels 700 in the embodiment of FIG. 7 are used in a pixel array, such as the pixel array 42 in FIGS. 2 and 12, for measuring TOF values according to the subject matter disclosed herein. Various signals, such as the transmitted pulse 28, the VPIX signal 713, the TXEN input 708, and the like, depicted in the embodiments of FIGS. 2 and 7 are identified in FIG. 9 using the same reference numerals. Prior to the discussion of FIG. 9, it should be noted that, in the context of FIG. 9 (and also in case of FIG. 14), the parameter $T_{dly}$ refers to the time delay between the rising edge of the projected pulse 28 and the time instance when the VTX signal 710 starts to ramp, as indicated by the reference numeral 901; the parameter $T_{tof}$ refers to the pixel-specific TOF value as measured by the delay between the rising edges of the projected pulse 28 and the received pulse 37, as indicated by the reference numeral 902; and the parameter $T_{sh}$ refers to the time period between the opening and the closing of the electronic shutter, as indicated by the reference numeral 903 and given by the assertion (for example, logic 1 or on) and de-assertion (or deactivation) (for example, logic 0 or off) of the shutter signal 701. Thus, the electronic shutter 701 is considered to be active during the period $T_{sh}$, which is also identified using the reference numeral 904. In some embodiments, the delay $T_{dly}$ may be predetermined and fixed regardless of operating conditions. In other embodiments, the delay $T_{dly}$ may be adjustable at run-time depending on, for example, the external weather condition. It is noted here that the high or low signal levels relate to the design of the pixel 700. The signal polarities or bias levels shown in FIG. 9 may be different in other types of pixel designs based on, for example, the types of transistors or other circuit components used.

As noted before, the waveforms shown in FIG. 9 (and also in FIG. 14) are simplified in nature and are for illustrative purpose only; the actual waveforms may differ in timing as well as shape depending on the circuit implementation. As shown in FIG. 9, the returned pulse 37 may be a time-wise delayed version of the projected pulse 28. In some embodiments, the projected pulse 28 may be of a very short duration such as, for example, in the range of about 5 ns to about 10 ns. The returned pulse 37 may be sensed using two or more SPADs in the pixel 700. The electronic shutter signal 701 may enable the SPADs to capture the pixel-specific photon(s) in the received light 37. The shutter signal 701 may have a gated delay (with reference to the projected pulse 28) to avoid the light scatters from reaching the pixel array 42. The light scatters of the projected pulse 28 may occur, for example, due to an inclement weather.

In addition to various external signals (for example, VPIX 713, RST 709, and the like) and internal signals (for example, TX 711, TXEN 708, and the floating diffusion voltage 712), the timing diagram 900 in FIG. 9 also identifies the following events or time periods: (i) a PPD preset event 905 when RST, VTX, TXEN, and TX signals are high, while VPIX 713 and shutter signals 701 are low; (ii) a first floating diffusion reset event 906 from when TX is low until RST turns from high to low; (iii) the delay time $T_{dly}$ 901; (iv) the time of flight $T_{tof}$ 902; (v) the electronic shutter on or active period $T_{sh}$ 903; and (vi) a second FD reset event 907 for the duration of when the RST signal 709 is a logic 1 for a second time. FIG. 9 also illustrates when the electronic shutter is closed or off initially (which is indicated by reference numeral 908), when the electronic shutter is open or on (which is indicated by the reference numeral 904), when the charge initially transferred to the floating diffusion 712 is read out through the PIXOUT data line 510 (which is indicated by reference numeral 909), when the floating diffusion 712 voltage is reset a second time at 907, and when the remaining charge in PPD 508 is transferred to floating diffusion 712 and again readout at event 910 (for example, as an output to PIXOUT 510). In one embodiment, the shutter on period $T_{sh}$ may be less than or equal to the ramping time of the VTX signal 710.

Referring to FIG. 9, in case of the pixel 700 in FIG. 7, the PPD 508 may be filled with charge to its full well capacity at an initialization stage (for example, the PPD Preset event 905). During the PPD preset time 905, the RST 709, VTX 710, TXEN 708 and TX 711 signals may be high, whereas the VPIX 713, shutter 710, and TXEN 708 signals may be low, as shown. Then, the VTX signal 710 (and the TX signal 711) may go low to shut off the transistor 704 and the VPIX signal 713 may go high to commence the charge transfer from the fully-charged PPD 508. In some embodiments, all pixels in a row of pixels in the pixel array 42 may be selected together at a time and PPDs in all of the pixels in the selected row may be reset together using the RST signal 709. Each pixel in the selected row of pixels may be read individually and the analog-based pixout signal may be converted to a digital value by the corresponding column ADC unit (not shown). In one embodiment, the RST lines may remain high or on for unselected rows of pixels to prevent blooming.

In the embodiment shown in FIG. 9, all signals, except the TXEN signal 708, start at logic 0 or low level as shown. Initially, the PPD 508 is preset when the RST 709, VTX 710, TXEN 708 and TX 711 signals go to a logic 1 level, and the VPIX signal 713 stays low. Thereafter, the floating diffusion 712 is reset while the RST 709 signal is a logic 1, when the VTX 710 and TX 711 signal go to a logic 0 and the VPIX 713 signal goes to high (or a logic 1). For convenience, the same reference numeral 712 is used to refer to the floating diffusion in FIG. 7 and associated voltage waveform in the timing diagram of FIG. 9. After the floating diffusion 712 is reset to high (for example, 0 C in charge domain), the VTX 710 signal is ramped while TXEN 708 signal is a logic 1. The time of flight $T_{tof}$ duration 901 is from when the pulsed light 28 is transmitted until the returned light 37 is received, and is also the time during which charge is transferred partially from the PPD 508 to the floating diffusion 712. The VTX input 710 (and the TX input 711) may be ramped while the shutter 701 is on or open. This may cause an amount of charge in the PPD 508 to be transferred to the floating diffusion 712, which may be a function of how long VTX ramps. When a transmitted pulse 28 reflects off of the object 26 and is received by at least two SPADs in the SPAD cores 501 of the pixel 700, the generated SPAD outputs 506 may be processed by the logic unit 702, which, in turn, may cause the TXEN signal 708 to become a static logic 0. Thus, detection of the returned light 37 by at least two adjacent SPADs in a temporally-correlated manner (i.e., when the shutter is on or active) may be indicated by a logic 0 level for the TXEN signal 708. The logic low level of the TXEN input 708 turns off the transistor 703 and the transistor 704, which stops the transfer of charge to floating diffusion 712 from the PPD 508. When the shutter input 701 goes to a logic 0 and the SEL input 714 (not shown in FIG. 9) goes to a logic 1, the charge in floating diffusion 712 is output as a voltage PIXOUT1 onto the PIXOUT line 510. Then, the floating diffusion 712 may be reset again (as indicated at reference numeral 907) with a logic high RST pulse 709. Thereafter, when the TXEN signal 708 goes to a logic 1, the remaining charge in the PPD 508 is substantially completely transferred to the floating diffusion 712 and output as a voltage PIXOUT2 onto PIXOUT line 510. As mentioned earlier, the PIXOUT1 and PIXOUT2 signals may be converted into corresponding digital values P1 and P2 by an appropriate ADC unit (not shown). In certain embodiments, these P1 and P2 values may be used in Eq. (3) or Eq. (4) to determine a pixel-specific distance/range between the pixel 700 and the object 26.

Figure 14:
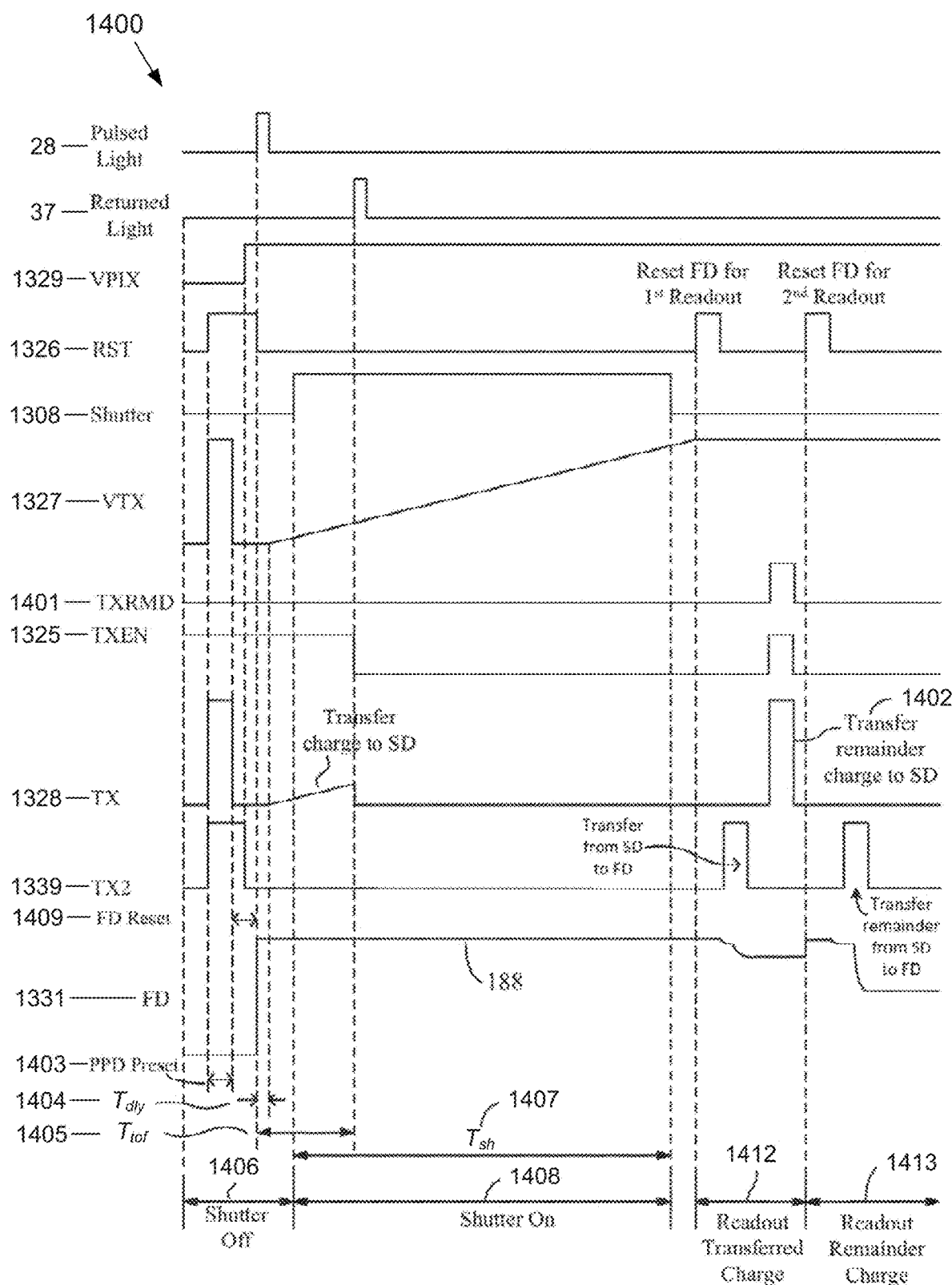
FIG. 14 is a timing diagram of an example timing of different signals in the image-sensor system of FIGS. 1 and 2 when pixels in the embodiment depicted in FIG. 13 are used in a pixel array for measuring TOF values according to the subject matter disclosed herein.

In one embodiment, the logic unit 702 may include logic circuits (not shown) to generate an output based on a G( ) function (shown and discussed with reference to FIG. 10) and then logically OR the output with an internally-generated signal, such as a signal similar to the TXRMD signal 1401 shown in FIG. 14, to obtain the final TXEN signal 708. Such internally-generated signal may remain low while the electronic shutter is on, but may be asserted high so that the TXEN signal 708 goes to a logic 1 to facilitate the transfer of the remaining charge in the PPD (at event 910 in FIG. 9). In some embodiments, the TXRMD signal or a similar signal may be externally-supplied.

Figure 10:
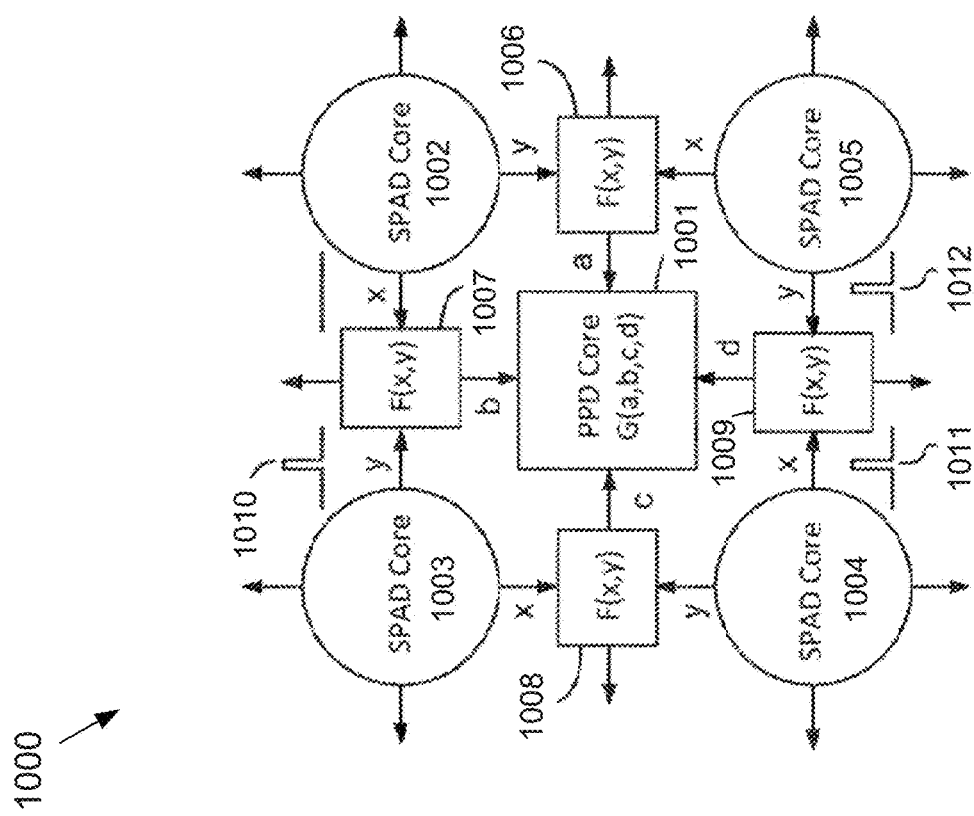
FIG. 10 shows how a logic unit may be implemented in a pixel according to the subject matter disclosed herein.

FIG. 10 shows how a logic unit, such as the logic unit 702 (FIG. 7) or the logic unit 1319 (FIG. 13), may be implemented in a pixel, such as the pixel 700 (FIG. 7) or the pixel 1300 (FIG. 13), according to the subject matter disclosed herein. FIG. 10 shows a highly simplified diagram of a pixel 1000 (which may represent any of the pixels 700 or 1300) having a PPD core 1001 associated with four SPAD cores 1002-1005 in a 2×2 architectural configuration like that depicted in FIG. 6A or FIG. 6B. The availability of four SPADs allows for detection of up to four coincident photons that are temporally and spatially correlated. In some embodiments, the logic unit (not shown) in the pixel 1000 may include logic circuits (not shown) that implement the functions F(x,y) and G(a,b,c,d) depicted in FIG. 10. The blocks 1006-1009 in FIG. 10 depict the inputs and outputs of the logic circuits implementing the F(x,y) function. Accordingly, the blocks 1006-1009 may be considered to represent such logic circuits and to collectively form a part of the logic unit of the pixel 1000. For ease of discussion, these blocks may be referred to as F(x,y) blocks. Although the blocks 1006-1009 are shown external to the PPD core 1001 for convenience, it should be understood that the logic circuits implementing the functionalities of the blocks 1006-1009 may be a part of the logic unit (not shown) in the PPD core 1001.

As shown, each F(x,y) block 1006-1009 may receive two inputs x and y, that is, one input from each of its two associated SPAD cores. In the context of FIGS. 5 and 7, such inputs may be in the form of the output signals 506 from the SPAD cores 501. In the context of FIG. 13, the SPAD outputs 1310 and 1318 may represent the requisite x, y inputs to such F(x,y) blocks in the logic unit 1319. Similar two-input F(x,y) blocks per pair of SPAD cores may be provided for pixels having more than four SPAD cores associated with a PPD core, such as, for example, the pixel array configuration 600C in FIG. 6C. In some embodiments, all of the F(x,y) blocks 1006-1009 may be consolidated and implemented through a single F(x,y) unit in the PPD core 1001 that contains logic circuits configured to operate on different pairs of SPAD outputs (as its x and y inputs) to implement the functionality of individual F(x,y) blocks 1006-1009. As noted before, a TOF measurement as disclosed herein may be based on detection of spatially- and temporally-correlated photons by at least two SPADs in a pixel. Thus, as noted in FIG. 10, each F(x,y) block 1006-1009 (more specifically, the logic circuit in an F(x,y) block) may be configured to perform the following pre-defined operations: (i) a logical NAND operation on its respective inputs x and y (given by (x*y)) to detect two or four coincident photons, and (ii) a logical NOR operation on its respective inputs x and y (given by (x+y)) to detect three coincident photons. Thus, the logic circuit implementing the F(x,y) blocks 1006-1009 may perform the logical NAND operation when signals 506 (FIG. 5) from the SPAD cores 1002-1005 indicate that two (or all four) SPADs have detected photons during the shutter on period. Similarly, a logical NOR operation may be selected when signals 506 from the SPAD cores 1002-1005 indicate that three SPADs have detected photons during the shutter on period. In the example depiction in FIG. 10, three pulses 1010-1012 are shown to represent the case of detection of three coincident photons when each of the three SPAD cores 1003-1005 detects the incoming light, such as the returned pulse 37 (FIG. 2).

Referring again to FIG. 10, the output of each F(x,y) block 1006-1009 is depicted using the corresponding reference letter a, b, c, and d. The logic unit (not shown) in the PPD core 1001 also may include an additional logic circuit (not shown) to receive and process the outputs a through d. The logic circuit may receive all four of these outputs as inputs thereto and operate on them according a pre-defined logic function G(a,b,c,d). For example, as depicted in FIG. 10, in case of detection of two coincident photons, the G( ) function may perform a logical NAND operation (given by (a*b*c*d)) on all four of its inputs a through d. On the other hand, in case of detection of three or four coincident photons, the G( ) function may perform a logical NOR operation (given by (a+b+c+d)) on all four of its inputs a through d. In one embodiment, the TXEN signal, such as the TXEN signal 708 in FIG. 7 or the TXEN signal 1325 in FIG. 13, may be the output of the logic circuit implementing the G( ) function. In another embodiment, the output of the logic circuit for the G( ) function may be ORed with an internally generated signal, such as, the TXRMD signal 1401 in FIG. 14, to obtain the final TXEN signal.

Figure 11:
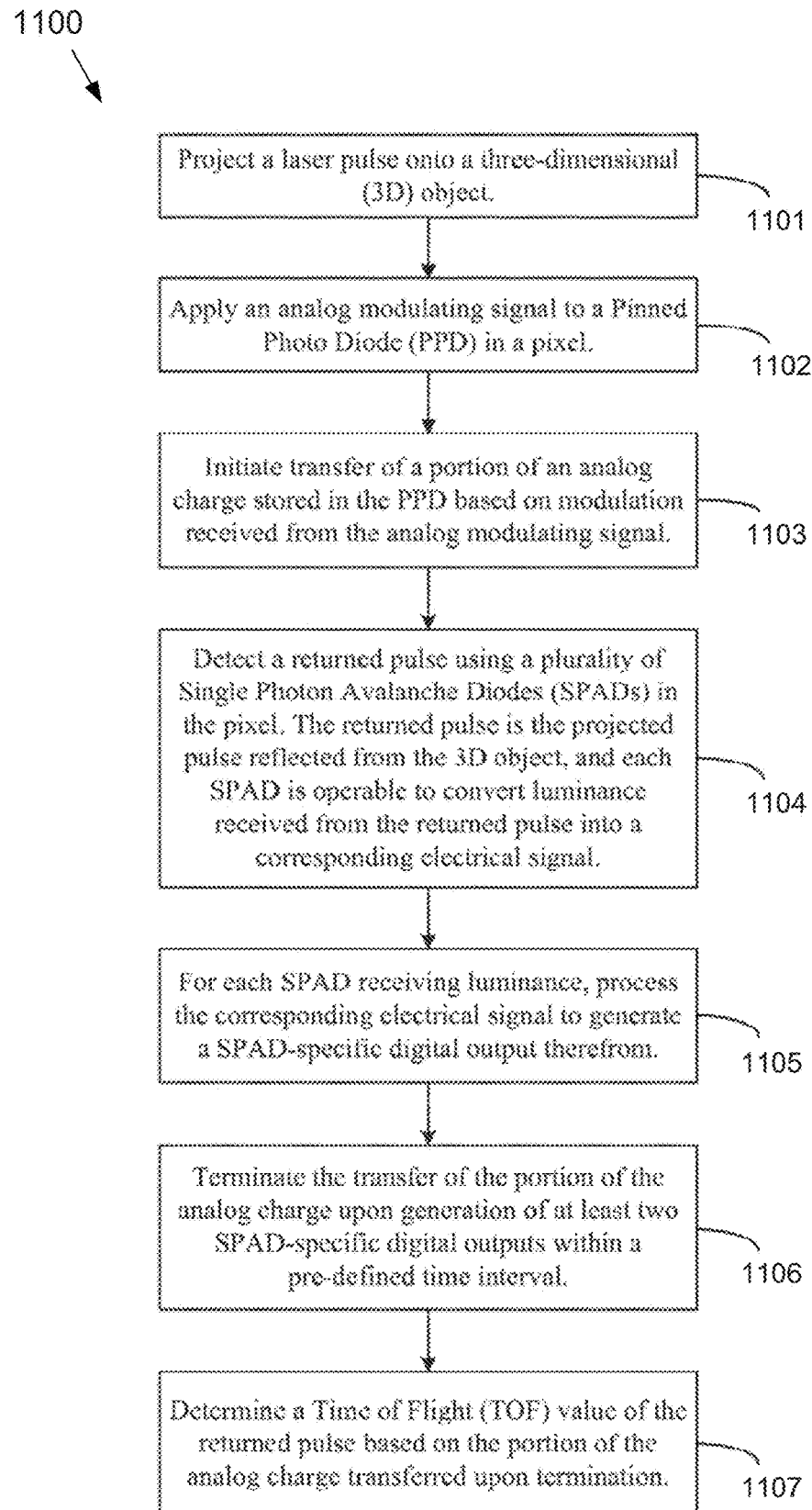
FIG. 11 depicts an example flowchart showing how a TOF value may be determined in the image-sensor system of FIGS. 1 and 2 according to the subject matter disclosed herein.

FIG. 11 depicts an example flowchart 1100 showing how a TOF value may be determined in the system 15 of FIGS. 1 and 2 according to the subject matter disclosed herein. Various steps indicated in FIG. 11 may be performed by a single module or a combination of modules or system components in the system 15. In the discussion herein, by way of an example only, specific tasks are described as being performed by specific modules or system components. Other modules or system components may be suitably configured to perform such tasks as well. As noted at operation 1101, initially, the system 15 (more specifically, the projector module 22) may project a laser pulse, such as the pulse 28 in FIG. 2, onto an object, like the object 26 in FIG. 2. At operation 1102, the processor 19 (or the pixel-processing unit 46 in certain embodiments) may apply an amplitude modulating signal, such as the VTX signal 710 in FIG. 7, to a PPD in a pixel, such as the PPD 508 in the pixel 700 in FIG. 7. The pixel 700 may be any of the pixels 43 in the pixel array 42 in FIG. 2. At operation 1103, the pixel-processing unit 46 may initiate transfer of a portion of a charge stored in the PPD 508 based on modulation received from the amplitude modulating signal 710. To initiate such charge transfer, the pixel-processing circuit 46 may provide various external signals, such as the shutter signal 701, the VPIX signal 713, and the RST signal 709, to the pixel 700 at the logic levels depicted in the example timing diagram of FIG. 9. At operation 1104, a returned pulse, such as the returned pulse 37, may be detected using a plurality of SPADs in the pixel 700. As mentioned earlier, the returned pulse 37 may be the projected pulse 28 reflected from the object 26 and each SPAD (in the SPAD cores 501) in the pixel 700 is operable to convert luminance received from the returned pulse into a corresponding (SPAD-specific) electrical signal.

For each SPAD receiving luminance, the first control circuit 504 in the SPAD cores 501 in the pixel 700 may process the corresponding (SPAD-specific) electrical signal to generate a SPAD-specific digital output therefrom (operation 1105). All such SPAD-specific digital outputs are collectively represented by an arrow with reference numeral 506 in FIGS. 5 and 7. As noted with reference to discussion of FIG. 9, the logic unit 702 may process the outputs 506 and, so long as the outputs are temporally and spatially correlated, may place the TXEN signal 708 in the logic 0 (low) state. The logic 0 level of the TXEN signal 708 turns off the transistor 703 and the transistor 704 in the pixel 700, which stops the transfer of charge to floating diffusion 712 from the PPD 508. Thus, at operation 1106, the second control circuit 507 may terminate the earlier-initiated transfer of the portion of the charge (at operation 1103) upon generation of at least two SPAD-specific digital outputs with a predetermined time interval, such as, within the shutter on period 904 in FIG. 9.

As discussed earlier with reference to FIG., the portion of the charge transferred to the floating diffusion 712 (until the transfer is terminated at operation 1106) may be read out as a Pixout1 signal and converted into an appropriate digital value P1, which may be used along with a subsequently-generated digital value P2 (for Pixout2 signal) to obtain the TOF information from the ratio P1/(P1+P2). Thus, at operation 1107, either the pixel-processing unit 46 or the processor 19 in the system 15 may determine the TOF value of the returned pulse 37 based on the portion of the analog charge transferred upon termination (at operation 1106).

FIG. 12 is an example layout of a portion of an image-sensor unit 1200 according to the subject matter disclosed herein. The image-sensor unit 1200 may correspond to the image-sensor unit 24 depicted in FIGS. 1 and 2. The portion of the image-sensor unit 1200 shown in FIG. 12 may be relevant to provide the necessary signals for capturing the returned light and generating the P1 and P2 values for subsequent calculations of TOF values (from Eq. (2)) and, if desired, generation of a 3D image of the object 26. As in case of FIG. 2, the pixel array 1201 in the image-sensor unit 1200 in FIG. 12 is shown as having nine pixels arranged as a 3×3 array for convenience. In practice, a pixel array may contain hundreds of thousands or millions of pixels in multiple rows and columns. In some embodiments, each pixel in the pixel array 1201 may have an identical configuration and, hence, each pixel is identified using the same reference numeral 1202 as shown in FIG. 12. In the embodiment of FIG. 12, the 2D pixel array 1201 may be a Complementary Metal Oxide Semiconductor (CMOS) array in which each pixel 1202 may be the pixel 1300 shown in FIG. 13. Although the example layout in FIG. 12 is with reference to the pixel configuration of FIG. 13, it should be understood that the image-sensor unit 1200 in FIG. 12 may be suitably modified when each pixel 1202 has the configuration shown in FIG. 7. In some embodiments, the pixels 1202 may have configurations different from those shown in FIGS. 7 and 13, and the ancillary processing units in FIG. 12, such as the row decoder/driver 1203, the column decoder 1204, and the like, may be suitably modified to operate with the desired pixel configuration.

In addition to the pixel array 1201, the image sensor unit 1200 in the embodiment depicted in FIG. 12 also may include a row decoder/driver 1203, a column decoder 1204, and a pixel column unit 1205 that includes circuits for Correlated Double Sampling (CDS) as well as column-specific analog-to-digital converters (ADCs) to be used during 2D and 3D imaging. In one embodiment, there may be one ADC per column of pixels. In some embodiments, the processing units 1203, 1204, and 1205 may be part of the pixel-processing unit 46 shown in FIG. 2. In the embodiment of FIG. 12, the row decoder/driver 1203 is shown to provide six different signals as inputs to each pixel 1202 in a row of pixels to control the operation of the pixels in the pixel array 1201 and to thereby enable generation of the column-specific pixout signals 1206-1208. Each of the arrows 1209-1211 in FIG. 12 illustrates the row-specific set of these signals to be applied as inputs to each pixel 43 in the corresponding row. These signals may include: a reset signal RST, a second transfer signal TX2, an electronic shutter signal SH, a transfer voltage signal VTX, a pixel voltage signal VPIX, and a row select signal SEL. FIG. 13 depicts how these signals may be applied to a pixel. FIG. 14 depicts an example timing diagram incorporating many of these signals.

In one embodiment, the row select SEL signal may be asserted to select an appropriate row of pixels. The row decoder/driver 1203 may receive the address or control information for the row to be selected via the row address/control inputs 1212, for example, from the processor 19. The row decoder/driver 1203 may decode the received inputs 1212 to enable the row decoder/driver 1203 to select an appropriate row using the SEL signal and to also provide the corresponding RST, VTX and other signals to the selected/decoded row. A more detailed discussion of these signals, when applied as pixel inputs, is provided later with reference to discussion of FIGS. 13 and 14. In some embodiments, the row driver unit 1203 may also receive control signals (not shown), for example, from the processor 19, to configure the row driver 1203 to apply appropriate voltage levels for the SEL, RST, VTX, SH and various other signals indicated at arrows 1209-1211.

The pixel column unit 1205 may receive the PIXOUT signals 1206-1208 from the pixels in the selected row and process them to generate pixel-specific signal values from which TOF measurements can be obtained. The signal values may be the P1 and P2 values described earlier, as indicated by the arrow 1213 in FIG. 12. Each column-specific ADC unit may process the received inputs (pixout signals) to generate the corresponding digital data outputs (P 1/P2 values). More details of the CDS and ADC operations provided by the CDS and ADC circuits (not shown) in the pixel column unit 128 are provided later below with reference to FIG. 14. In the embodiment depicted in FIG. 12, the column decoder unit 1204 is depicted as being coupled to the pixel column unit 1205. The column decoder 1204 may receive a column address/control input 1214 from, for example, the processor 19, for the column to be selected in conjunction with a given row select SEL signal. The column selection may be sequential, thereby allowing sequential reception of the pixel output from each pixel in the row selected by the corresponding SEL signal. The processor 19 may provide appropriate row address inputs to select the row of pixels and may also provide appropriate column address inputs to the column decoder 1204 to enable the pixel column unit 1205 to receive outputs (pixouts) from the individual pixels in the selected row.

FIG. 13 depicts another example embodiment of a pixel 1300 according to the subject matter disclosed herein. The pixel 1300 in FIG. 13 is another example of the more generic pixel 43 depicted in FIG. 2. The pixel 1300 may include multiple SPAD cores (i.e., SPAD core 1 through SPAD core N in which N>2) as part of its SPAD cores. In FIG. 13, two such SPAD cores 1301A and 1301N148 are depicted with some circuit details. It is noted that, in some embodiments, similar circuits may be employed for the SPAD cores in the pixel 700 in FIG. 7. The SPAD core 1300A may include a SPAD 1302 that receives a SPAD operating voltage VSPAD 1303 through a resistive element (such as a resistor) 1304. A configuration of a SPAD, however, may not be limited to that depicted in FIG. 13. In one embodiment, the positions of the resistor 1304 and the SPAD 1302 may be swapped. In the pixel 1301A, the SPAD 1302 responds to light. When the SPAD 1302 receives a photon, the SPAD 1302 outputs a pulse that goes from the level of VSPAD to 0 V and back to VSPAD. The output from the SPAD 1302 may be filtered through a capacitor 1305 and applied to an inverter 1306 (which may function as a combination of a buffer and a latch). In one embodiment, the capacitor 1305 may be omitted. The SPAD core 1301A may include a PMOS transistor 1307 that receives an electronic shutter signal 1308 at its gate terminal, whereas the drain terminal of the transistor 1307 is connected to the capacitor (and input of the inverter 1306) and the source terminal of the transistor 1307 may receive the supply voltage VDD 1309 (or the VPIX voltage, in some embodiments). When the shutter signal 1308 is turned off (for example, logic 0 or low level), the transistor 1307 conducts and the output 1310 of the inverter 1306 may remain at a fixed voltage level (for example, in the logical low or logic 0 state) regardless of the status of any outputs received from the SPAD 1301A. An output from the SPAD 1301A may be applied to a PPD core 1311 only when the shutter signal 1308 is turned on or active. When the shutter is active (for example, logic 1 level), the transistor 1307 is turned off and the SPAD-generated output may be transmitted to the inverter 1306 (via the coupling capacitor 1305) and may appear as a positive pulse (low-to-high) on the output line 1310.

The SPAD core 1301N may be identical to the SPAD core 1301A in circuit details and, hence, operational details of the SPAD core 1310N are not provided. As shown, the SPAD core 1310N may include a core-specific SPAD 1312, a resistive element 1313 through which the VSPAD voltage 1303 is supplied to the SPAD 1312, a coupling capacitor 1315, an inverter 1316 for latching and outputting the output generated by the SPAD 1312, and a PMOS transistor 1317 to control the operation of the inverter 1316 through the shutter input 1308. The output 1318 of the inverter 1316 may be provided to the PPD core 1311 for further processing. In some embodiments, the signals VSPAD 1303, VDD 1309, and shutter 1308 may be supplied to each SPAD core 1301A and 1301N from an external unit, such as the row decoder/driver unit 1203 depicted in FIG. 12 or any other module (not shown) in the pixel-processing unit 46 (or the processor 19) in FIG. 2. All of the SPAD core-specific outputs 1310 and 1318 may collectively form the signals identified using the reference numeral 506 in FIG. 5.

Thus, the electronic shutter signal 1308 ensures that outputs 1310 and 1318 from the SPAD cores 1301A and 1310N are temporally (or, time-wise) correlated in addition to being spatially correlated due to adjacent locations of SPAD cores 1301A and 1301N in the pixel 1300. Additional pixel geometries are shown in the exemplary embodiments of FIGS. 6A-6C.

Like the pixel 700 in FIG. 7, the pixel 1300 in FIG. 13 also includes the PPD 508, a logic unit 1319, a first NMOS transistor 1320, a second NMOS transistor 1321, a third NMOS transistor 1322, a fourth NMOS transistor 1323, a fifth NMOS transistor 1324; generates the internal input TXEN 1325; receives external inputs RST 1326, VTX 1327 (and the TX signal 1328), VPIX 1329, and SEL 1330; has a floating diffusion (FD) node 1331; and outputs the PIXOUT signal 510. Unlike the pixel 700 in FIG. 78, however, the pixel 1300 in FIG. 13 also generates a second TXEN signal (TXENB) 1333, which may be a complement of the TXEN signal 1325 and may be supplied to the gate terminal of a sixth NMOS transistor 1334. The NMOS transistor 1334 may have its drain terminal connected to the source terminal of the transistor 1320 and its source terminal connected to a ground (GND) potential 1335. The TXENB signal 1333 may be used to bring the GND potential to the gate terminal of the TX transistor 1321. Without the TXENB signal 1333, when the TXEN signal 1325 goes low, the gate of the TX transistor 1321 may be floating and the charge transfer from the PPD 508 may not be fully terminated. Such a situation may be ameliorated using the TXENB signal 1325. Additionally, the pixel 1300 also may include a storage diffusion (SD) capacitor 1336 and a seventh NMOS transistor 1337. The SD capacitor 1336 may be connected at the junction of the drain terminal of the transistor 1321 and the source terminal of transistor 1337, and may form an SD node 1338 at the junction. The NMOS transistor 1337 may receive at its gate terminal a different, second Transfer signal TX2 1339 as an input. The drain of the transistor 1337 may connect to the FD node 1331 as depicted.

In some embodiments, the signals RST, VTX, VPIX, TX2 and SEL may be supplied to the pixel 1300 from an external unit, such as the row decoder/driver unit 1203 depicted in FIG. 12. In some embodiments, the SD capacitor 1336 may not be an extra capacitor, but may be merely the junction capacitance of the SD node 1338. A comparison of FIG. 5 and FIG. 13 shows that, in pixel 1300, all of the SPADs 1301A, 1301N, and so on, may collectively form the SPADs block 503 in FIG. 5; all non-SPAD circuit elements from each SPAD core 1301A, 1301N, and so on, may collectively form the first control circuit 504 in FIG. 5; and all non-PPD circuit elements in the PPD core 502 may form the second control circuit 507 in FIG. 5.

In the pixel 1300, the charge-transfer-trigger portion may include the SPAD cores 1301A and 1301N (and other such cores) and the logic unit 1319. The charge-generation-and-transfer portion may include the PPD 508, the NMOS transistors 1320-1322, 1334, and 1337, and the SD capacitor 1336. The charge-collection-and-output portion may include the NMOS transistors 1322-1324. It is noted here that separation of various circuit components into respective portions is for illustrative and discussion purpose only. In some embodiments, such portions may include more or less or different circuit elements than those listed here.

As mentioned before, except for the CDS-based charge-collection-and-output portion, the pixel configuration in FIG. 13 is substantially similar to that in FIG. 7. Therefore, for convenience, the circuit portions and signals common between the embodiments in FIGS. 7 and 13, such as the transistors 1320-1324 and associated inputs like RST, SEL, VPIX and so on, are not discussed here. It should be understood that the CDS is a noise reduction technique for measuring an electrical value, such as a pixel/sensor output voltage (pixout), in a manner that allows removal of an undesired offset. In some embodiments, a column-specific CDS unit (not shown) may be employed in the pixel column unit 1205 (FIG. 12) to perform correlated double sampling. In CDS, the output(s) of a pixel, such as the pixel 1300 in FIG. 13, may be measured twice; once in a known condition, and once in an unknown condition. The value measured from the known condition may be then subtracted from the value measured from the unknown condition to generate a value with a known relation to the physical quantity being measured, that is, the PPD charge representing the pixel-specific portion of the received light. Using CDS, noise may be reduced by removing the reference voltage of the pixel (such as, for example, the pixel's voltage after it is reset) from the signal voltage of the pixel at the end of each charge transfer. Thus, in CDS, before the charge of a pixel is transferred as an output, the reset/reference value is sampled, which is then deducted from the value after the charge of the pixel is transferred.

In the embodiment of FIG. 13, the SD capacitor 1336 (or the associated SD node 1338) stores the PPD charge prior to its transfer to the floating diffusion 1331, thereby allowing the establishment (and sampling) of appropriate reset values at the floating diffusion 1331 prior to any charge is transferred to the floating diffusion 1331. As a result, each pixel-specific output (Pixout1 and Pixout2) may be processed in a column-specific CDS unit (not shown) in the pixel column unit 1205 (FIG. 12) to obtain a pair of pixel-specific CDS outputs. Subsequently, the pixel-specific CDS outputs may be converted to digital values, such as the P1 and P2 values indicated by arrow 1213 in FIG. 12 by the respective column-specific ADC unit (not shown) in the pixel column unit 1205. The transistors 1334 and 1337, and the signals TXENB 1333 and TX2 1339 in FIG. 13 provide ancillary circuit components needed to facilitate CDS-based charge transfer. In one embodiment, the P1 and P2 values may be generated in parallel using, for example, an identical pair of ADC circuits as part of the column-specific ADC unit. Thus, the differences between the reset levels and corresponding PPD charge levels of pixout1 and pixout2 signals may be converted to digital numbers by a column parallel ADC and output as the pixel-specific signal values (i.e., P1 and P2) to enable the computation of the pixel-specific TOF value of the returned pulse 37 for the pixel 1300 based on Eq. (2). As noted earlier, such computation may be performed by the pixel-processing unit 46 or by the processor 19 in the system 15. Consequently, a pixel-specific distance to the object 26 (FIG. 2) also may be determined using, for example, Eq. (3) or Eq. (4). The pixel-by-pixel charge collection operation may repeat for all the rows of pixels in the pixel array 42. Based on all the pixel-specific distance or range values for the pixels 43 in the pixel array 42, a 3D image of the object 26 may be generated, for example, by the processor 19, and displayed on an appropriate display or user interface associated with the system 15. A 2D image of the object 26 may be generated, for example, when no range values are calculated or when a 2D image is desired despite the availability of range values, by simply adding the P1 and P2 values. In some embodiments, such a 2D image simply may be a grayscale image, for example, when an IR laser is used.

It should be kept in mind that the pixel configurations shown in FIGS. 7 and 13 are examples only. Other types of PPD-based pixels with multiple SPADs also may be used to implement the subject matter disclosed herein. Such pixels may include, for example, pixels having a single output (such as the PIXOUT line 510 in the embodiments of FIGS. 7 and 13) or pixels with dual outputs where Pixout1 and Pixout2 signals may be output through different outputs in the pixel.

FIG. 14 is a timing diagram 1400 that shows example timing of different signals in the system 15 of FIGS. 1 and 2 when pixels 1300 in the embodiment depicted in FIG. 13 are used in a pixel array, such as the pixel array 42 in FIGS. 2 and 12, for measuring TOF values according to the subject matter disclosed herein. The timing diagram 1300 in FIG. 14 is similar to the timing diagram 900 in FIG. 9, especially with reference to the waveforms of VTX, Shutter, VPIX and TX signals, and identification of various timing intervals or events such as, for example, the PPD reset event, the shutter on period, the time delay period $T_{dly}$ and so on. Because of the earlier extensive discussion of the timing diagram 900 in FIG. 9, only a brief discussion of the distinguishing features in the timing diagram 1400 in FIG. 14 is provided for convenience.

In FIG. 14, various externally-supplied signals, such as the VPIX signal 1329, the RST signal 1326, the electronic shutter signal 1308, the amplitude modulating signal VTX 1327, and the TX2 signal 1339, and the internally-generated TXEN signal 1325 are identified using the same reference numerals as those used in FIG. 13. Similarly, for convenience, the same reference numeral 1331 is used to refer to the floating diffusion 1331 in FIG. 13 and associated voltage waveform in the timing diagram of FIG. 14. A Transfer Mode (TXRMD) signal 1401 is shown in FIG. 14, but not shown in FIG. 13 or in the earlier timing diagram of FIG. 10. In some embodiments, the TXRMD signal 1401 may be internally generated by the logic unit 1319 or externally-supplied to the logic unit 1319 by a row decoder/driver (such as the row decoder/driver 1203 in FIG. 12). In one embodiment, the logic unit 1319 may include logic circuits (not shown) to generate an output based on a G( ) function (FIG. 10) and then logically OR the output with an internally-generated signal, such as the TXRMD signal 1401, to obtain the final TXEN signal 1325. As shown in FIG. 14, in one embodiment, such internally-generated TXRMD signal 1401 may remain low while the electronic shutter is on, but may be asserted high thereafter so that the TXEN signal 1325 goes to a logic 1 to facilitate the transfer of the remaining charge in the PPD (at event 1402 in FIG. 14).

It is noted that the PPD reset event 1403, the delay time $T_{dly}$ 1404, the TOF period $T_{tof}$ 1405, the shutter off interval 1406, and the shutter on or active period $T_{sh}$ 1407 or 1408, and the FD reset event 1409 in FIG. 14 are similar to corresponding events or time periods shown in FIG. 9. Therefore, additional discussion of these parameters is not provided. Initially, the FD reset event 1409 results in the FD signal 1331 going high, as shown. The SD node 1338 is reset to high after the PPD 508 is preset to low. More specifically, during the PPD preset event 1403, the TX signal 1328 may be high, the TX2 signal 1339 may be high, the RST signal 1326 may be high, and the VPIX signal 1329 may be low to fill electrons to PPD 508 and preset the PPD 508 to zero Volts. Thereafter, the TX signal 1328 may go low, but the TX2 signal 1339 and the RST signal 1326 may briefly remain high, which, along with a high VPIX signal 1329, may reset the SD node 1338 to high and remove electrons from the SD capacitor 1336. In the meantime, the FD node 1331 is reset (following the FD reset event 1409). The voltage at the SD node 1338 or the SD reset event are not shown in FIG. 14.

In contrast to the embodiment in FIGS. 7 and 9, the PPD charge is amplitude modulated and initially transferred to the SD node 1338 (through the SD capacitor 1336) in the embodiment depicted in FIGS. 13 and 14 when the shutter 1308 is active and the VTX signal 1327 is ramped up, as noted on the TX waveform 1328. Upon detection of photons by at least two SPADs in the pixel 1300 (FIG. 13) during the shutter on period 1408, the TXEN signal 1325 goes low and the initial charge transfer from the PPD 508 to the SD node 1338 stops. The transferred charge stored at the SD node 1338 may be read out on the Pixout line 510 (as a Pixout1 output) during the first readout period 1412. In the first readout period 1412, the RST signal 1326 may be briefly asserted high after the electronic shutter 1308 is deactivated or turned off to reset the floating diffusion 1331. Thereafter, the TX2 signal 1409 may be pulsed high to transfer the charge from the SD node 1338 to the floating diffusion 1331 while the TX2 1339 signal is high. The floating diffusion voltage waveform 1331 depicts the charge transfer operation. The transferred charge then may be readout (as Pixout1 voltage) during the first readout period 1412 via the Pixout line 510 using the SEL signal 1330 (not shown in FIG. 14).

During the first readout interval 1412, after the initial charge is transferred from the SD node to the FD node and the TX2 signal 1339 returns to the logic low level, the TXRMD signal 1401 may be asserted (pulsed) high to generate a high pulse on the TXEN input 1325, which, in turn, may generate a high pulse on the TX input 1328 to allow transfer of the remaining charge in the PPD 508 to the SD node 1338 (through the SD capacitor 1336), as indicated by the reference numeral 1402 in FIG. 14. Thereafter, the FD node 1331 may be reset again when the RST signal 1326 is briefly asserted high again. The second RST high pulse may define a second readout period 1413, in which the TX2 signal 1339 may be pulsed high again to transfer the remaining charge on the PPD 508 (at event 1402) from the SD node 1338 to the floating diffusion 1331 while TX2 is high. The floating diffusion voltage waveform 1331 depicts the second charge transfer operation. The transferred remaining charge then may be readout (as Pixout2 voltage) during the second readout period 1418 via the Pixout line 510 using the SEL signal 1332 (not shown in FIG. 14). As mentioned earlier, the PIXOUT1 and PIXOUT2 signals may be converted into corresponding digital values P1 and P2 by an appropriate ADC unit (not shown). In certain embodiments, these P1 and P2 values may be used in Eq. (4) or Eq. (4) to determine a pixel-specific distance/range between the pixel 1300 and the object 26. The SD-based charge transfer depicted in FIG. 14 allows for a generation of a pair of pixel-specific CDS outputs, as discussed earlier with reference to discussion of FIG. 13. The CDS-based signal processing provides for additional noise reduction.

FIG. 15 depicts a block diagram of an example embodiment of a time-resolving sensor 1500 according to the subject matter disclosed herein. The time-resolving sensor 1500 may include a SPAD circuit 1501, a logic circuit 1503, and a PPD circuit 1505.

The SPAD circuit 1501 may include a SPAD for detecting photons, a first input for receiving a VSPAD voltage, a second input for receiving a SHUTTER signal for controlling opening and closing an electronic shutter, a third input for receiving a $V_{DD}$ voltage, and an output for outputting a detection event (DE) signal. In response to receiving a photon, the SPAD circuit 1501 outputs a pulse signal that goes rapidly from the VSPAD voltage to a voltage that is below the SPAD breakdown voltage and then more gradually returns to the VSPAD voltage.

The logic circuit 1503 may include a first input connected to the DE signal output from the SPAD circuit 1501, a second input for receiving a TXRMD signal for completely transferring a charge remaining in a PPD of the PPD circuit 1505 to an FD node, and an output for outputting a TXEN signal.

The PPD circuit 1505 may include a first input connected to the TXEN signal output from the logic circuit 1503, a second input for receiving a VTX signal for partially or completely transferring charge from the PPD of the PPD circuit 1505 to the FD node in the PPD circuit 1505, a third input for receiving an RST signal for resetting the charge in the FD node and presetting the charge in the PPD, a fourth input for receiving a VPIX voltage for the PPD circuit 1505, a fifth input for receiving an SEL signal for enabling read out of either a PIXOUT1 signal (representing the charge on the FD node) or a PIXOUT2 signal (representing the charge remaining in the PPD), and an PIXOUT output for outputting the PIXOUT1 signal and the PIXOUT2 signal in response to the SEL signal.

FIG. 16 depicts a schematic diagram of an example embodiment of the SPAD circuit 1501 of the time-resolving sensor 1500 according to the subject matter disclosed herein. In one embodiment, the SPAD circuit 1501 may include a resistor 1601, a SPAD 1603, a capacitor 1605, a p-type MOSFET transistor 1607, and a buffer 1609. The resistor 1601 may include a first terminal for receiving the VSPAD voltage, and a second terminal. The SPAD 1603 may include an anode connected to a ground potential, and a cathode connected to the second terminal of the resistor 1601. In another embodiment, the positions of the resistor 1601 and the SPAD 1603 may be swapped. The SPAD 1603 may respond to light. In response to receiving a photon, the SPAD 1603 outputs a pulse signal that goes rapidly from the VSPAD voltage to below breakdown voltage, and then more gradually returns to the VSPAD voltage. In one example, the breakdown voltage may be a particular threshold voltage.

The capacitor 1605 may include a first terminal connected to the cathode of the SPAD 1603 and a second terminal. In an alternative embodiment, the capacitor 1604 may be omitted. The p-type MOSFET 1607 may include a first S/D terminal connected to the second terminal of the capacitor 1605, a gate for receiving the SHUTTER signal, and a second S/D terminal for receiving the VPIX voltage ($V_{DD}$). The buffer 1609 may include an input connected to the second terminal of the capacitor 1605, and an output to output a DE signal. The DE signal may correspond to the DE output of the SPAD circuit 1501. In an alternative embodiment, the buffer 1609 may be an inverter.

FIG. 17 depicts a schematic diagram of an example embodiment the logic circuit 1503 of the time-resolving sensor 1500 according to the subject matter disclosed herein. The logic circuit 1503 may include a latch 1701 and a two-input OR gate 1703.

The latch 1701 may include an input connected to the DE signal output from the SPAD circuit 1501 and an output. In response to the DE signal, the latch outputs a logic signal that, for example, goes from a logic 1 to a logic 0, and remains at logic 0. In other words, the latch 1701 converts a pulse-type signal to a signal that goes from a logic 1 to a logic 0 and remains at logic 0 without returning to logic 1 until reset. The latch output may be triggered by the leading edge of the DE signal in which the leading edge may be positive going or negative going depending on the design of the SPAD circuit 1501.

The two-input OR gate 1703 may include a first input connected to the output of the latch 1701, a second input for receiving the TXRMD signal, and an output to output a TXEN signal. The two input OR gate 1703 performs a logical OR function and outputs the result as the TXEN signal. In particular, the output of the two-input OR gate 1703 goes to a logic 1 if either a photon is received by the SPAD circuit 1501 when SHUTTER is a logic 1, or if the TXRMD signal is a logic 1, which occurs when the remaining charge in the PPD of the PPD circuit 1505 is to be transferred completely to the FD node for readout as a PIXOUT2 signal.

FIG. 18 depicts a schematic diagram of an example embodiment of the PPD circuit 1505 of the time-resolving sensor 1500 according to the subject matter disclosed herein. The PPD circuit 1505 may include a PPD 1801, a first transistor 1803, a second transistor 1805, a third transistor 1807, a fourth transistor 1809, and a fifth transistor 1811.

The PPD 1801 may include an anode connected to a ground potential and a cathode. The PPD 1801 may store charge in a manner that is similar to a capacitor. In one embodiment, the PPD 1801 may be covered and therefore does not respond to light, and may be used as a TCC instead of a light-sensing element.

The first transistor 1803 may include a gate terminal connected to the TXEN signal output of the logic circuit 1503, a first S/D terminal for receiving the VTX signal, and a second S/D terminal. The first transistor 1803 may receive the VTX signal and may enable the VTX signal to pass through the first transistor 1803 under the control of TXEN signal to output a TX signal at the second S/D terminal of the first transistor 1803.

The second transistor 1805 may include a gate terminal connected to the second S/D terminal of the first transistor 1803, a first S/D terminal connected to the cathode of the PPD 1801, and a second S/D terminal. The second transistor 1805 may receive the TX signal on the gate terminal and transfers the charge on the PPD 1801 on the source terminal to the drain terminal, which is connected to the FD node. There may be a parasitic capacitance between the FD node and ground, which is not indicated in FIG. 18. In one embodiment, a physical capacitance may also be connected between the FD node and ground.

The third transistor 1807 may include a gate terminal for receiving the RST signal, a first S/D terminal for receiving the VPIX voltage, and a second S/D terminal connected to the second S/D terminal of the second transistor 1805.

The fourth transistor 1809 may include a gate terminal connected to the second S/D terminal of the second transistor 1805, a first S/D terminal connected to the first S/D terminal of the third transistor 1807, and a second S/D terminal.

The fifth transistor 1811 may include a gate terminal for receiving the SEL signal, a first S/D terminal connected to the second S/D terminal of the fourth transistor 1809, and a second S/D terminal that is the PIXOUT output of the PPD circuit 1505. The fifth transistor 1811 may receive the SEL signal for selecting the pixel to readout either the charge in the FD node (as PIXOUT1) or the remaining charge in the PPD 1801 (as PIXOUT2).

The charge transferred from the PPD 1801 to the FD node is controlled by the TX signal. In one embodiment, a VTX signal is coupled through the first transistor 1803 to become the TX signal. The VTX signal is ramped upwardly to increasingly transfer charge from the PPD 1801 to the FD node. The amount of charge transferred from the PPD 1801 to the FD node may be a function of the level of the TX signal, and the ramping of the TX signal may be a function of time. Thus, the charge transferred from the PPD 1801 to the FD node may be a function of time. If, during the transfer of charge from the PPD 1801 to the FD node, the second transistor 1805 is turned off in response to the SPAD circuit 1501 detecting an incoming photon, the transfer of charge from the PPD 1801 to the FD node stops. The amount of charge transferred to the FD node and the amount of charge remaining in the PPD 1801 may be both related to the TOF of the incoming photon. The transfer of charge from the PPD 1801 to the FD node based on the TX signal and detection of incoming photos may be considered to provide is a single-ended-to-differential conversion of charge to time.

The fourth transistor 1809 operates to convert a charge on stored on the FD node to a voltage at the second S/D terminal of the fourth transistor 1809. The SEL signal is used to select the pixel to readout either a PIXOUT1 signal that corresponds to the charge that has been transferred to the FD node or, subsequently, a PIXOUT2 signal that corresponds to the charge remaining in the PPD 1801 after the remaining charge in the PPD 1801 has been transferred to the FD node.

In one embodiment, a ratio of the PIXOUT1 signal to the sum of the PIXOUT1 signal plus the PIXOUT2 signal is proportional to the difference between the TOF of a light signal received by the pixel and a delay time, as expressed in the ratio of Eq. (2). In an embodiment in which the light pulse is transmitted after VTX starts to ramp upwardly, the delay time may be negative.

For the time-resolving sensor 1500, the ratio expressed in Eq. (2) may be used to determine depth or range of an object, and is less sensitive to measurement-to-measurement variations if PIXOUT1+PIXOUT2 does not vary from measurement to measurement. In one embodiment, the VTX signal may ideally be linear, and may ideally be uniform throughout the different pixels of a TOF pixel array. In practice, however, the VTX signal that may be applied to the different pixels of a TOF pixel array may vary from pixel to pixel, thereby introducing an error in a range measurement that depends on the variation of the VTX signal from pixel to pixel, and may also vary from measurement-to-measurement.

In one embodiment, the first transistor 1803, the second transistor 1805, the third transistor 1807, the fourth transistor 1809, and the fifth transistor 1811 may each be an n-type MOSFET or a p-type MOSFET. The subject matter disclosed herein is, however, not limited to using n-type MOSFETs or p-type MOSFETs because any other suitable transistor may be used.

Figure 19:
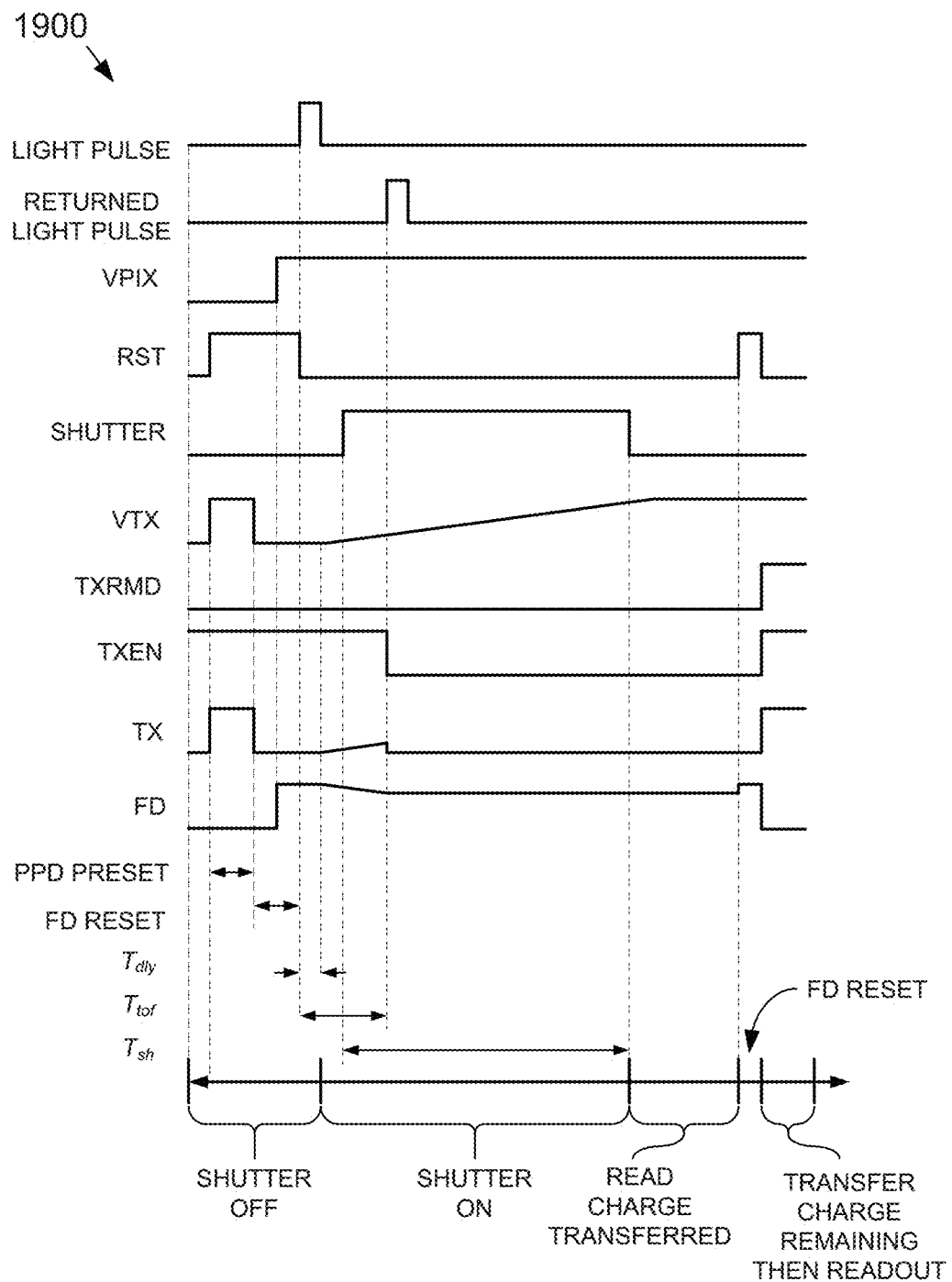
FIG. 19 depicts an example relative signal timing diagram for the time-resolving sensor of FIG. 15 according to the subject matter disclosed herein.

FIG. 19 depicts an example relative signal timing diagram 1900 for the time-resolving sensor 1500 of FIG. 15 according to the subject matter disclosed herein. In FIG. 19, during a Shutter Off (initialization) period, the RST signal, the VTX signal, and the TX signal each go high (logic 1), then return to 0 (logic 0) to reset the PPD circuit 1505. The TXEN signal is high. The PPD 1801 may be filled with charge to its full-well capacity at this initialization period. The VTX signal and the TX signal go low to turn off the second transistor 1805 of the PPD circuit 1505. The VPIX voltage goes high, thereby causing FD node to become reset. A light pulse is transmitted toward an object when the RST signal returns to 0 or shortly thereafter. The VTX signal then begins to ramp upwardly and the SHUTTER signal goes high starting a Shutter On period.

As the VTX signal ramps upwardly, the TX signal also ramps upwardly and the charge on the FD node begins to decrease in response to the TX signal. A returned light pulse causes the TXEN signal to go low (logic 0), thereby stopping the transfer of the charges between the FD node and the PPD 1801.

The delay time $T_{dly}$ represents the time between the start of the transmitted light pulse to the time the signal TX starts to ramp upwardly. The time of flight $T_{tof}$ represents the time between the start of the transmitted light pulse to the time the returned signal is received. The electronic shutter time $T_{sh}$ represents the time from when the electronic shutter is opened to the time when the electronic shutter is closed (the shutter on period). In one embodiment, the electronic shutter time $T_{sh}$ may be less than or equal to the ramping time of the VTX signal.

The charge that has been transferred is read out as a PIXOUT1 signal during a Read Charge Transferred period. While the SHUTTER signal is low, the RST signal goes high a second time reset the charge on the FD node, then the TXRMD, the TXEN and the TX signals go high to transfer the remaining charge on the PPD 1801 to the FD node for read out as a PIXOUT2 signal.

Figure 20:
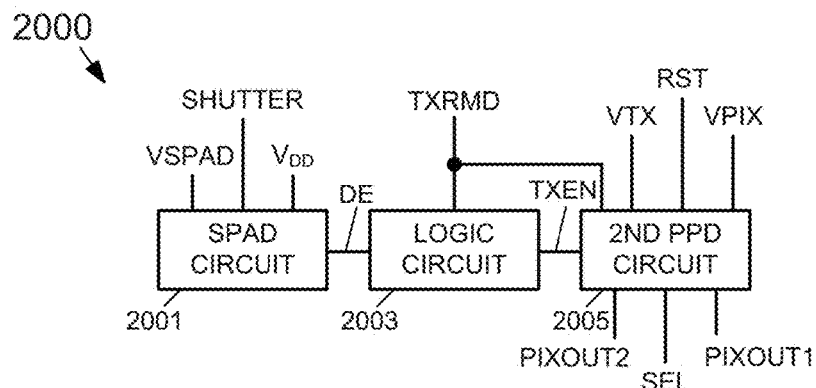
FIG. 20 depicts a block diagram of another example embodiment of a time-resolving sensor according to the subject matter disclosed herein.

FIG. 20 depicts a block diagram of another example embodiment of a time-resolving sensor 2000 according to the subject matter disclosed herein. The time-resolving sensor 2000 may include a SPAD circuit 2001, a logic circuit 2003, and a second PPD circuit 2005.

The SPAD circuit 2001 may include a SPAD for detecting photons, a first input for receiving a VSPAD voltage, a second input for receiving a SHUTTER signal for controlling opening and closing of an electronic shutter, a third input for receiving a VDD voltage (VDD), and an output for outputting a detection event DE signal. In response to receiving a photon, the SPAD circuit 2001 outputs a pulse signal that goes rapidly from VSPAD to 0 and gradually back to VSPAD. In one embodiment, the SPAD circuit 2001 may be the same as the SPAD circuit 1501 depicted in FIG. 15.

The logic circuit 2003 may include a first input connected to the DE output of the SPAD circuit 2001, a second input for receiving a TXRMD signal for completely transferring charge remaining in a PPD of the second PPD circuit 2005, and an output for outputting a TXEN signal. In one embodiment, the logic circuit 2003 may be the same as the logic circuit 1503 depicted in FIG. 15.

The second PPD circuit 2005 may include a first input connected to the TXEN signal output from the logic circuit 2003, a second input connected to the second input of the logic circuit 2003 for receiving the TXRMD signal, a third input for receiving a VTX signal for transferring charge partially or completely from the PPD of the second PPD circuit 2005 to a first floating diffusion node (FD1) in the second PPD circuit 2005, a fourth input for receiving an RST signal for resetting the charge in FD1 node and presetting the charge in the PPD, a fifth input for receiving a VPIX voltage for the second PPD circuit 2005, and a sixth input for receiving an SEL signal for enabling read out of either a PIXOUT1 signal corresponding to the charge on FD node 1 on a PIXOUT1 output, and enabling read out of a PIXOUT2 signal corresponding to the charge remaining in the PPD of the second PPD circuit 2005 on a PIXOUT2 output.

Figure 21:
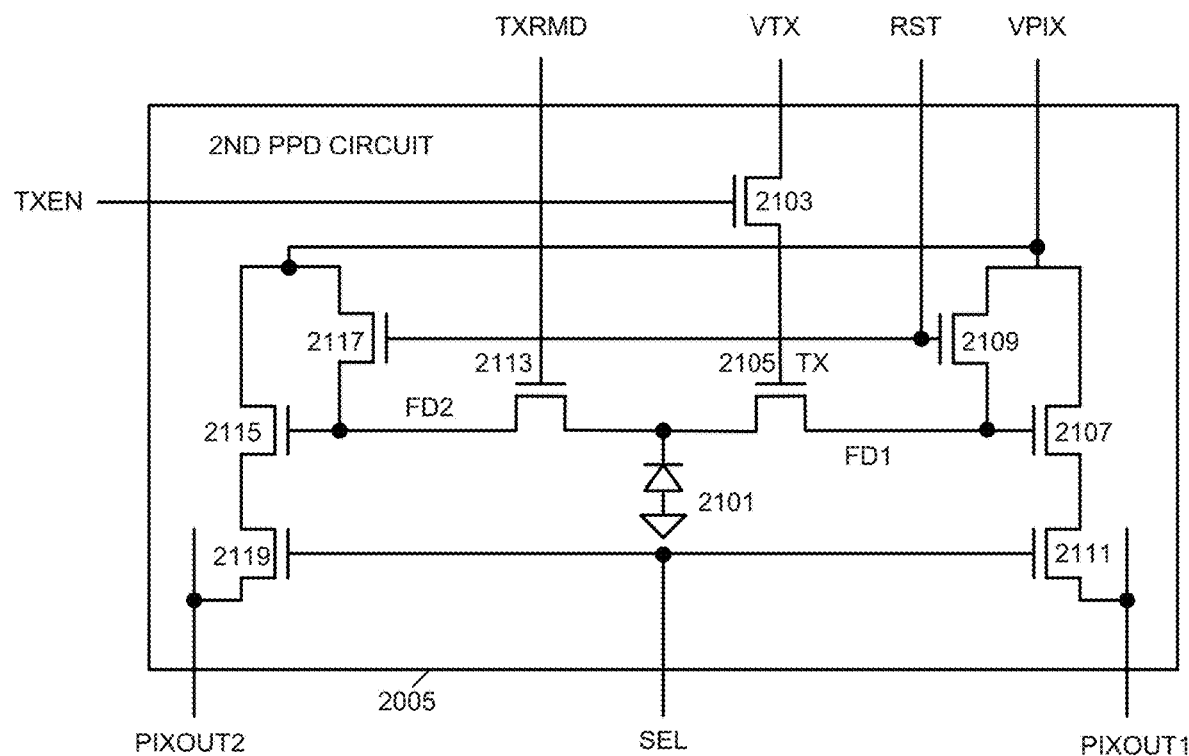
FIG. 21 depicts a schematic diagram of an example embodiment of a second PPD circuit of the time-resolving sensor of FIG. 20 according to the subject matter disclosed herein.

FIG. 21 depicts a schematic diagram of an example embodiment of the second PPD circuit 2005 of the time-resolving sensor 2000 according to the subject matter disclosed herein. The second PPD circuit 2005 may include a PPD 2101, a first transistor 2103, a second transistor 2105, a third transistor 2107, a fourth transistor 2109, a fifth transistor 2111, a sixth transistor 2113, a seventh transistor 2115, an eighth transistor 2117, and a ninth transistor 2119.

The PPD 2101 may include an anode connected to a ground potential, and a cathode. The PPD 2101 may store charge in a manner similar to that of a capacitor. In one embodiment, the PPD 2101 may be covered and therefore does not respond to light, and may be used as a TCC instead of a light-sensing element.

The first transistor 2103 may include a gate terminal connected to the output of the logic circuit 2003 for receiving the TXEN output, a first S/D terminal for receiving the VTX voltage for controlling the transfer of charge from the PPD 2101, and a second S/D terminal.

The second transistor 2105 may include a gate terminal connected to the second S/D terminal of the first transistor 2103 for receiving a TX signal for transferring charge from the PPD 2101, a first S/D terminal connected to the cathode of the PPD 2101, and a second S/D terminal connected to a first floating diffusion node FD1 to which charge is transferred from the PPD 2101. The FD1 node may have a first capacitance. There may be a parasitic capacitance between the FD1 node and ground, which is not indicated in FIG. 21. In one embodiment, a physical capacitance may also be connected between the FD1 node and ground. The charge transferred from the PPD 2101 to the FD1 node through the second transistor 2105 is controlled by the TX signal.

The third transistor 2107 may include a gate terminal connected to the FD1 node and to the second S/D terminal of the second transistor 2105, a first S/D terminal for receiving the VPIX voltage, and a second S/D terminal. The third transistor 2107 may operate to convert a charge on stored on the FD1 node to a voltage at the second S/D terminal of the third transistor 2107.

The fourth transistor 2109 may include a gate terminal for receiving the RST signal for setting the charge level of the FD1 node, a first S/D terminal for receiving the VPIX voltage, and a second S/D terminal connected to the second S/D terminal of the second transistor 2105.

The fifth transistor 2111 may include a gate terminal for receiving the SEL signal for reading out the charge on the FD1 node, a first S/D terminal connected to the second S/D terminal of the third transistor 2107, and a second S/D terminal connected to a pixel output PIXOUT1 data line for outputting a voltage corresponding to the charge on the FD1 node as a PIXOUT1 signal.

The sixth transistor 2113 may include a gate terminal for receiving the TXRMD signal for completely transferring charge remaining in the PPD 2101 to a second floating diffusion node FD2, a first S/D terminal connected to the cathode of the PPD 2101, and a second S/D terminal connected to the FD2 node. The FD2 node may have a second capacitance. There may be a parasitic capacitance between the FD2 node and ground, which is not indicated in FIG. 21. In one embodiment, a physical capacitance may also be connected between the FD2 node and ground. In one embodiment, the second capacitance of the FD2 node may be equal to the first capacitance of the FD1 node. Any remaining charge in the PPD 2101 may be transferred through the sixth transistor 2113 to the FD2 node.

The seventh transistor 2115 may include a gate terminal connected to the second S/D terminal of the sixth transistor 2113 and to the FD2 node, a first S/D terminal for receiving the VPIX voltage, and a second S/D terminal. The seventh transistor 2115 may operate to convert a charge on stored on the FD2 node to a voltage at the second S/D terminal of the seventh transistor.

The eighth transistor 2117 may include a gate terminal for receiving the RST signal for setting the charge level of the FD2 node, a first S/D terminal for receiving the VPIX signal, and a second S/D terminal connected to the source terminal of the sixth transistor 2113.

The ninth transistor 2119 may include a gate terminal for receiving the SEL signal for selecting the pixel to readout a voltage corresponding to the charge in the FD2 node, a first S/D terminal connected to the second S/D terminal of the seventh transistor 2115, and a second S/D terminal connected to a pixel output PIXOUT2 data line for outputting a voltage corresponding to the charge on the FD2 node as a PIXOUT2 signal.

In one embodiment, the VTX signal (and the TX signal) may be ramped up to transfer charge from the PPD 2101 to the FD1 node. The amount of charge transferred from the PPD 2101 to the FD1 node may be a function of the level of the TX signal, and the ramping of the TX voltage may be a function of time. Thus, the charge transferred from the PPD 2101 to the FD1 node may be a function of time. If, during the transfer of charge from the PPD 2101 to the FD1 node, the second transistor 2105 is turned off in response to the SPAD circuit 2001 detecting an incoming photon, the transfer of charge from the PPD 2101 to the FD1 node stops, and the amount of charge transferred to the FD1 node and the amount of charge remaining in the PPD 2101 are both related to the TOF of the incoming photon. The transfer of charge from the PPD 2101 to the FD1 node based on the TX signal and detection of incoming photos provides a single-ended-to-differential conversion of charge to time.

For the time-resolving sensor 2000, the ratio expressed in Eq. (2) may be used to determine depth or range of an object, and is less sensitive to measurement-to-measurement variations if PIXOUT1+PIXOUT2 does not vary from measurement to measurement. In one embodiment, the VTX signal may ideally be linear, and may ideally be uniform throughout the different pixels of a TOF pixel array. In practice, however, the VTX signal that may be applied to the different pixels of a TOF pixel array may vary from pixel to pixel, thereby introducing an error in a range measurement that depends on the variation of the VTX signal from pixel to pixel, and may also vary from measurement-to-measurement.

In one embodiment, the first transistor 2103, the second transistor 2105, the third transistor 2107, the fourth transistor 2109, the fifth transistor 2111, the sixth transistor 2113, the seventh transistor 2115, the eighth transistor 2117, and the ninth transistor 2119 may each be an n-type MOSFET or a p-type MOSFET; however any other suitable transistor may be used.

Figure 22:
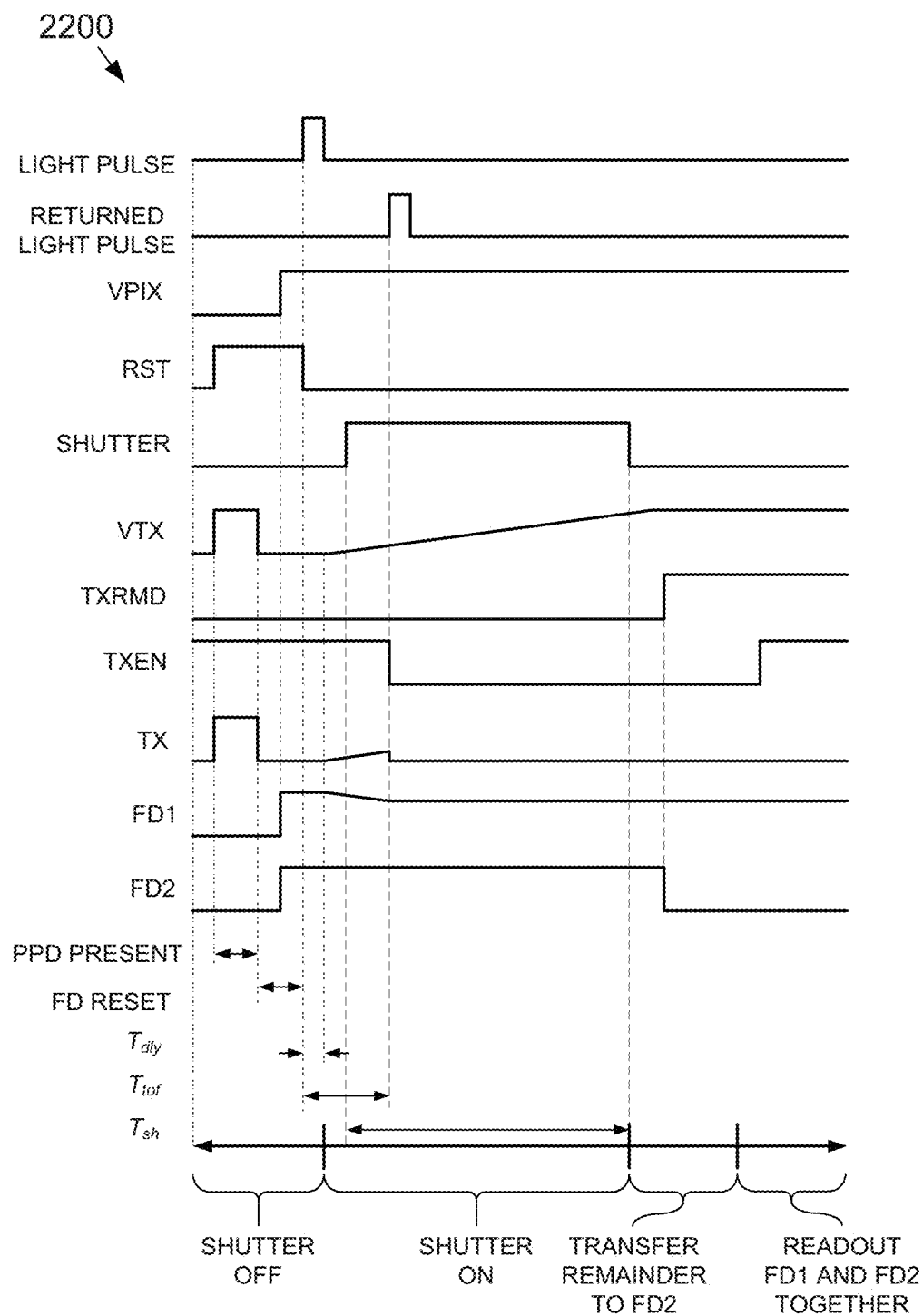
FIG. 22 depicts an example relative signal timing diagram for the time-resolving sensor of FIG. 20 according to the subject matter disclosed herein.

FIG. 22 depicts an example relative signal timing diagram 2200 for the time-resolving sensor 2000 according to the subject matter disclosed herein. The signal timing diagram of FIG. 22 is similar to the signal timing diagram of FIG. 19 and the similarities are described with reference to FIG. 19. The signal timing diagram of FIG. 22 differs by including a FD2 signal and that at the end of the Shutter On period, the remaining charge on the PPD 2101 is transferred to the FD2 node by operation of the TXRMD signal. Additionally, the PIXOUT1 and PIXOUT2 signals may be readout simultaneously.

It should be noted that the second PPD circuit 2005 relies on an invariant full-well capacity to determine a maximum range; however, practical implementations of the time-resolving sensor 2000 may experience full-well variations for the PPD 2101 based on thermal noise between different second PPD circuits 2005. Additionally, the VTX signal may have different ramps (slopes) based on the location of a pixel in a pixel array. That is, the ramp (slope) of the VTX signal at a pixel may vary depending on how close the pixel is from the source of the VTX signal.

Figure 23:
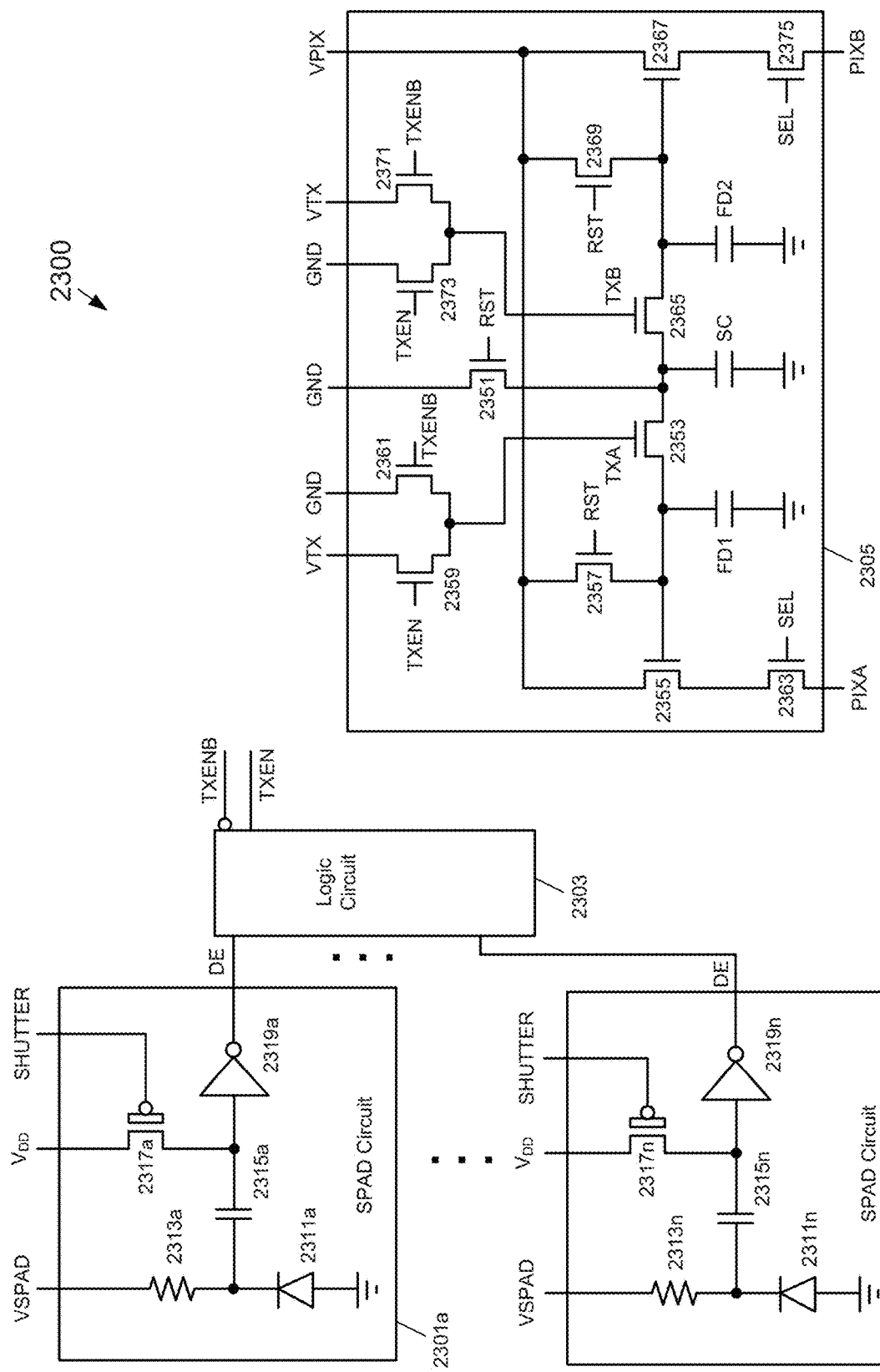
FIG. 23 depicts a block diagram of still another example embodiment of a time-resolving sensor according to the subject matter disclosed herein.

FIG. 23 depicts a block diagram of still another example embodiment of a time-resolving sensor 2300 according to the subject matter disclosed herein. The time-resolving sensor 2300 may include one or more SPAD circuits 2301*a*-2301*n*, a logic circuit 2303, and a third PPD circuit 2305.

In one embodiment, each of the one or more SPAD circuits 2301 may include a SPAD 3211, a resistor 2313, a capacitor 2315, a p-type MOSFET transistor 2317 and a buffer 2319. The SPAD 2311 may include an anode connected to a ground potential, and a cathode. The resistor 2313 may include a first terminal for receiving a VSPAD voltage and a second terminal connected to the cathode of the SPAD 2311. In another embodiment, the positions of the SPAD 2311 and the resistor 2313 may be swapped. The SPAD 2311 may respond to light. In response to receiving a photon, the SPAD 2311 outputs a pulse signal that goes rapidly from the VSPAD voltage to below breakdown voltage, and then more gradually returns to the VSPAD voltage.

The capacitor 2315 may include a first terminal connected to the cathode of the SPAD 2311 and a second terminal. In an alternative embodiment, the capacitor 2315 may be omitted. The p-type MOSFET 2317 may include a first S/D terminal connected to the second terminal of the capacitor 2315, a gate for receiving a SHUTTER signal, and a second S/D terminal for receiving a VPIX voltage ($V_{DD}$). The buffer 2319 may include an input connected to the second terminal of the capacitor 2315, and an inverting output, which may output the DE signal corresponding to the output of the SPAD circuit 2311. In an alternative embodiment, the buffer 2319 may be noninverting.

The logic circuit 2303 may include inputs connected to the DE signal of each of the one or more SPAD circuit 2301a-2301n, and outputs a TXEN signal and a TXENB signal, which may be an inversion of the TXEN signal.

The third PPD circuit 2305 may include a capacitive device SC, a first transistor 2351, a second transistor 2353, a third transistor 3255, a fourth transistor 2357, a fifth transistor 2359, a sixth transistor 2361, a seventh transistor 2363, an eighth transistor 2365, a ninth transistor 2367, a tenth transistor 2369, an eleventh transistor 2371, a twelfth transistor 2373, and a thirteenth transistor 2375.

The capacitive device SC may include a first terminal connected to a ground potential, and a second terminal. The capacitive device SC may store a charge in a manner that is similar to a capacitor. In one embodiment, the capacitive device SC may be a capacitor. In another embodiment, the capacitive device SC may be a PPD that may be covered so that it does not respond to light. In either embodiment, the capacitive device SC may be used as part of a TCC.

The first transistor 2351 may include a gate terminal connected to an RST signal, a first S/D terminal connected to a ground potential, and a second S/D terminal connected to the second terminal of the capacitive device SC.

The second transistor 2353 may include a gate terminal connected to a TXA signal, a first S/D terminal connected to a first floating diffusion FD1 node, and a second S/D terminal connected to the second S/D terminal of the first transistor 2351 and the second terminal of the capacitive device SC. The first floating diffusion FD1 node is represented in FIG. 23 with a capacitor symbol. There may be a parasitic capacitance between the FD1 node and ground, which is not indicated in FIG. 23. In one embodiment, a physical capacitance may also be connected between the FD1 node and ground.

The third transistor 2355 may include a gate terminal connected to the FD1 node and the first S/D terminal of the second transistor 2353, a first S/D terminal connected to a VPIX voltage, and a second S/D terminal. The third transistor 2355 may operate to convert a charge on the FD1 node to a voltage at the second S/D terminal of the third transistor 2355.

The fourth transistor 2357 may include a gate terminal connected to the RST signal, a first S/D terminal connected to the VPIX voltage, and a second S/D terminal connected to the second S/D terminal of the first transistor 2351 and the second terminal of the capacitive device SC.

The fifth transistor 2359 may include a gate terminal connected to the TXEN signal, a first S/D terminal connected to a VTX signal, and a second S/D terminal connected to the gate terminal of the second transistor 2353.

The sixth transistor 2361 may include a gate terminal connected to the TXENB signal, a first S/D terminal connected to a ground potential, and a second S/D terminal connected to the gate terminal of the second transistor 2353 and the second S/D terminal of the fifth transistor 2359.

The seventh transistor 2363 may include a gate terminal connected to an SEL signal, a first S/D terminal connected to the second S/D terminal of the third transistor 2355, and a second S/D terminal connected to a pixel output line PIXA.

The eighth transistor 2365 may include a gate terminal connected to a TXB signal, a first S/D terminal connected to a second floating diffusion FD2 node, and a second S/D terminal connected to the second S/D terminal of the first transistor 2351, the second terminal of the capacitive device SC, and the second terminal of the second transistor 2353. The second floating diffusion FD2 node is represented in FIG. 23 with a capacitor symbol. There may be a parasitic capacitance between the FD2 node and ground, which is not indicated in FIG. 23. In one embodiment, a physical capacitance may also be connected between the FD2 node and ground.

The ninth transistor 2367 may include a gate terminal connected to the FD2 node and the first S/D terminal of the eighth transistor 2365, a first S/D terminal connected to the VPIX voltage, and a second S/D terminal. The ninth transistor 2367 may operate to convert a charge on the FD2 node to a voltage at the second S/D terminal of the ninth transistor 2367.

The tenth transistor 2369 may include a gate terminal connected to the RST signal, a first S/D terminal connected to the VPIX voltage, and a second S/D terminal connected to the second S/D terminal of the first transistor 2351, the second terminal of the capacitive device SC, and the second S/D terminal of the eighth transistor 2365.

The eleventh transistor 2371 may include a gate terminal connected to the TXENB signal, a first S/D terminal connected to the VTX signal, and a second S/D terminal connected to the gate terminal of the eighth transistor 2365.

The twelfth transistor 2373 may include a gate terminal connected to the TXEN signal, a first S/D terminal connected to a ground potential, and a second S/D terminal connected to the gate terminal of the eighth transistor 2365 and the second S/D terminal of the eleventh transistor 2371.

The thirteenth transistor 2375 may include a gate terminal connected to the SEL signal, a first S/D terminal connected to the second S/D terminal of the ninth transistor 2367, and a second S/D terminal connected to a pixel output line PIXB.

Figure 24:
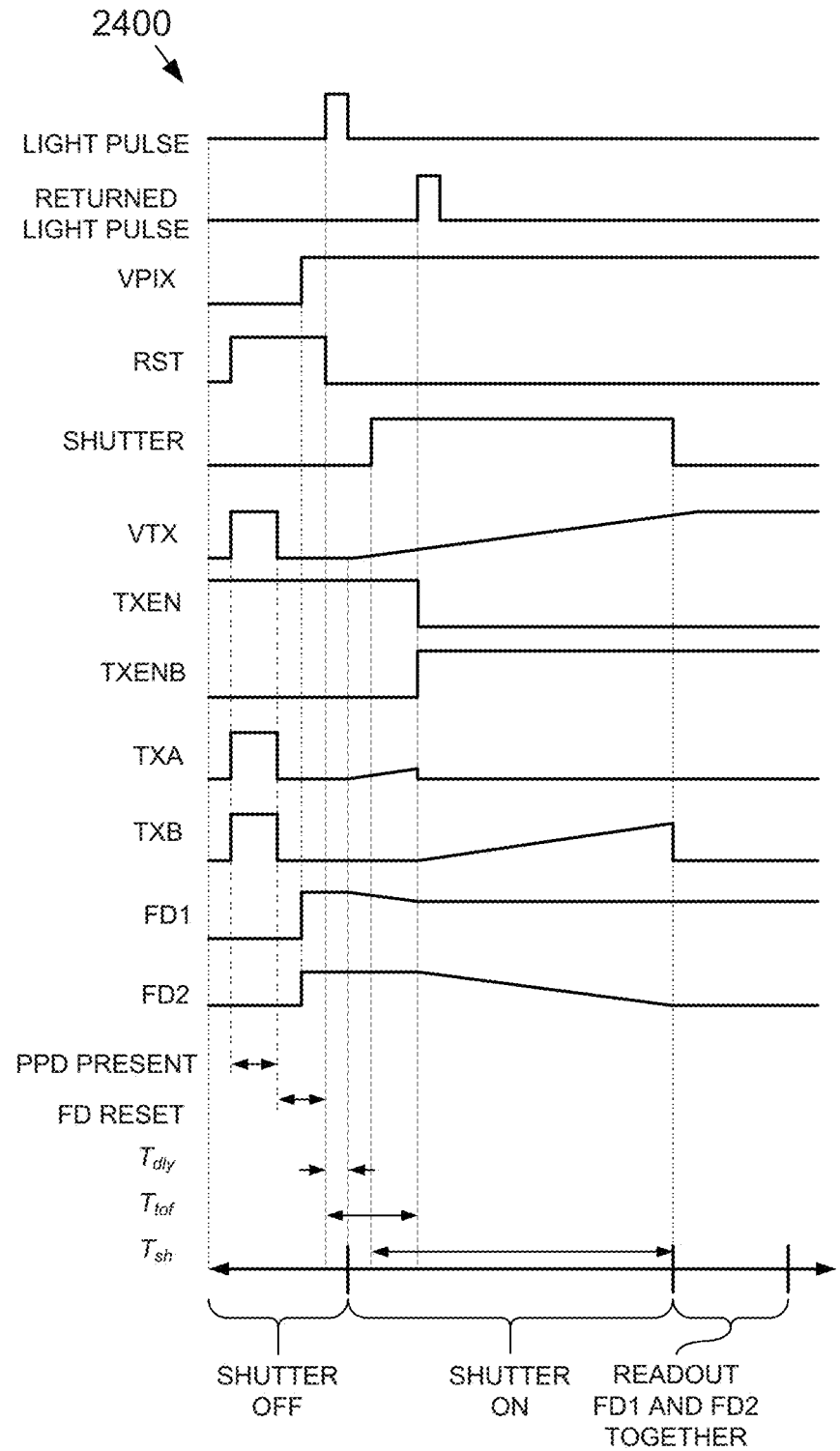
FIG. 24 depicts an example relative signal timing diagram for the time-resolving sensor of FIG. 23 according to the subject matter disclosed herein.

FIG. 24 depicts an example relative signal timing diagram 2400 for the time-resolving sensor 2300 according to the subject matter disclosed herein. The signal timing diagram of FIG. 24 is similar to the signal timing diagrams of FIGS. 19 and 22 and the similarities are described with reference to FIG. 19. The signal timing diagram of FIG. 24 differs from the signal time diagram of FIG. 22 by not including a TXRMD signal and a TX signal, but instead including a TXENB, a TXA signal and a TXB signal.

In the signal timing diagram of FIG. 24, the TXENB signal is an inversion of the TXEN signal. When the SHUTTER signal is active high, the TXEN signal is active and the VTX signal is passed through the fifth transistor 2359, thereby making the TXA signal is active. The charge on the capacitive device SC is transferred through the second transistor 2353 to the FD1 node. Meanwhile, the ground potential is passed through the twelfth transistor 2373, which makes the TXB signal inactive.

When a detection event DE occurs, the TXEN signal becomes inactive and the TXENB signal becomes active. When the TXEN signal becomes inactive, the TXA signal also become inactive and charge is stopped from being transferred through the second transistor 2353 from the capacitive device SC to the FD1 node. When the TXENB signal becomes active, the TXB signal becomes active and charge is transferred from the capacitive device SC through the eighth transistor 2365 to the FD2 node.

When the SHUTTER signal ends, the TXB signal becomes inactive and charge is stopped from being transferred through the eighth transistor 2365 from the capacitive device SC to the FD2 node. The respective voltages associated with the charges on the FD1 node and the FD2 node are read out from the PIXA and PIXB output lines.

It should be noted that variations in the slope of the VTX signal and variations in the capacitance of the capacitive device SC from pixel to pixel do not cause range measurement errors, as long as the second transistor 2353 (TXA) and the eighth transistor 2365 (TXB) operate in a linear mode during an active SHUTTER signal.

Figure 25:
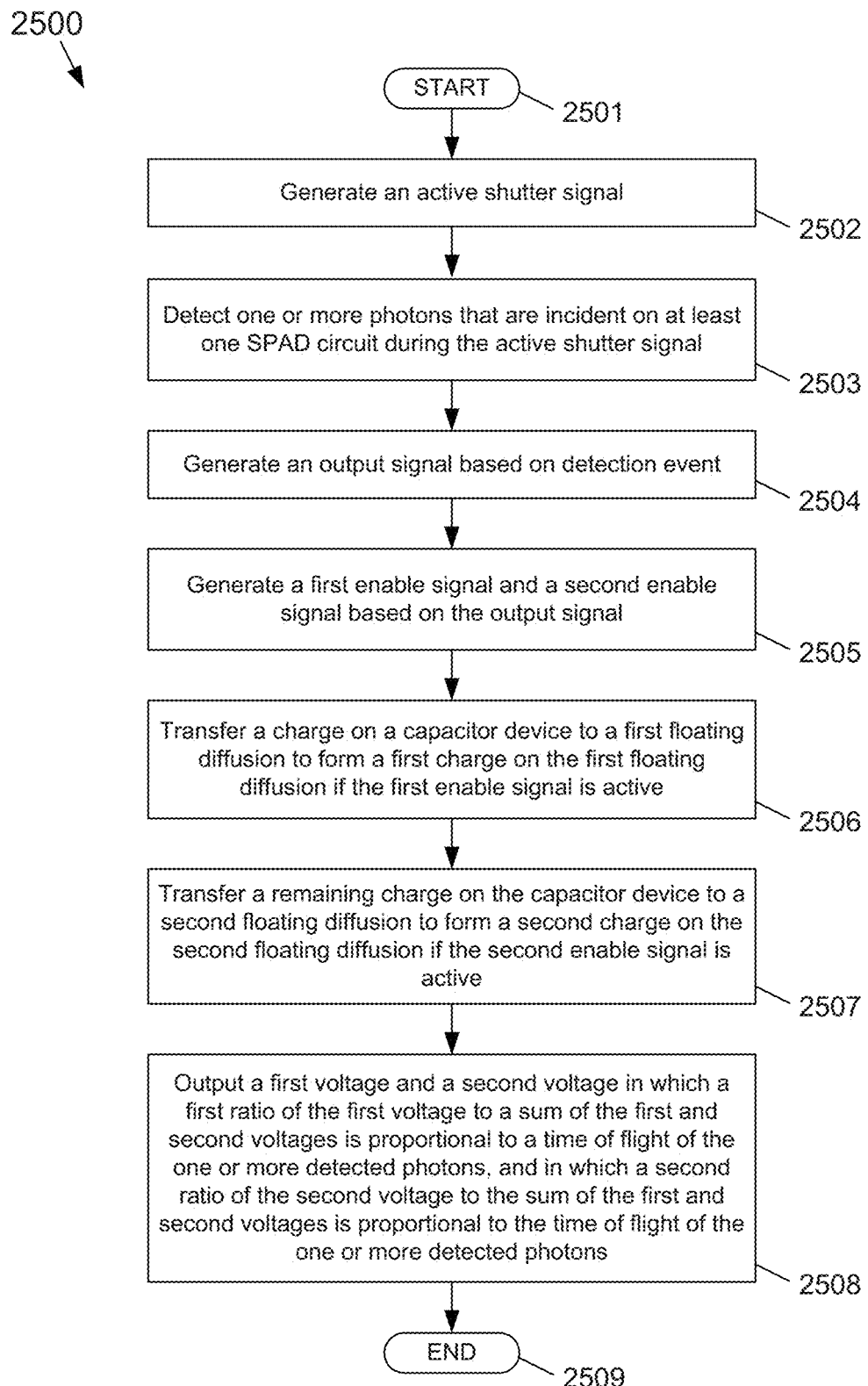
FIG. 25 depicts a flow diagram of a method to resolve time using the time resolving sensor of FIG. 23 according to the subject matter disclosed herein.

FIG. 25 depicts a flow diagram of a method 2500 to resolve time using the time resolving sensor 2300 according to the subject matter disclosed herein. The method starts at 2501. At 2502, an active shutter signal is generated. At 2503, one or more photons that are incident on at least one SPAD circuit 2301 are detected (a detection event DE) during the active shutter signal in which the one or more detected photons have been reflected from an object. At 2504, an output signal based on the detection event DE. At 2505, a first enable signal TXEN and a second enable signal TXENB are generated based on the output signal for the detection event DE. In one embodiment, the first enable signal becomes active in response to a beginning of the active shutter signal and becomes inactive in response to the output signal, and the second enable signal becomes active in response to the output signal and becomes inactive in response to an end of the active shutter signal.

At 2506, a charge on a capacitive device SC to a first floating diffusion FD1 node to form a first charge on the first floating diffusion FD1 node if the first enable signal is active. At 2507, a remaining charge on the capacitive device SC to a second floating diffusion FD2 node to form a second charge on the second floating diffusion FD2 node if the second enable signal is active. At 2508, a first voltage that is based on the first charge and a second voltage that is based on the second charge are output. A first ratio of the first voltage to a sum of the first and second voltages is proportional to a time of flight of the one or more detected photons, and a second ratio of the second voltage to the sum of the first and second voltages is proportional to the time of flight of the one or more detected photons. At 2509, the method ends.

In one embodiment, transferring the first and second charges further includes changing a drive signal VTX according to a ramp function in which the drive signal VTX begins to change in response to a beginning time of a light pulse from which the one or more detected photons are detected to the end of the active shutter signal. Additionally, transferring the charge on the capacitive device to the first floating diffusion to form the first charge on the first floating diffusion may be further based on a level of the drive signal when the first enable signal is active, and transferring the remaining charge on the capacitive device to the second floating diffusion to form the second charge on the second floating diffusion may be further based on the level of the drive signal when the second enable signal is active.

In another embodiment, the first ratio of the first voltage to the sum of the first and second voltages may be further proportional to the time of flight of the one or more detected photons minus a delay time. Similarly, the second ratio of the second voltage to the sum of the first and second voltages may be further proportional to the time of flight the one or more detected photons minus a delay time, the delay time comprising a time between a beginning of a transmission time of the light pulse to a time that the drive signal begins to change.

LiDAR (Light Detection and Ranging) systems that use SPADs typically do not provide an imaging capability based on light intensity. Intensity imaging together with range information may significantly improve object recognition performance in an advanced driver-assistance system (ADAS) and autonomous driving applications. The subject matter disclosed herein provides an imaging system that provides both range and intensity imaging information. Both the range image and the intensity image are generated from the same source, so no image alignment issue exists, and/or no complicated fusion algorithm is needed. Embodiments of pixels disclosed herein that are configured to be TCCs. Additionally, pixels that are configured to be time-to-digital converters (TDC) may also be used, but may provide an image having a spatial resolution that is less than pixels that are configured to be TCCs. That is, pixels configured to be TCCs are smaller and may provide pixel arrays that have a higher resolution that pixel arrays using pixels configured to be TDCs.

One example embodiment of an imaging system that may provide range and light intensity information is the imaging system 15 depicted in FIG. 1. The pixel array 42 may include embodiments of TCC pixels disclosed herein, such as pixel 43 depicted in FIG. 5, pixel 700 depicted in FIG. 7, pixel 1300 depicted in FIG. 13, pixel 2100 depicted in FIG. 21 and/or pixel 2300 depicted in FIG. 23. The light source 22 is controlled to provide a point scan, such as disclosed in connection with FIGS. 3 and 4, that is synchronized with the pixel-processing unit 46. The point scan may be repeated multiple times to provide a statistical averaging for both range information and light intensity information. The light intensity information may be used to determine a reflectivity of objects in the field of view of the imaging system 15. In an alternative embodiment, the light source 22 may be controlled to illuminate an entire scene. If multiple light pulses are projected and captured, a histogram may be formed for each pixel, and by summing the bins near the peak in the histogram, a greyscale image may be produced that may be used to significantly improve object recognition performance in ADASs and autonomous driving applications. It should be kept in mind that an alternative embodiment may use pixels configured to provide a TDC output.

Reflectivity of each spot captured by the image-sensor unit 24 may be determined based on a distance and a greyscale value for the spot. A grayscale image may also be generated without the presence of laser pulses. By adding multiple frames together, the image-sensor unit 24 may operate like a Quanta image sensor, which captures at most one photon per frame per pixel. When adding multiple bit-planes (i.e., frames) together, high dynamic-range imaging may be achieved. By using both a 3D and a 2D image that has been generated from the same image-sensor unit for object recognition, a complicated image fusion process can be avoided and the performance of recognition may be improved.

In one embodiment, a grayscale value for a pixel may be generated by directly using a peak value of a histogram of arrival time (i.e., detection time) of photons detected by the pixel. The window width may be the same as the full width at half-maximum (FWHM) of a projected laser, or light, pulse. A histogram of photo-detection times may be formed and the bin corresponding to the peak number of detected photos may be used to estimate the surface reflectance S of the object at the point where a light pulse has been reflected.

Alternatively, the histogram for a pixel may be convolved with the trigger waveform output from a SPAD, and the maximum detected photon count is then selected.

Figure 26A:
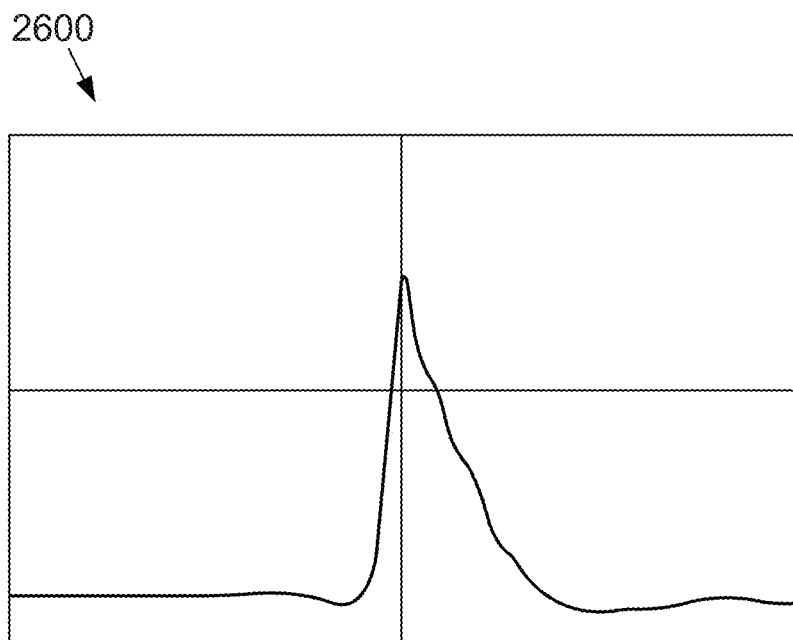
FIG. 26A depicts an example trigger waveform output from a SPAD.
Figure 26B:
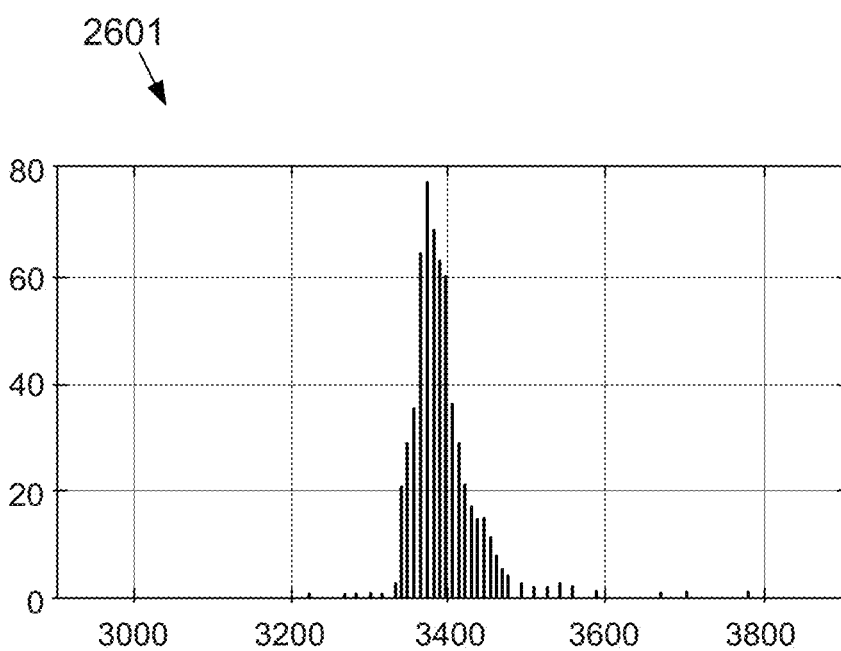
FIG. 26B depicts an example histogram of photo-detection times of an example pixel that may be formed according to the subject matter disclosed herein.

FIG. 26A depicts an example trigger waveform 2600 output from a SPAD. The abscissa of FIG. 26 is relative time (no units) and the ordinate of FIG. 26 is relative amplitude (no units). FIG. 26B depicts an example histogram 2601 of photo-detection times of an example pixel that may be formed according to the subject matter disclosed herein. The abscissa of FIG. 26B is relative normalized time and the ordinate is photon-detection event count.

Figure 26C:
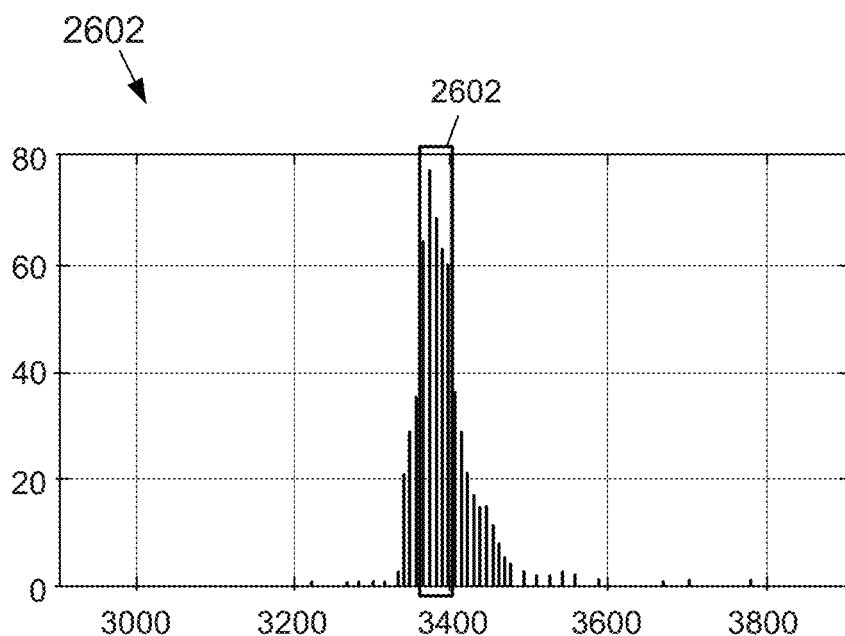
FIG. 26C depicts an example histogram in which a window width representing the FWHM of a projected pulse (not shown) is indicated in which an event count maximum may be determined according to the subject matter disclosed herein.
Figure 26D:
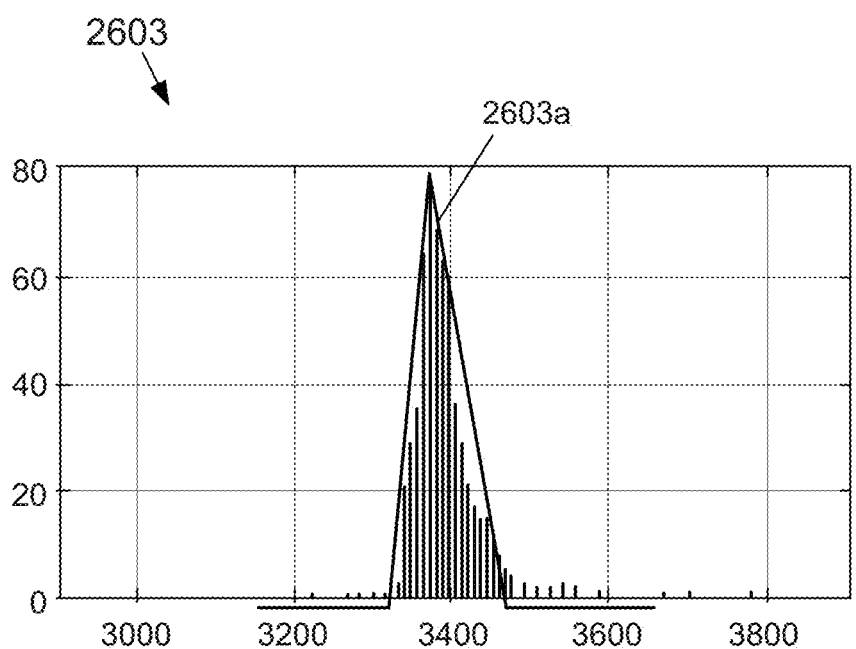
FIG. 26D depicts an example histogram in which the trigger waveform output from a SPAD (FIG. 26) is convolved with the histogram to determine an event count maximum according to the subject matter disclosed herein.

FIG. 26C depicts an example histogram 2602 in which a window width representing the FWHM of a projected pulse (not shown) is indicated at 2602*a* to indicate a window in which an event count maximum may be determined. FIG. 26D depicts an example histogram 2603 in which the trigger waveform output from a SPAD (FIG. 26) is convolved with the histogram to determine an event count maximum.

Surface reflectance S may be estimated starting from the following equation:

$$P = a*S*L \quad (5)$$

in which P is pixel value; $\alpha$ is a system dependent constant that converts lux to a pixel value; S is surface reflectance, L is the light intensity. The light intensity L may be represented by $L_{amb} + L_{laser}$, which respectively is the ambient light intensity and laser light intensity arriving at the sensor.

Thus, the surface reflectance S may be estimated as $$S = \frac{P}{[\alpha*(L_{amb} + L_{laser})]}. \quad (6)$$

The ambient light intensity $L_{amb}$ may be expressed as $$L_{amb} = [(\beta*M/D)/N]*L_{easer} \quad (7)$$

in which N is the number of detected events from the light pulse, M is the number of detected events before the light pulse is detected (i.e., from the ambient), D is the estimated distance, and $\beta$ is another system-dependent variable that may be calibrated.

Figure 27:
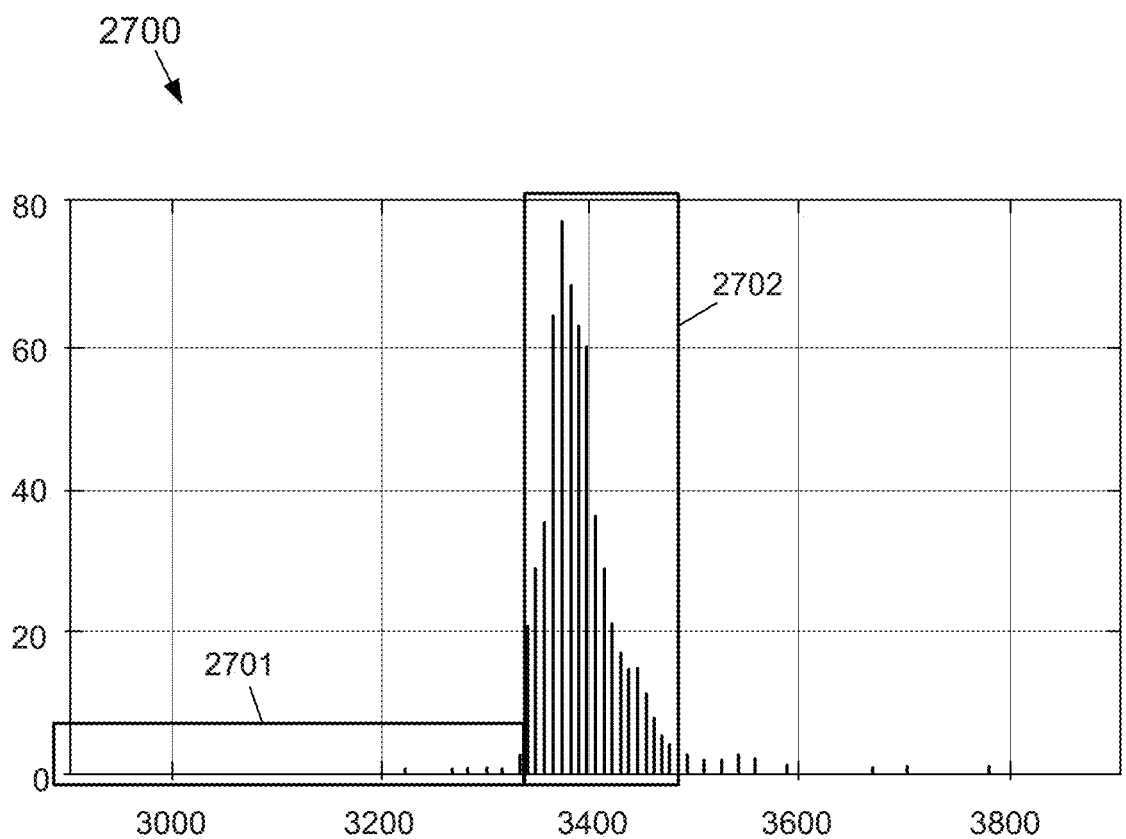
FIG. 27 depicts an example histogram for an example pixel according to the subject matter disclosed herein.

FIG. 27 depicts an example histogram 2700 for an example pixel according to the subject matter disclosed herein. The abscissa of the histogram 2700 is in relative time (no units), and the ordinate of the histogram 2700 is a count of photon-detection events. The number of detected events M before the light pulse is detected is indicated at 2701. The number of detected events N within the light pulse is indicated at 2702.

The relationship between emitting laser power, denoted by $l_{laser}$, and receiving laser power $L_{laser}$ may be:

$$L_{laser} = \gamma*(1/D^2)*l_{laser} \quad (8)$$

in which $\gamma$ is a system constant.

Then, the estimate of reflectivity S at location (x, y) may be expressed as:

$$S(x,y) = f(D(x,y))*P/l_{laser} \quad (9)$$

in which f (D) a distance-dependent function, i.e., $$f = 1/[\alpha*(1+\beta*M/D*N)*\gamma*(1/D^2)] \quad (10)$$

as derived above.

Figure 28:
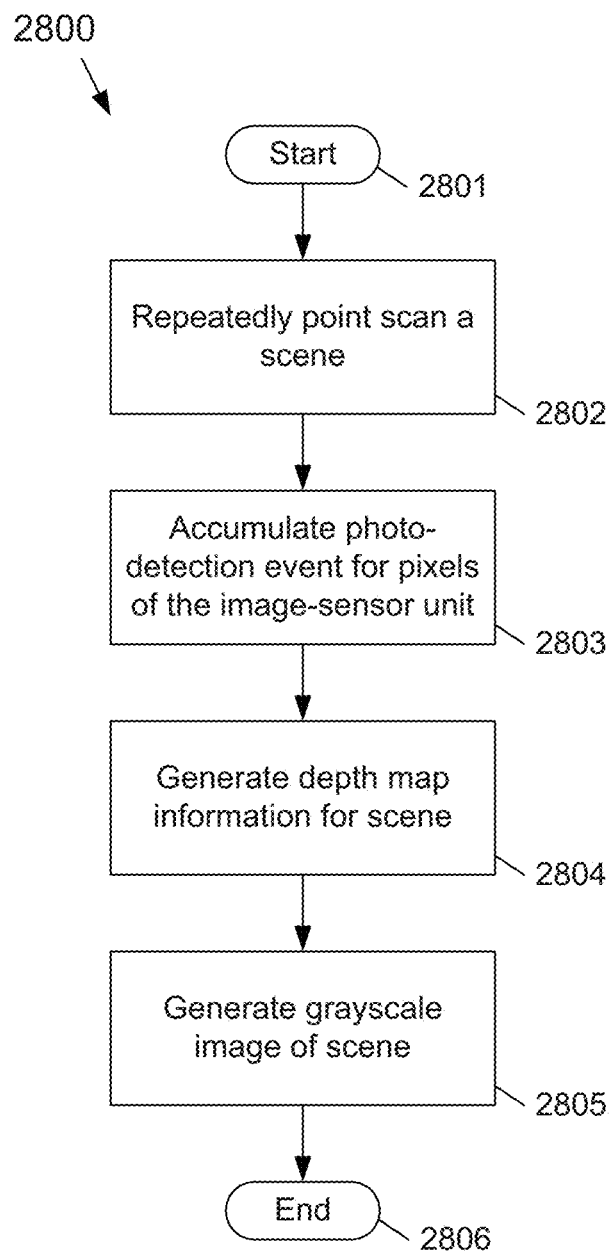
FIG. 28 depicts a flowchart of an example method of generating a depth, or range, map and a grayscale image of a scene according to the subject matter disclosed herein.

FIG. 28 depicts a flowchart 2800 of an example method of generating a depth, or range, map and a grayscale image of a scene according to the subject matter disclosed herein. The method starts at 2801. At 2802, a scene is point scanned by, for example, the imaging system 15 depicted in FIG. 1. The pixel array 42 of the imaging system 15 may include example pixels 43 (FIG. 5), 700 (FIG. 7), 1300 (FIG. 13), 2100 (FIG. 21) and/or 2300 (FIG. 23). The point scan may be performed only one, although it should be understood that better results may be obtained for repeating the point scan multiple times. At 2803, photo-detection events are accumulated for the pixels of the pixel array 42. At 2804, a depth, or range, map is generated as disclosed herein. The range information may be determined by the pixel-processing unit 46 and/or the processor 19. At 2805, a grayscale image of the scene is generated based on an estimate of the reflectivity of the scene. The grayscale image may be determined by the pixel-processing unit 46 and/or the processor 19. The method ends at 2806.

Figure 29C:
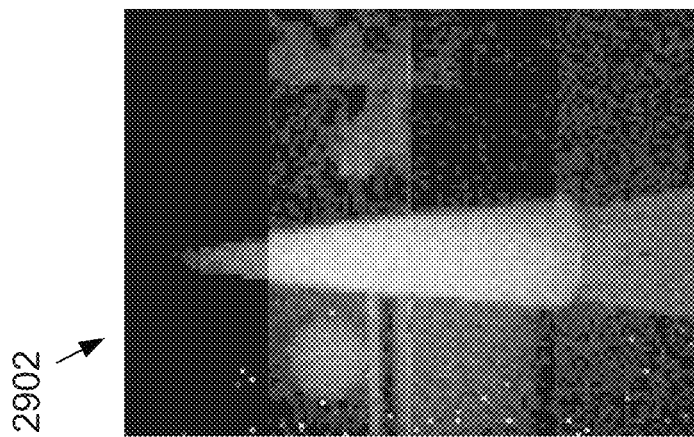
FIGS. 29B and 29C respectively depicts an example depth map and an example grayscale image of the scene depicted in FIG. 29A that have been formed according to the subject matter disclosed herein.
Figure 29B:
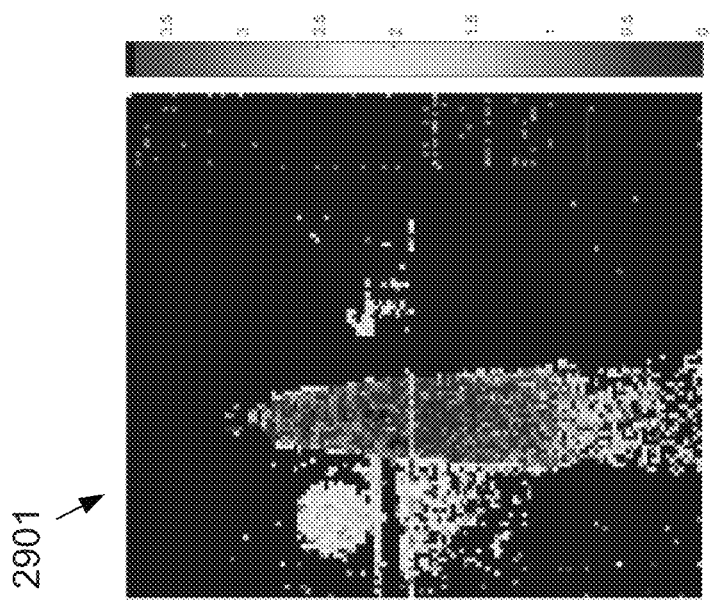
Figure 29A:
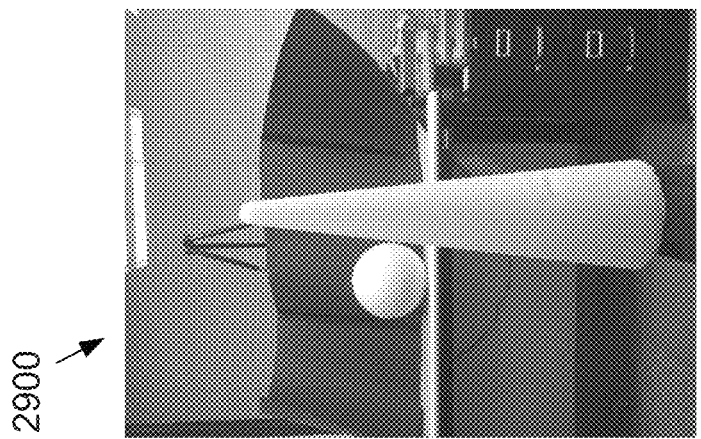
FIG. 29A depicts an example scene.

FIG. 29A depicts an example scene 2900. FIGS. 29B and 29C respectively depicts an example depth map 2901 and an example grayscale image 2902 of the scene depicted in FIG. 29A that have been formed according to the subject matter disclosed herein. The scale on the right side of FIG. 29B is in meters.

Figure 30:
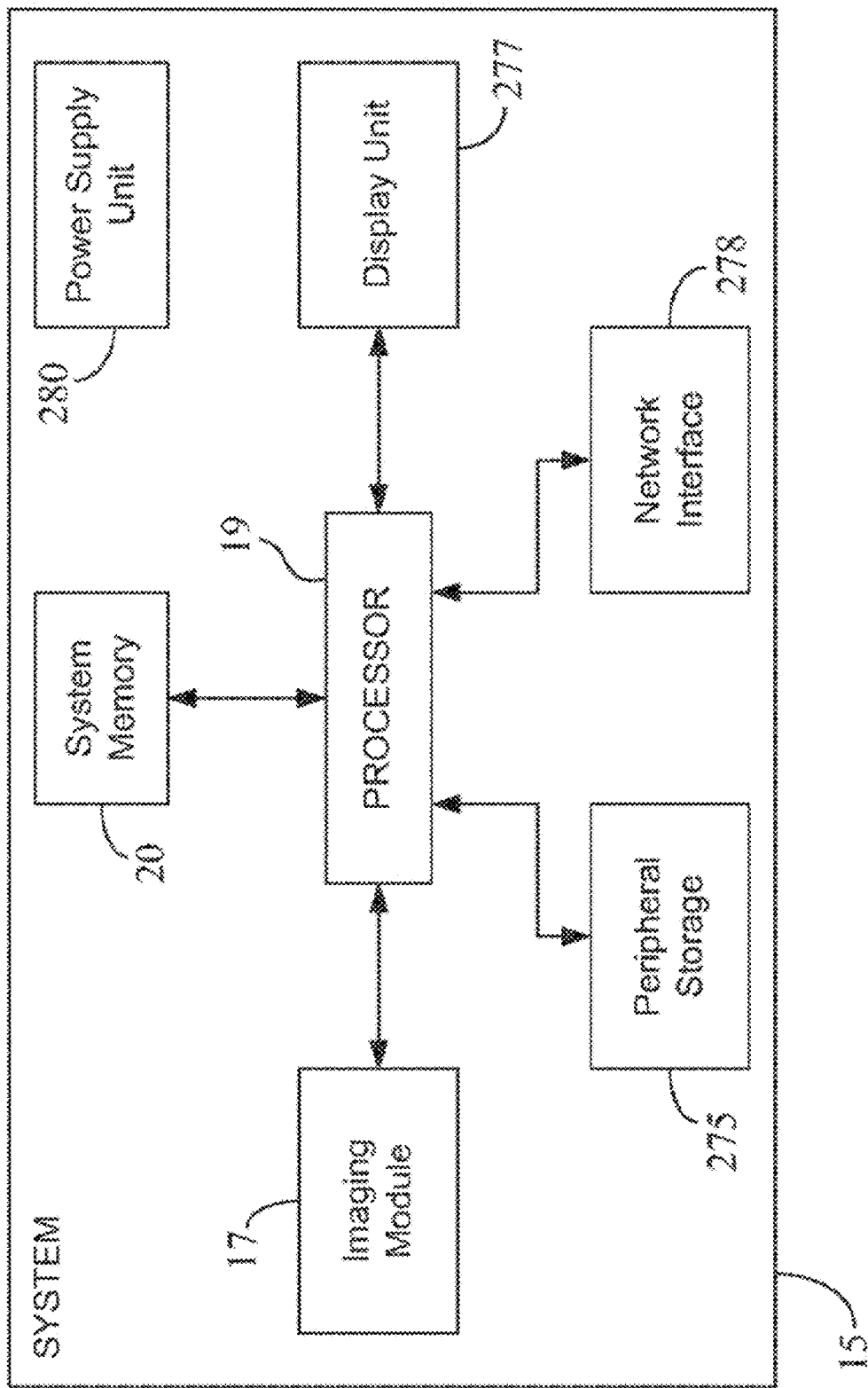
FIG. 30 depicts an example embodiment of an overall layout of the imaging system depicted in FIGS. 1 and 2 according to the subject matter disclosed herein.

FIG. 30 depicts an example embodiment of an overall layout of the imaging system 15 depicted in FIGS. 1 and 2 according to the subject matter disclosed herein. The imaging module 17 may include the desired hardware shown in the exemplary embodiments of FIG. 2, 5, 7 (or 13) to accomplish 2D/3D imaging and TOF measurements as per the inventive aspects of the present disclosure. The processor 19 may be configured to interface with a number of external devices. In one embodiment, the imaging module 17 may function as an input device that provides data inputs in the form of processed pixel outputs such as, the P1 and P2 values in FIG. 12, to the processor 19 for further processing. The processor 19 may also receive inputs from other input devices (not shown) that may be part of the system 15. Some examples of such input devices include a computer keyboard, a touchpad, a touch-screen, a joystick, a physical or virtual "clickable button," and/or a computer mouse/pointing device. In FIG. 30, the processor 19 is shown coupled to the system memory 20, a peripheral storage unit 275, one or more output devices 277, and a network interface unit 278. In FIG. 30, a display unit is shown as an output device 277. In some embodiments, the system 15 may include more than one instance of the devices shown. Some examples of the system 15 include a computer system (desktop or laptop), a tablet computer, a mobile device, a cellular phone, a video gaming unit or console, a machine-to-machine (M2M) communication unit, a robot, an automobile, a virtual reality equipment, a stateless thin client system, a dash-cam or rearview camera system of a vehicle, an autonomous navigation system, or any other type of computing or data processing device. In various embodiments, all of the components shown in FIG. 30 may be housed within a single housing. Thus, the system 15 may be configured as a standalone system or in any other suitable form factor. In some embodiments, the system 15 may be configured as a client system rather than a server system.

In some embodiments, the system 15 may include more than one processor (e.g., in a distributed processing configuration). When the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Unit (CPU).

The system memory 20 may be any semiconductor-based storage system such as, for example, DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data-storage medium.

The peripheral storage unit 275, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, and the like. In some embodiments, the peripheral storage unit 275 may include more complex storage devices/systems such as disk arrays (which may be in a suitable RAID (Redundant Array of Independent Disks) configuration) or Storage Area Networks (SANs), and the peripheral storage unit 275 may be coupled to the processor 19 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 277 may be an example of an output device. Other examples of an output device include a graphics/display device, a computer screen, an alarm system, a CAD/CAM (Computer Aided Design/Computer Aided Machining) system, a video game station, a smartphone display screen, a dashboard-mounted display screen in an automobile, or any other type of data output device. In some embodiments, the input device(s), such as the imaging module 17, and the output device(s), such as the display unit 277, may be coupled to the processor 19 via an I/O or peripheral interface(s).

In one embodiment, the network interface 278 may communicate with the processor 19 to enable the system 15 to couple to a network (not shown). In another embodiment, the network interface 278 may be absent altogether. The network interface 278 may include any suitable devices, media and/or protocol content for connecting the system 15 to a network, whether wired or wireless. In various embodiments, the network may include Local Area Networks (LANs), Wide Area Networks (WANs), wired or wireless Ethernet, telecommunication networks, satellite links, or other suitable types of networks.

The system 15 may include an on-board power supply unit 280 to provide electrical power to various system components illustrated in FIG. 30. The power supply unit 280 may receive batteries or may be connectable to an AC electrical power outlet or an automobile-based power outlet. In one embodiment, the power supply unit 280 may convert solar energy or other renewable energy into electrical power.

In one embodiment, the imaging module 17 may be integrated with a high-speed interface such as, for example, a Universal Serial Bus 2.0 or 3.0 (USB 2.0 or 3.0) interface or above, that plugs into any Personal Computer (PC) or laptop. A non-transitory, computer-readable data storage medium, such as, for example, the system memory 20 or a peripheral data storage unit such as a CD/DVD may store program code or software. The processor 19 and/or the pixel-processing unit 46 (FIG. 2) in the imaging module 17 may be configured to execute the program code, whereby the system 15 may be operative to perform the 2D imaging (for example, grayscale image of a 3D object), TOF and range measurements, and generation of a 3D image of an object using the pixel-specific distance/range values, such as the operations discussed earlier with reference to FIGS. 1-29. For example, in certain embodiments, upon execution of the program code, the processor 19 and/or the pixel-processing unit 46 may suitably configure (or activate) relevant circuit components, such as the row decoder/driver 125 and the pixel column unit 128 in FIG. 12, to apply appropriate input signals, like the Shutter, RST, VTX, SEL signals, and so on, to the pixels 43 in the pixel array 42 to enable capture of the light from a returned laser pulse and to subsequently process the pixel outputs for pixel-specific P1 and P2 values needed for TOF and range measurements. The program code or software may be proprietary software or open source software which, upon execution by the appropriate processing entity, such as the processor 19 and/or the pixel-processing unit 46, may enable the processing entity to process various pixel-specific ADC outputs (P1 and P2 values), determine range values, render the results in a variety of formats including, for example, displaying a 3D image of the distant object based on TOF-based range measurements. In certain embodiments, the pixel-processing unit 46 in the imaging module 17 may perform some of the processing of pixel outputs before the pixel output data are sent to the processor 19 for further processing and display. In other embodiments, the processor 19 also may perform some or all of the functionality of the pixel-processing unit 46, in which case, the pixel-processing unit 46 may not be a part of the imaging module 17.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. An image sensor, comprising:
a time-resolving sensor comprising at least one pixel, the time-resolving sensor outputting a first signal and a second signal based on detecting by the at least one pixel one or more photons that have been reflected off a surface of an object, a first ratio of a magnitude of the first signal to a sum of the magnitude of the first signal and a magnitude of the second signal being proportional to a time of flight of the one or more detected photons, and a second ratio of the magnitude of the second signal to the sum of the magnitude of the first signal and the magnitude of the second signal being proportional to the time of flight of the one or more detected photons; and
a processor configured to determine a surface reflectance of the object where the one or more photons detected by the at least one pixel has been reflected based on the first signal and the second signal.

2. The image sensor of claim 1, wherein the processor is further configured to determine a distance to the object based on the first signal and second signal.

3. The image sensor of claim 1, wherein the time-resolving sensor outputs a plurality of pairs of first and second signals based on detecting one or more photons at the pixel that have been reflected from the object for a plurality of light pulses, each pair of first and second signals corresponding to a respective light pulse, and wherein the processor is further configured to determine the surface reflectance of the object where the light pulse has been reflected based on a plurality of pairs of first and second signals.

4. The image sensor of claim 3, wherein the time-resolving sensor outputs a pair of the first and second signals based on detecting at each of a plurality of pixels one or more photons that have been reflected from an object corresponding to a respective light pulse, and wherein the processor is further configured to generate a grayscale image of the object based on the plurality of pairs of first and second signals.

5. The image sensor of claim 4, wherein the processor is further configured to generate at least one histogram of an arrival time of photons detected by a predetermined pixel of the plurality of pixels to generate the grayscale image.

6. The image sensor of claim 3, wherein the time-resolving sensor further comprises a plurality of pixels, at least one pixel of the plurality of pixels comprising:

at least one single-photon avalanche diode (SPAD), each SPAD being responsive to an active shutter signal to generate an output signal based on detecting one or more photons that are incident on the SPAD and that have been reflected from the object;

a logic circuit coupled to the output signal of the at least one SPAD, the logic circuit to generate a first enable signal and a second enable signal, the first enable signal being active in response to a beginning of the active shutter signal and being inactive in response to the output signal of the at least one SPAD, and the second enable signal being in active in response to the output signal of the at least one SPAD and being inactive in response to an end of the active shutter signal; and a differential time-to-charge converter (DTCC) circuit coupled to the first and second enable signals, the DTCC circuit comprising:

a capacitive device having a first terminal and a second terminal, the second terminal being coupled to a ground voltage;

a first switching device having first, second and third terminals, the first terminal of the first switching device being coupled to the first terminal of the capacitive device, the second terminal of the first switching device being coupled to a first floating diffusion, and the third terminal of the first switching device being coupled to the first enable signal, the first switching device being responsive to the first enable signal to transfer a first charge on the capacitive device to the first floating diffusion;

a second switching device having first, second and third terminals, the first terminal of the second switching device being coupled to the first terminal of the capacitive device, the second terminal of the second switching device being coupled to a second floating diffusion, and the third terminal of the second switching device being coupled to the second enable signal, the second switching device being responsive to the second enable signal to transfer a remaining charge on the capacitive device to the second floating diffusion; and an output circuit to output the pair of first and second signals, the first signal comprising a first voltage that is based on the first charge on the first floating diffusion and the second signal comprising a second voltage that is based on the remaining charge on the second floating diffusion.

7. The image sensor of claim 6, further comprising a drive signal that changes based on a ramp function, the drive signal beginning to change in response to a beginning time of a light pulse from which the one or more photons are detected to the end of the active shutter signal, the drive signal being connected to the third terminal of the first switching device based on the first enable signal being active and being connected to the third terminal of the second switching device based on the second enable signal being active.

8. The image sensor of claim 7, wherein the first ratio of the first voltage to the sum of the first voltage and the second voltage is further proportional to the time of flight of the one or more photons minus a delay time and the second ratio of the second voltage to the sum of the first voltage and the second voltage is further proportional to the time of flight of the one or more photons minus a delay time, the delay time comprising a time between a beginning of a transmission time of the light pulse to a time that the drive signal begins to change.

9. The image sensor of claim 6, wherein the capacitive device comprises a capacitor or a pinned diode.

10. An imaging unit, comprising:

a light source that illuminates an object with a sequence of light pulses;

a time-resolving sensor that is synchronized with the light source and outputting a first signal and a second signal based on detecting one or more photons corresponding to a light pulse that have been reflected from a surface of the object, a first ratio of a magnitude of the first signal to a sum of the magnitude of the first signal and a magnitude of the second signal being proportional to a time of flight of the one or more detected photons, and a second ratio of the magnitude of the second signal to the sum of the magnitude of the first signal and the magnitude of the second signal being proportional to the time of flight of the one or more detected photons; and a processor configured to determine a distance to the object based on the first signal and the second signal and to determine a surface reflectance of the object where the light pulse has been reflected based on the first signal and second signal.

11. The imaging unit of claim 10, wherein the time-resolving sensor outputs a plurality of pairs of the first signal and the second signal based on detecting one or more photons that have been reflected from the object, each pair of the first signal and the second signal corresponding to a respective light pulse of a plurality of light pulses, and wherein the processor is further configured to determine a plurality of surface reflectances of the object where each respective light pulse has been reflected based on a corresponding pair of the first signal and the second signal.

12. The imaging unit of claim 11, wherein the processor is further configured to generate a grayscale image of the object based on the plurality of surface reflectances.

13. The imaging unit of claim 12, wherein the processor is further configured to generate at least one histogram of an arrival time of photons to generate the grayscale image.

14. The imaging unit of claim 11, wherein the time-resolving sensor comprises a plurality of pixels, at least one pixel of the plurality of pixels comprising:

at least one single-photon avalanche diode (SPAD), each SPAD being responsive to an active shutter signal to generate an output signal based on detecting one or more photons that are incident on the SPAD and that have been reflected from the object;

a logic circuit coupled to the output signal of the at least one SPAD, the logic circuit to generate a first enable signal and a second enable signal, the first enable signal being active in response to a beginning of the active shutter signal and being inactive in response to the output signal of the at least one SPAD, and the second enable signal being in active in response to the output signal of the at least one SPAD and being inactive in response to an end of the active shutter signal; and a differential time-to-charge converter (DTCC) circuit coupled to the first and second enable signals that outputs the first signal and the second signal.

15. The imaging unit of claim 14, wherein the DTCC circuit comprises:

a capacitive device having a first terminal and a second terminal, the second terminal being coupled to a ground voltage;

a first switching device having first, second and third terminals, the first terminal of the first switching device being coupled to the first terminal of the capacitive device, the second terminal of the first switching device being coupled to a first floating diffusion, and the third terminal of the first switching device being coupled to the first enable signal, the first switching device being responsive to the first enable signal to transfer a first charge on the capacitive device to the first floating diffusion; and a second switching device having first, second and third terminals, the first terminal of the second switching device being coupled to the first terminal of the capacitive device, the second terminal of the second switching device being coupled to a second floating diffusion, and the third terminal of the second switching device being coupled to the second enable signal, the second switching device being responsive to the second enable signal to transfer a remaining charge on the capacitive device to the second floating diffusion, wherein the first signal comprises a first voltage that is based on the first charge on the first floating diffusion and the second signal comprises a second voltage that is based on the remaining charge on the second floating diffusion, wherein a drive signal that changes according to a ramp function begins to change in response to a beginning time of a first light pulse from which the one or more photons are detected to the end of the active shutter signal, the drive signal being connected to the third terminal of the first switching device if the first enable signal is active and being connected to the third terminal of the second switching device if the second enable signal is active.

16. The imaging unit of claim 15, wherein the capacitive device comprises a capacitor or a pinned photodiode.

17. A method to generate a greyscale image of an object, the method comprising:

projecting, from a light source, a sequence of light pulses toward a surface of an object;

detecting one or more photons corresponding to a light pulse that has been reflected from the surface of the object;

generating by a time-resolving sensor a pair of a first signal and a second signal based on detecting the one or more photons, the time-resolving sensor being synchronized with the light source, a first ratio of a magnitude of the first signal to a sum of the magnitude of the first signal and a magnitude of the second signal being proportional to a time of flight of the one or more detected photons, and a second ratio of the magnitude of the second signal to the sum of the magnitude of the first signal and the magnitude of the second signal being proportional to the time of flight of the one or more detected photons;

determining, by a processor, a distance to the object based on the first signal and the second signal; and determining, by the processor, a surface reflectance of the object where the one or more photons have has been reflected based on the first signal and the second signal.

18. The method of claim 17, further comprising detecting one or more photons, at the pixel, that have been reflected from the object for the sequence of light pulses, each pair of the first signal and the second signal corresponding to a light pulse of the sequence of light pulses; and determining, by the processor, the surface reflectance of the object where the light pulse has been reflected based on at least one pair of the first signal and the second signal.

19. The method of claim 17, further comprising detecting one or more photons, each detected one or more photons being reflected from the object for a corresponding light pulse in the sequence of light pulses for each scanning line;

generating, by the time-resolving sensor, a pair of the first signal and the second signal based on detecting the one or more photons; and generating, by the processor, a grayscale image of the object based on a plurality of pairs of the first signal and the second signal.

20. The method of claim 19, further comprising generating, by the processor, at least one histogram of an arrival time of photons to generate the grayscale image.

\* \* \* \* \*